(12) United States Patent
McNeill

(10) Patent No.: US 12,032,605 B2
(45) Date of Patent: Jul. 9, 2024

(54) SEARCHABLE DATA STRUCTURE FOR ELECTRONIC DOCUMENTS

(71) Applicant: SparkCognition, Inc., Austin, TX (US)

(72) Inventor: William McNeill, Austin, TX (US)

(73) Assignee: SPARKCOGNITION, INC., Austin, TX (US)

(*) Notice: Subject to any disclaimer, the term of this patent is extended or adjusted under 35 U.S.C. 154(b) by 0 days.

(21) Appl. No.: 18/054,787

(22) Filed: Nov. 11, 2022

(65) Prior Publication Data

US 2023/0153335 A1 May 18, 2023

Related U.S. Application Data

(60) Provisional application No. 63/279,394, filed on Nov. 15, 2021.

(51) Int. Cl.
| | |
|---|---|
| *G06F 16/31* | (2019.01) |
| *G06F 40/117* | (2020.01) |
| *G06F 40/137* | (2020.01) |
| *G06F 40/284* | (2020.01) |
| *G06F 40/30* | (2020.01) |
| *G06V 30/412* | (2022.01) |
| *G06V 30/414* | (2022.01) |

(52) U.S. Cl.
CPC .......... *G06F 16/316* (2019.01); *G06F 40/117* (2020.01); *G06F 40/137* (2020.01); *G06F 40/284* (2020.01); *G06F 40/30* (2020.01); *G06V 30/412* (2022.01); *G06V 30/414* (2022.01)

(58) Field of Classification Search
CPC .... G06F 16/316; G06F 40/284; G06F 40/117; G06F 40/137; G06F 40/30; G06V 30/412; G06V 30/414; G06V 10/82
See application file for complete search history.

(56) References Cited

U.S. PATENT DOCUMENTS

| | | | | |
|---|---|---|---|---|
| 11,244,205 | B2 * | 2/2022 | Srivastava | ............. G06N 3/045 |
| 11,687,731 | B2 * | 6/2023 | Lee | ........................ G06F 16/338 |
| | | | | 704/9 |
| 11,706,120 | B1 * | 7/2023 | Rodriguez | ............ H04L 41/145 |
| | | | | 709/224 |
| 2005/0187954 | A1 * | 8/2005 | Raman | ..................... G06F 16/80 |

(Continued)

OTHER PUBLICATIONS

"Pdfminer, Release 0.0.1," Levia 3, Nov. 18, 2017, pp. 1-19.

(Continued)

*Primary Examiner* — Etienne P Leroux
(74) *Attorney, Agent, or Firm* — Moore IP Law

(57) ABSTRACT

A method includes obtaining, at a device, a hierarchical structure representing a graphical layout of content items of an electronic document, the content items including at least text. The method also includes generating a word embedding representing a word of the electronic document. The method further includes determining position information of a location of the word in the electronic document. The method also includes determining a descriptor that indicates a relationship of the location to the hierarchical structure. The method further includes providing input data to a machine learning model to generate a semantic region category label of a semantic region of the electronic document. The semantic region includes the word. The input data includes the word embedding, the position information, and the descriptor.

20 Claims, 21 Drawing Sheets

(56) References Cited

U.S. PATENT DOCUMENTS

| | | | | |
|---|---|---|---|---|
| 2009/0238079 | A1* | 9/2009 | Gantenbein | H04L 41/12 370/241 |
| 2010/0145808 | A1* | 6/2010 | Hilbert | G06Q 40/04 705/37 |
| 2011/0029513 | A1* | 2/2011 | Morris | G06F 16/951 707/E17.014 |
| 2012/0166181 | A1* | 6/2012 | Damera-Venkata | G06F 40/163 704/9 |
| 2015/0088492 | A1* | 3/2015 | Liu | G06F 16/9537 704/9 |
| 2017/0317983 | A1* | 11/2017 | Kompalli | G06V 30/40 |
| 2017/0366626 | A1* | 12/2017 | Wang | H04L 67/306 |
| 2018/0336616 | A1* | 11/2018 | Baxter | G06Q 30/0625 |
| 2020/0133964 | A1* | 4/2020 | Lee | G06F 16/355 |
| 2020/0183989 | A1* | 6/2020 | Krogh | G06F 16/958 |
| 2021/0073534 | A1* | 3/2021 | Rawat | G06F 40/117 |
| 2021/0103695 | A1* | 4/2021 | Morariu | G06N 5/046 |
| 2022/0050967 | A1* | 2/2022 | Veyseh | G06F 40/289 |

OTHER PUBLICATIONS

Nervi, Mauro, "The Metamorphosis (transl. Ian Johnston)," The Kafka Projects, downloaded Nov. 11, 11, 2022, http://www.kafka.org/index.php?aid=170, pp. 1-19.

Vajpayee, Sarthak, "Understanding BERT—(Bidirectional Encoder Representations from Transformers)," Towards Data Science, Aug. 6, 2020, https://towardsdatascience.com/understanding-bert-bidirectional-encoder-representations-from-transformers-45ee6cd51eef, pp. 1-12.

\* cited by examiner

ABC Co.  2014 Annual Report to Shareholders  Electronic Document 124

Risks (cont.)

price of feedstocks. An international trend toward increased regulation of the industry makes the effects of these risks difficult to forecast.

Summary of Profits and Losses
(All values in millions of U.S. dollars)

|  | 2014 | 2013 | 2012 |
|---|---|---|---|
| Revenue | 1,578.0 | 1,352.5 | 1,362.2 |
| Cost of Goods Sold | 473.2 | *522.4* * | 408.7 |
| Gross Profit (Loss) | 1104.8 | 830.1 | 953.5 |
| Expenses | 1026.1 | 845.3 | 885.3 |
|     Advertising | 205.2 | 170.0 | 177.1 |
|     Payroll | 820.5 | 676.2 | 706.2 |
|     Other (incl. one-time chages) | 0.4 | *15.2* * | 2.1 |
| Net Income | 78.7 | *(-16.1)* | 68.2 |

\* Excess COGS and one-time charges due to manufaturing changes to new feedstock

- 7 -

⇩

Electronic Document Data 202 / Pixel Data 204 / Text 206 / Other 208 /

⇩

Pre-processing 210

⇩

Input Data 126

FIG. 2

SEARCHABLE DATA STRUCTURE FOR ELECTRONIC DOCUMENTS

CROSS-REFERENCE TO RELATED APPLICATION

The present application claims priority from U.S. Provisional Patent Application No. 63/279,394 filed Nov. 15, 2021, the content of which is incorporated by reference herein in its entirety.

BACKGROUND

The increased use of computer systems and electronic communications has resulted in generation of and exchange of a large quantity of electronic documents. It is not uncommon for individuals and organizations to have access to so many electronic documents that the sheer quantity of information available can hamper efforts to retrieve specific information when it is desired.

Generally, document archives are searched using keywords. In some situations, keyword searches are not particularly well matched to the way people recognize and search for information. For example, keyword searches seek to match specific text within the electronic document. In contrast, humans extract a great deal of information from the format, layout, and context of the electronic document.

SUMMARY

To improve information retrieval, disclosed systems and methods generate searchable data structures to facilitate searching for information in a corpus of electronic documents. The searchable data structures are generated in a manner that captures text of the electronic documents and also captures context information based on a graphical layout of the electronic documents. In some examples, the searchable data structures are generated to capture a semantic layout of the electronic documents. For example, the semantic layout can indicate that particular text indicated as a textbox in the graphical layout corresponds to a sub-section heading. As another example, the semantic layout can indicate that two graphical regions on consecutive pages (as indicated by the graphical layout) correspond to a single semantic region, such as a single paragraph that continues from one page to the next.

The searchable data structures have a smaller in-memory footprint than the corpus of electronic documents. Additionally, the searchable data structures facilitate information retrieval when the corpus of electronic documents includes structured or semi-structured content, such as tables. For example, it is common for businesses to periodically generate or update certain business reports. For a particular company, a report during one period may have a similar, but not identical, format to the same report during a different period (e.g., due to changes in the business or operating environment). The searchable data structures facilitate searching such structured or semi-structured electronic documents by hierarchically arranging data in a manner that enables use of path-based searches to retrieve information from different reports. Additionally, a search engine associated with the searchable data structures can use the hierarchical arrangement of the searchable data structures to generate search heuristics that reduce search time, retrieve more relevant information, or both.

A particular aspect of the disclosure describes a method that includes obtaining, at a device, a hierarchical structure representing a graphical layout of content items of an electronic document, the content items including at least text. The method also includes generating a word embedding representing a word of the electronic document. The method further includes determining position information of a location of the word in the electronic document. The method also includes determining a descriptor that indicates a relationship of the location to the hierarchical structure. The method further includes providing input data to a machine learning model to generate a semantic region category label of a semantic region of the electronic document. The semantic region includes the word. The input data includes the word embedding, the position information, and the descriptor.

Another particular aspect of the disclosure describes a device that includes a memory and one or more processors. The memory is configured to store an electronic document. The one or more processors are configured to obtain a hierarchical structure representing a graphical layout of content items of the electronic document, the content items including at least text. The one or more processors are also configured to generate a word embedding representing a word of the electronic document. The one or more processors are further configured to determine position information of a location of the word in the electronic document. The one or more processors are also configured to determine a descriptor that indicates a relationship of the location to the hierarchical structure. The one or more processors are further configured to provide input data to a machine learning model to generate a semantic region category label of a semantic region of the electronic document. The semantic region includes the word. The input data includes the word embedding, the position information, and the descriptor.

Another particular aspect of the disclosure describes a non-transitory computer-readable medium that stores instructions that, when executed by one or more processors, cause the one or more processors to obtain a hierarchical structure representing a graphical layout of content items of an electronic document. The content items include at least text. The instructions, when executed by the one or more processors, also cause the one or more processors to generate a word embedding representing a word of the electronic document. The instructions, when executed by the one or more processors, further cause the one or more processors to determine position information of a location of the word in the electronic document. The instructions, when executed by the one or more processors, also cause the one or more processors to determine a descriptor that indicates a relationship of the location to the hierarchical structure. The instructions, when executed by the one or more processors, further cause the one or more processors to provide input data to a machine learning model to generate a semantic region category label of a semantic region of the electronic document. The semantic region includes the word. The input data includes the word embedding, the position information, and the descriptor.

Another particular aspect of the disclosure describes a method of generating a searchable representation of an electronic document. The method includes obtaining an electronic document specifying a graphical layout of content items, where the content items include at least text. The method also includes determining pixel data representing the graphical layout of the content items and providing input data based, at least in part, on the pixel data to a document parsing model. The document parsing model is trained to detect functional regions within the graphical layout based on the input data, assign boundaries to the functional regions based on the input data, and assign a category label to each functional region that is detected. The method also includes matching portions of the text to corresponding functional regions based on the boundaries assigned to the functional regions and locations associated with the portions of the text. The method further includes storing data representing the content items, the functional regions, and the category labels in a searchable data structure.

Another particular aspect of the disclosure describes a system including a memory storing instructions and a processor configured to execute the instructions to perform operations. The operations include obtaining an electronic document that includes data specifying a graphical layout of content items, where the content items include at least text. The operations also include determining pixel data representing the graphical layout of the content items and providing input data based, at least in part, on the pixel data to a document parsing model. The document parsing model is trained to detect functional regions within the graphical layout based on the input data, assign boundaries to the functional regions based on the input data, and assign a category label to each functional region that is detected. The operations also include matching portions of the text to corresponding functional regions based on the boundaries assigned to the functional regions and locations associated with the text. The operations further include storing a searchable data structure representing the content items, the functional regions, and the category labels.

Another particular aspect of the disclosure describes a non-transitory computer-readable medium storing instructions that are executable by a processor to cause the processor to perform operations. The operations include obtaining an electronic document that includes data specifying a graphical layout of content items, where the content items include at least text. The operations also include determining pixel data representing the graphical layout of the content items and providing input data based, at least in part, on the pixel data to a document parsing model. The document parsing model is trained to detect functional regions within the graphical layout based on the input data, assign boundaries to the functional regions based on the input data, and assign a category label to each functional region that is detected. The operations also include matching portions of the text to corresponding functional regions based on the boundaries assigned to the functional regions and locations associated with the text. The operations also include storing a searchable data structure representing the content items, the functional regions, and the category labels.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 2 is a diagram illustrating aspects of generation of a searchable data structure based on one or more electronic documents according to a particular implementation of the system of FIG. 1.

DETAILED DESCRIPTION

Figure 1:
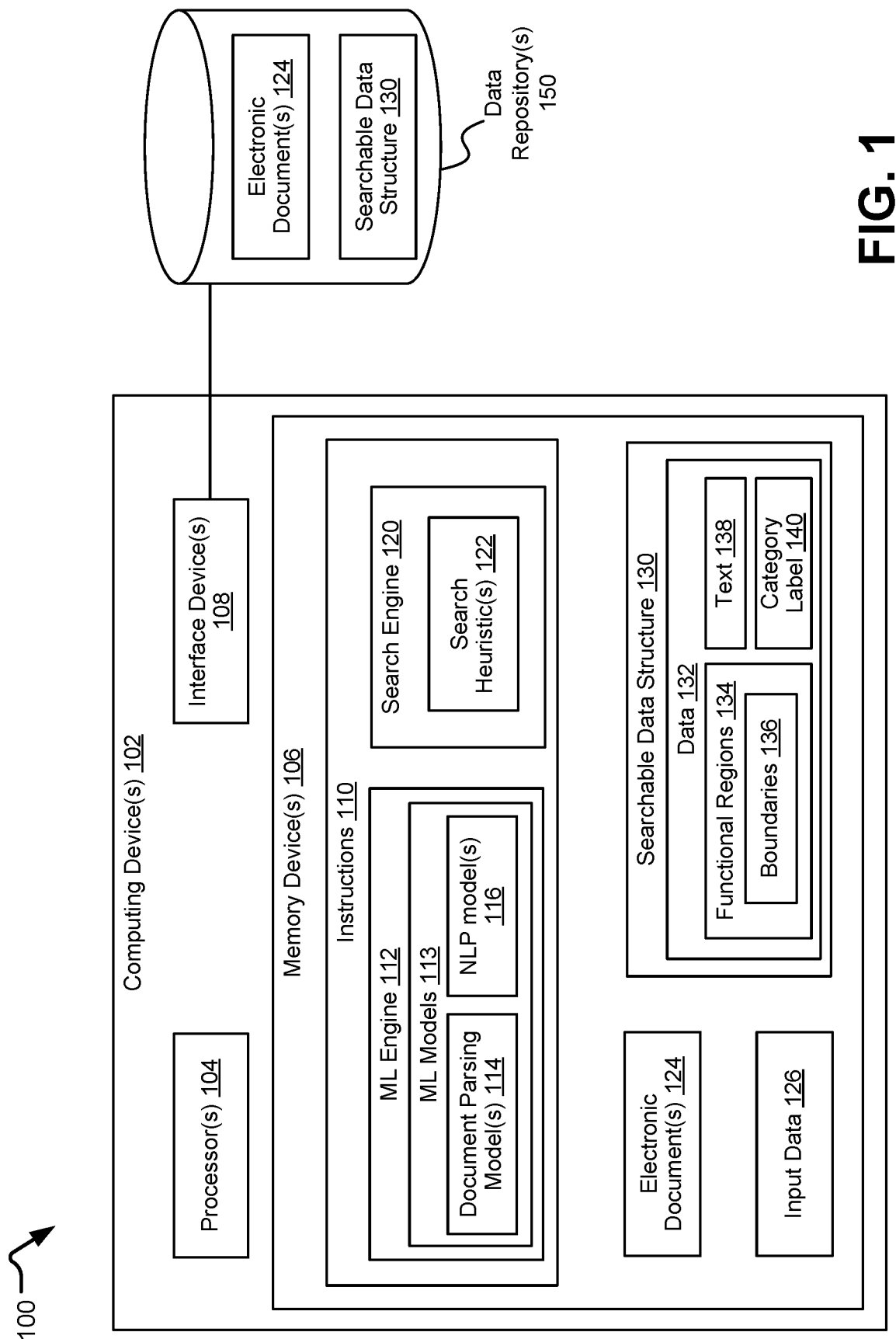
FIG. 1 is a block diagram of an example of a system configured to generate a searchable data structure based on one or more electronic documents.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

FIG. 1 is a block diagram of an example of a system 100 configured to generate a searchable data structure 130 based on one or more electronic documents 124. The searchable data structure 130 is configured to facilitate knowledge retrieval from the electronic documents 124. For example, the electronic documents 124 may include a combination of unstructured text (e.g., prose), structured text (e.g., tables), and other content (referred to herein as "semi-structured") which is not clearly structured or unstructured (e.g., bullet point lists, tables that are not clearly delineated with gridlines, etc.). The system 100 is configured to generate the searchable data structure 130 such that information can be readily retrieved from any portion of the electronic documents, including unstructured text, structured text, and other content. One benefit of arranging information from the electronic documents 124 in the searchable data structure 130 is that search heuristics 122 can be generated to improve certain knowledge retrieval operations, as described further below.

The system 100 includes one or more computing devices 102. Each computing device 102 includes one or more processors 104, one or more interface devices 108, and one or more memory devices 106. In some examples, the computing device(s) 102 include one or more host computers, one or more servers, one or more workstations, one or more desktop computers, one or more laptop computers, one or more Internet of Things devices (e.g., a device with an embedded processing systems), one or more other computing devices, or combinations thereof.

The processor(s) 104 include one or more single-core or multi-core processing units, one or more digital signal processors (DSPs), one or more graphics processing units (GPUs), or any combination thereof. The processor(s) 104 are configured to access data and instructions 110 from the memory device(s) 106 and to perform various operations described further below. The processor(s) 104 are also coupled to the interface device(s) 108 to receive data from another device (such as receiving additional electronic documents 124 from a data repository 150), to send data to another device (such as sending a searchable data structure 130 or search query to the data repository 150 or sending a graphical user interface to a display device), or both.

The interface devices(s) 108 include one or more serial interfaces (e.g., universal serial bus (USB) interfaces or Ethernet interfaces), one or more parallel interfaces, one or more video or display adapters, one or more audio adapters, one or more other interfaces, or a combination thereof. The interface devices(s) 108 include a wired interface (e.g., Ethernet interfaces), a wireless interface, or both.

The memory device(s) 106 include tangible (i.e., non-transitory) computer-readable media, such as a magnetic or optical memory or a magnetic or optical disk/disc. For example, the memory device(s) 106 include volatile memory (e.g., volatile random access memory (RAM) devices), nonvolatile memory (e.g., read-only memory (ROM) devices, programmable read-only memory, or flash memory), one or more other memory devices, or a combination thereof.

The instructions 110 are executable by the processor(s) 104 to cause the processor(s) 104 to perform operations to generate the searchable data structure 130 based on the electronic document(s) 124, to retrieve data from the searchable data structure 130, or both. For example, in FIG. 1, the instructions 110 include a machine-learning (ML) engine 112 that is configured to execute one or more machine-learning models 113. The instructions 110 also include a search engine 120. In the example illustrated in FIG. 1, the machine-learning models 113 include one or more document parsing models 114 and one or more natural-language processing (NLP) models 116. In other examples, the machine-learning models 113 include additional models. Each of the machine-learning models 113 includes or corresponds to a trained model, such as a perceptron, a neural network, a support vector machine, a decision tree, a prototypical network for few-shot learning, an autoencoder, a random forest, a regression model, a Bayesian model, a naive Bayes model, a Boltzmann machine, deep belief networks, a convolutional neural network, another machine-learning model, or an ensemble, variant, or other combination thereof.

In some examples, the document parsing model(s) 114, the NLP model(s) 116, or both, includes two or more distinct models which cooperate to perform the operations described herein. For example, the document parsing model(s) 114 may include a first model that is trained to identify functional regions of an electronic document and a second model that is trained to identify subregions of a particular type of functional region. To illustrate, when the first model identifies a table in an electronic document 124, the second model may be used to identify parts of the table, such as rows, columns, data elements, headings, and so forth.

The memory device(s) 106, the data repository(s) 150, or both, store the electronic documents 124. Each electronic document 124 specifies a graphical layout of content items. The content items include, for example, text, graphics, pictures, etc. For certain types of electronic documents, such as portable document format (pdf) documents or image files (e.g., scanned documents), the content items and their graphical layout are represented by pixel data. In this context, "pixel data" refers to data that represents or specifies a plurality of display elements to render a display of the electronic document and each display element encodes at least one color bit representing a display color of the display element. As a simple example, the pixel data may include a set of data elements arranged such that each data element corresponds to a display pixel, and each data element includes a value of 1 to indicate that the corresponding pixel should be black or a value of 0 to indicate that the corresponding pixel should be white. Of course, many more complex representations of pixel data are commonly used, such as RGB data in which the color of each pixel is indicated by a red (R) value, a green (G) value, and a blue (B) value. Some pdf documents and many other types of documents also directly encode the text and graphical layout information. To illustrate, markup language documents, such as hypertext markup language (HTML) documents, may include text and as well as descriptors of layout information, such as font characteristics, spacing, colors, graphical elements (e.g., line, images, icons, etc.), and so forth.

The document parsing model(s) 114 are configured to receive input data 126 descriptive of one or more of the electronic document(s) 124 and to generate output data based on the input data 126. In a particular implementation, the document parsing model(s) 114 are trained to detect functional regions 134 within the graphical layout based on the input data 126, to assign boundaries 136 to the functional regions 134 based on the input data 126, and to assign a category label 140 to each functional region 134 that is detected. In this implementation, the output data from the document parsing model(s) 114 includes at least the category labels 140 and data descriptive of the boundaries 136 (e.g., pixel locations of corners or boundary regions). As used herein, a "functional region" refers to a portion of an electronic document that includes one or more content items and that is distinct from one or more other portions of the electronic document in a manner that provides a contextual cue that the different portions include different types of content or are intended to convey different types of information. In particular implementations, the functional regions 134 are distinguished by context cues, such as text format (e.g., font size, font color, font position, other font characteristics, text alignment, or line spacing), position on a page, white space or blank regions on the page, background color, etc. To illustrate, one or more paragraphs of text with similar formatting may form a first functional region that is distinguished from a table by a change in text format between text of the paragraphs and text of the table.

In some implementations, changes or differences in context cues between adjacent portions of the electronic document 124 indicate functional differences between the adjacent portions. To illustrate, a change in font characteristics, a change in character spacing, or a change in background color between two adjacent regions of the electronic document may indicate that the adjacent regions are distinct functional regions. Such differences can also be used to determine a category label associated with each of the adjacent functional regions. To illustrate, a first functional region, such as a paragraph of text, may have text of a first size, with first character spacing, first alignment, and first font characteristics (e.g., not bold); whereas, an adjacent second functional region, such as a section heading, may have text of a second size, with second character spacing, second alignment, and/or second font characteristics (e.g., bold).

When certain functional regions 134 are identified in an electronic document 124, these functional regions 134 may be further processed to identify and label sub-regions. For example, an electronic document 124 may include a table (with or without gridlines), and the graphical layout of content within the table may be evaluated to identify table headings, column headings, row headings, columns, rows, data elements, or other features. In a particular implementation, sub-regions of a table may be identified using computer vision based processes, such as based on gridlines, a grid-like arrangement of text or other structural characteristics. Additionally, or alternatively, sub-regions of a table may be identified based on typographic characteristics or patterns of typographic characteristics, such as background color, text color, spacing (e.g., between characters, words, or lines), fonts, special characters (e.g., colons, slashes, commas, semicolons, dashes, or other text delimiters). Additionally, or alternatively, sub-regions of a table may be identified based on semantic characteristics of text of the table. For example, if several words on a page are approximately aligned vertically (e.g., along a length of the page), and the words belong to the same semantic group (e.g., each is the name of a food item), then the set of words may be identified as a column.

In some implementations, when a functional region 134 is labeled as a table, the document parsing model(s) 114 perform operations to process individual data elements, columns, or rows of the table. For example, for a particular functional region 134 labeled as a table, the document parsing model(s) 114 may estimate column boundaries and row boundaries based on the input data associated with the particular functional region. In this example, the document parsing model(s) 114 may also determine whether one or more columns of the table have a column heading. If a column has a column heading, the document parsing model(s) 114 determine text of the column heading based on the text associated within the particular functional region 134. The document parsing model(s) 114 store at least a portion of the text associated with the particular functional region in a first data element of the searchable data structure 130 and stores the column heading of the column in a second data element, where the first data element is subordinate to the second data element in the searchable data structure 130. To illustrate, the column heading may be stored in a branch node of a tree structure and text of a cell of the table that is in the column may be stored in a leaf node coupled to the branch node. In some implementations, the document parsing model(s) 114 identify a column heading based on output of the NLP model(s) 116. For example, some tables may not include explicit column headings. Rather, column headings may implied by the content of the cells of the column or other portions of the table (e.g., a table heading). To illustrate, a table listing expenses may include data such as "Rent", "Payroll", "Advertising", "Taxes", which, in context, a human reader would recognize as expense categories without an "Expense" heading being provided. To determine an implied column heading of a particular column, the NLP model(s) 116 may analyze text of the table, such as text of a table head, text in cells, etc., to identify a semantic group represented by text of the column. In such implementations, the semantic group is assigned as the column heading.

As described further below, in some implementations, the document parsing model(s) 114 are trained using a supervised learning technique. For example, a set of electronic documents in which various functional regions have been annotated are used as supervised training data to train the document parsing model(s) 114. The annotations associated with the set of electronic documents may indicate boundaries of the various functional regions and a category label associated with each. The category labels 140 indicate the function (e.g., the syntactical or structural purpose) of content within each functional region 134. Examples of category labels 140 include page headers, page footers, section headings, paragraphs, tables, images, footnotes, and lists.

The document parsing model(s) 114 designate the functional regions 134, assign category labels 140 to the functional regions 134, or both, based on a probabilistic analysis of the pixel data associated with the electronic document 124. In some implementations, the document parsing model(s) 114 may also apply one or more rules or heuristics to assign the category labels 140. For example, when the text 138 of a functional region 134 includes one or more special characters, the document parsing model(s) 114 may assign a particular category label 140 to the functional region 134 (or may perform operations to indicate an increased probability that the functional region 134 is associated with the particular category label 140). To illustrate, when the first character of each line of the text 138 of a functional region 134 includes a bullet point character, the document parsing model(s) 114 determine a high probability that the functional region 134 corresponds to a list. The high probability can be determined by assigning a default probability value (e.g., 1) or by weighting output of the probabilistic analysis of the document parsing model(s) 114 to increase the probability associated with the list category label. In some implementations, a rule can also, or in the alternative, be used to decrease the probability that a particular category label is assigned to a functional region 134. To illustrate, a rule may indicate that text 138 with a large font size (e.g., greater than an average font size for the electronic document), a bold font, and a centered alignment has a low probability of being assigned a footnote category label.

In some implementations, the document parsing model(s) 114 assign a category label 140 to a functional region 134 based in part on output from the NLP model(s) 116. For example, the NLP model(s) 116 can be executed to perform a semantic analysis of the text 138 of the functional region 134. In this example, the output of the NLP model(s) 116 may indicate that the text 138 of the functional region 134 includes a particular type of information, such as a citation, boilerplate language, a phone number, etc. In this example, the output of the NLP model(s) 116 is provided as input (along with other information) to the document parsing model(s) 114, and the document parsing model(s) 114 use the output of the NLP model(s) 116 to determine the category label 140 assigned to the functional region 134. To illustrate, a functional region 134 that includes a citation and is located at the bottom of a page may be assigned the category label footnote based on the semantic content of the functional region 134 and the graphical layout of the page.

After the document parsing model(s) 114 identify the functional regions 134 within a particular electronic document 124, the processor(s) 104 match portions of the text 138 of the particular electronic document 124 to corresponding functional regions 134 based on the boundaries 136 assigned to the functional regions 134 and locations associated with the text 138. To illustrate, text 138 of the electronic document 124 that is disposed (in the graphical layout) within boundaries 136 of a first functional region is assigned to the first functional region. Thus, each functional region 134 of an electronic document 124 is associated with text 138 (or other content items), boundaries 136, and a category label 140.

In some implementations, the processor(s) 104 determine a topology of the searchable data structure 130 based on the text 138 (or other content items), the boundaries 136, the category labels 140, or a combination thereof, associated with the functional regions 134. In this context, the "topology" of the searchable data structure 130 refers to the number, type, and arrangement of data elements (e.g., nodes) and interconnections between data elements. For example, in a particular implementation, the searchable data structure 130 has a hierarchical topology, such as a tree or graph structure, in which certain data elements are linked in an ordered arrangement with other data elements. In this example, the order of the hierarchy of the topology of the searchable data structure 130 is determined based on the arrangement of information in the electronic document(s) 124. As a particular example, the searchable data structure 130 may include a tree structure having a plurality of leaf nodes. In this example, each leaf node is associated with a corresponding branch node, and the content items of the electronic document(s) 124 are assigned to nodes of the tree structure such that a hierarchy of the functional regions 134 is represented in the tree structure. Thus, the searchable data structure 130 is a knowledge representation based on the electronic document(s) 124 rather than, for example, a template.

As one example, a structured electronic document 124 may include text 138 related to different topics. The various topics may be indicated by section headings, and a section heading may precede text associated with a particular topic indicated by the section heading. In this example, the topology of the searchable data structure 130 is determined based on which category labels 140 are assigned to the functional regions 134 of the electronic document 124 and the graphical layout of the functional regions 134. For example, if the document parsing model(s) 114 assign a section heading category label to a first functional region and assign a paragraph category label to a second functional region 134 that is adjacent to and following the first functional region, the topology of the searchable data structure 130 is arranged such that data associated with the first functional region is linked to and hierarchically superior to the data associated with the second function region.

The processor(s) 104 store data 132 of the searchable data structure 130 based on the content items (e.g., the text 138 or other content items), the functional regions 134, and the category labels 140. For example, after the topology of the searchable data structure 130 is determined, the functional regions 134 are identified, and the category labels 140 of the functional regions 134 are assigned, each functional region 134 can be mapped to one or more nodes (also referred to herein as data elements) of the searchable data structure 130. Contents items, such as text, images, graphics, etc., associated with a particular functional region are stored in the node of the searchable data structure 130 that is mapped to the particular functional region. The searchable data structure 130 thus encodes knowledge representation derived from the graphical layout of the electronic documents 124 without retaining the detailed graphical layout itself. As a result, the searchable data structure 130 has a smaller in-memory footprint than the electronic document 124 but retains information explicitly and implicitly represented in the electronic document 124.

In the example of FIG. 1, the system 100 also includes a search engine 120. The search engine 120 includes instructions that are executable by the processor(s) 104 to find and retrieve information from the searchable data structure 130 (or from the electronic document(s) 124 based on information within the searchable data structure 130). The search engine 120 is also configured to generate and/or use one or more search heuristics 122 to improve information retrieval. For example, the search heuristic(s) 122 may be used to augment a search query received from a user.

As one example, a business may periodically generate or receive documents that follow a similar graphical layout. To illustrate, an annual report to shareholders from a particular company may have a similar, but not necessarily identical, graphical layout from year to year. In a particular implementation, the search heuristic(s) 122 can describe a data path (e.g., a set of node and links, or key value pair(s)) indicating a path in the searchable data structure 130 to retrieve particular information for a particular type of electronic document.

The search heuristic(s) 122 are generated after the topology of the searchable data structure 130 is determined. For example, the one or more of the search heuristic(s) 122 may be generated responsive to an indication that data associated with a particular search (e.g., a set of search terms of a search query) was obtained from the searchable data structure 130 via a particular data path. In this example, information descriptive of at least a portion of the data path and information descriptive of the search query may be used to generate a rule that is added to the search heuristic(s) 122. In this example, the rule can be used to access similar data derived from other electronic documents. For example, a rule based on a query to identify Cost of Goods in the annual report for a first year can be used to identify Cost of Goods in annual reports for other years by searching the same data path in portions of the searchable data structure 130 associated with the other years.

The searchable data structure 130 has a smaller in-memory footprint than the electronic document(s) 124 it is based on. Additionally, the searchable data structure 130 facilitates information retrieval. For example, the searchable data structure 130 may store information from the electronic document(s) 124 in a hierarchical and/or interconnected manner that enables use of path-based searches to retrieve similar or related information from different electronic documents 124. In some implementations, the search engine 120 associated with the searchable data structure 130 can use the queries to the searchable data structure 130 to generate search heuristic(s) 122 that reduce search time, retrieve more relevant information, or both.

FIG. 2 is a diagram illustrating aspects of generation of the searchable data structure 130 based on one or more electronic documents 124 according to a particular implementation of the system 100 of FIG. 1. The operations described with reference to FIG. 2 may be performed by the processor(s) 104 of FIG. 1 executing instructions 110 from the memory device(s) 106.

The diagram illustrated in FIG. 2 show one example of generating the input data 126 for the document parsing model(s) 114 of FIG. 1 based on an electronic document 124. For convenience of illustration, only a single page of one electronic document 124 is shown in FIG. 2; however, the electronic document(s) 124 may include more than one document and each document may include more than one page. Additionally, the electronic document 124 illustrated in FIG. 2 is formatted to include several examples of different types of functional regions, which are discussed further with reference to FIG. 3. Other pages of the electronic document 124 and other electronic documents may include more, fewer, or different types of functional regions. Further, FIG. 2 illustrates one example of how various functional regions may be distinguished in a graphical layout of content items. In other examples, the functional regions may be distinguished in other ways. To illustrate, the electronic documents 124 of FIG. 2 includes information arranged in a table that does not have gridlines; however, another page of the electronic document 124 or a different electronic document may include information arranged in a table that does have gridlines.

In FIG. 2, the electronic document 124 is stored as, includes, or is included within electronic document data 202. The electronic document data 202 includes pixel data 204, text 206, other data 208 (such as formatting information, file metadata, etc.), or a combination thereof. In some implementations, the text 206 is determined based on the pixel data 204, for example via an optical character recognition process. In other implementations, the other data 208 includes mark-up language information describing the graphical layout of the text 206 (and possibly other content items), and the pixel data 204 is determined based on the text 206 and the other data 208.

In the example illustrated in FIG. 2, the electronic document data 202 is provided to pre-processing instructions 210. In this example, the pre-processing instructions 210 are part of instructions 110 of FIG. 1. In some implementations, the machine-learning models 113 include the pre-processing instructions 210 (e.g., the pre-processing instructions 210 include or correspond to a trained model). In other implementations, the pre-processing instructions 210 are distinct from the machine-learning models 113.

The pre-processing instructions 210 generate the input data 126 based on the electronic document data 202. As one example, the pre-processing instructions 210 may generate the input data 126 as a vector of values encoding all of, or a portion of, the pixel data 204, the text 206, and the other data 208. To illustrate, the vector of values corresponding to the input data 126 may include or encode the pixel data 204 and the text 206. As another illustrative example, the vector of values corresponding to the input data 126 may include or encode the pixel data 204 and data representative of a portion of the text 206, the other data 208, or both. In this illustrative example, the data representative of a portion of the text 206, the other data 208, or both, may include n-grams or skip grams representing words, phrases, data values, or other information from the text 206, the other data 208, or both.

Figure 3:
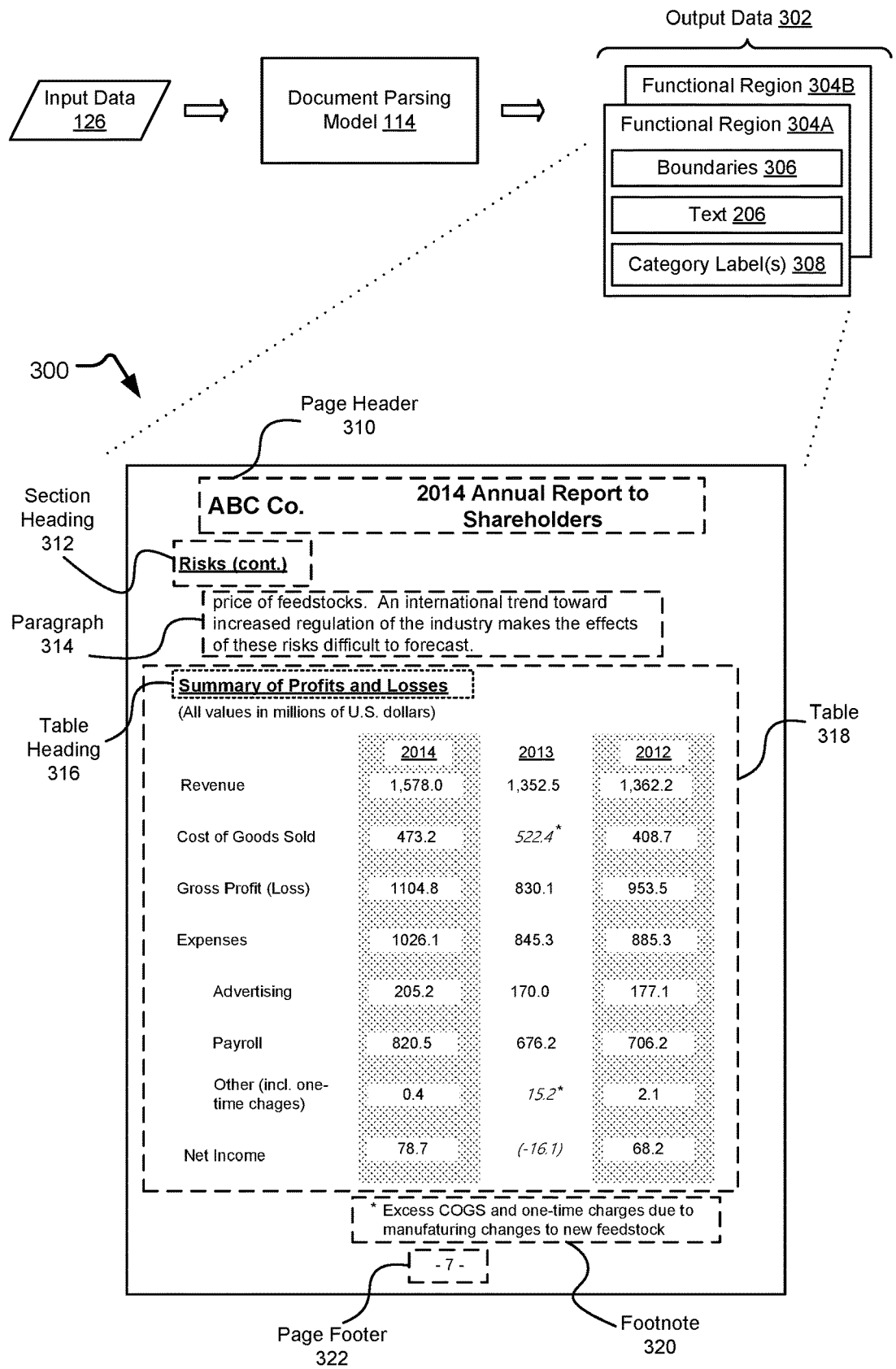
FIG. 3 is a diagram illustrating aspects of generation of a searchable data structure based on one or more electronic documents according to a particular implementation of the system of FIG. 1.

FIG. 3 is a diagram illustrating aspects of generation of the searchable data structure 130 based on the electronic document(s) 124 according to a particular implementation of the system 100 of FIG. 1. The diagram illustrated in FIG. 3 shows an example of output data 302 of the document parsing model(s) 114 including information identifying a plurality of functional regions 134 (such as a first functional region 304A and a second functional region 304B) of an electronic document 124 of FIGS. 1 and 2.

Although two functional regions 304A and 304B are illustrated in FIG. 3, the electronic document 124 may include more than two functional regions. For example, FIG. 3 includes a diagram 300 illustrating the example page of the electronic document 124 of FIG. 2 with various functional regions identified. In the diagram 300, each functional region is denoted by a dashed line indicating a boundary of the functional region. For example, in the diagram 300, the functional regions 134 include a page header 310, a section heading 312, a paragraph 314, a table 318, a footnote 320, and a page footer 322.

In some implementations, subregions of certain types of functional regions 134 may also be identified and associated with boundaries 136. For example, in FIG. 3, a table heading 316 is associated with a boundary indicated by a dotted line. Additional subregions of the table 318 are illustrated and described with reference to FIG. 4.

Although FIG. 3 illustrates examples of six different types of functional regions, the electronic document(s) 124 can include more or fewer than six different types of functional regions. Examples of other types of functional regions include images and lists.

Figures 4, 5:
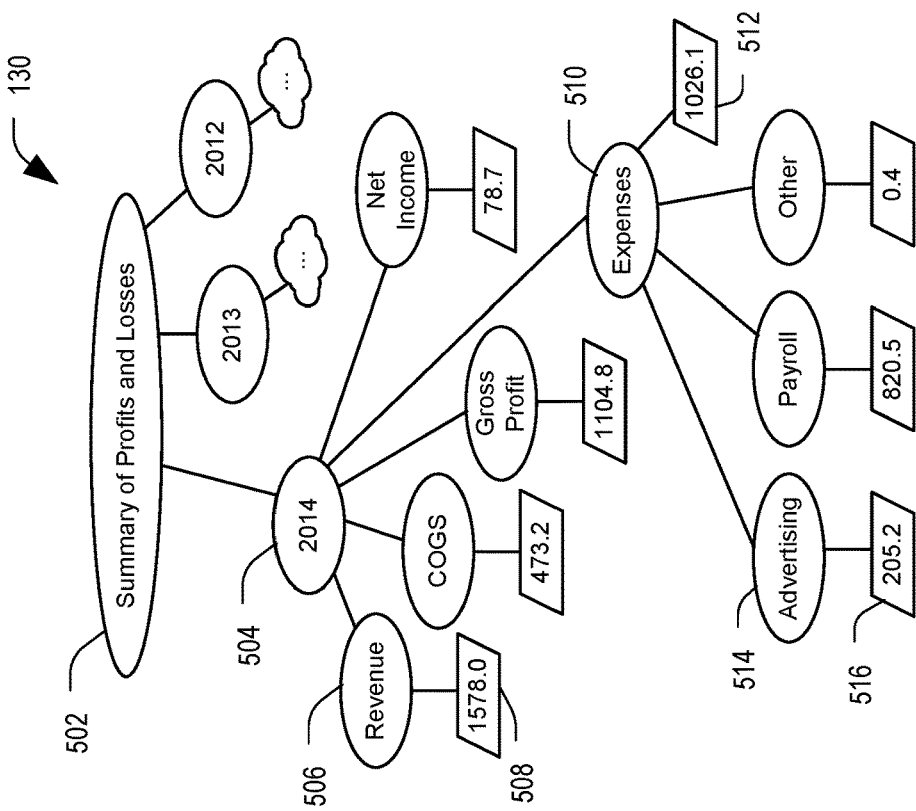
FIG. 4 is a diagram illustrating aspects of generation of a searchable data structure based on one or more electronic documents according to a particular implementation of the system of FIG. 1.
FIG. 5 is a diagram illustrating at least a portion of a searchable data structure according to a particular implementation of the system of FIG. 1.

FIGS. 4 and 5 together illustrate aspects of generation of the searchable data structure 130 based on the electronic document(s) 124 according to a particular implementation of the system 100 of FIG. 1. The example illustrated in FIG. 4 includes a diagram illustrating various functional subregions of the table 318, and FIG. 5 illustrates an example of a searchable data structure 130 based on the functional subregions of the table 318.

In FIG. 4, the functional subregions include the table heading 316, columns 404, column headers 406, rows 408A-408H, row headers 402, and a sub-table 410. In some implementations, one or more of the functional subregions of the table 318 includes its own subregions. To illustrate, in FIG. 4, the table 318 includes sub-table 410 as a functional subregion. In this illustrative example, the sub-table 410 may include one or more subregions, such as rows 408D-408G.

FIG. 5 represents the searchable data structure 130 as a connected graph or tree structure including multiple nodes. Each node is either a branch node having one or more subordinate nodes or a leaf node having no subordinate nodes. Each node stores text, category labels, other content items (e.g., embedded images), or a combination thereof, associated with a functional region or a functional subregion of the electronic document 124.

In the example illustrated in FIG. 5, the searchable data structure 130 includes a branch node 502 that represents the entire table 318 (also referred to as a root node), and the branch node 502 stores text associated with the entire table, such as text of the table heading 316. In this example, the searchable data structure 130 also includes a set of branch nodes corresponding to the columns 404 of the table 318, each of which stores text of a respective column header. To illustrate, branch node 504 corresponds to a column with the column header text "2014". In the example illustrated in FIG. 5, the branch node 502 is also coupled to other subordinate nodes corresponding to other columns 404 of the table 318.

Further, in this example, the searchable data structure 130 includes several nodes that are subordinate to the branch node 504, such as node 506 and node 510. The node 506 is an example of a node that corresponds to a row of the table 318, and as such, the node 506 stores text of one of the row headers 402 (e.g., "Revenue" corresponding to row 408A). Further, in the example of FIG. 5, the node 506 is coupled to a leaf node 508 that include a content item (e.g., a value or text representing a value) associated with a table data element associated with the "2014" column and the "Revenue" row of the table 318. In the example illustrated in FIG. 5, the branch node 504 is also coupled to other subordinate nodes corresponding to other rows 408 of the table 318.

In the example of FIG. 5, the node 510 stores text (e.g., "Expenses") representing row 408D, which is a summary row of the sub-table 410. The node 510 is coupled to a leaf node 512 that includes a content item (e.g., a value or text representing a value) associated with a table data element associated with the "2014" column and the "Expenses" row of the table 318. The node 510 is also coupled to subordinate nodes representing portions of the sub-table 410. For example, the node 510 is coupled to node 514, which represents row 408E of the sub-table 410 and stores corresponding text (e.g., "Advertising"). The node 510 and each of the other nodes at the same hierarchical level of the searchable data structure 130 are coupled to respective leaf nodes that include content items (e.g., a value or text representing a value) from the table 318. To illustrate, the node 510 is coupled (via the node 514) to a leaf node 516 that stores the value 205.2 (or text representing the value), which corresponds to the "Advertising" row 408E and the "2014" column of the sub-table 410 of FIG. 4.

FIG. 5 represents an example of the searchable data structure 130 formatted as a tree or graph. In other implementations, other hierarchical arrangements of data may be used. In a particular implementation, the topology of the searchable data structure 130 is determined based on the category labels assigned by the document parsing model(s) 114 of FIG. 1. For example, the searchable data structure 130 illustrated in FIG. 5 includes three branch nodes coupled to the branch node 502 because the table 318 includes three data columns 404. If the table 318 includes seven data columns 404, the searchable data structure 130 of FIG. 5 would include seven branch nodes coupled to the branch node 502. As another example, the table 318 includes a sub-table 410 listing examples of Expenses, and as a result, the node 510 of the searchable data structure 130 includes subordinate nodes corresponding to the rows of the sub-table 410.

In other implementations, the searchable data structure 130 hierarchically arranges information derived from the table 318 in a different manner. To illustrate, nodes representing the columns 404 of the table 318 may be subordinate to nodes representing the rows 408 of the table 318.

In the example illustrated in FIGS. 2-4, the table 318 does not include gridlines. In other examples, a table includes gridlines that define or distinguish table data cells, columns, rows, headers, or a combination thereof. In the example illustrated in FIGS. 2-4, the data cells, columns, rows, headers, or a combination thereof, of the table 318 are distinguished by alignment, spacing, position, font characteristics, background color, or a combination thereof. To illustrate, the document parsing model(s) 114 of FIG. 1 may identify the columns 404 of the table 318 based on vertical (with respect to a page orientation) alignment of text of each of the columns 404. As another illustrative example, the document parsing model(s) 114 of FIG. 1 may identify the columns 404 of the table 318 based on the presence of vertical background color bands (illustrated with shading in FIG. 5). In some implementations, the document parsing model(s) 114 may also consider other factors, such as the presence of column headers 406. It should be understood that the examples above are merely illustrative. When the document parsing model(s) 114 are a trained machine-learning model, it may not be obvious to a human observer which specific information represented by the input data 126 results in a specific functional region 134 of an electronic document 124 being identified as a table, a column, a row, etc.

In some implementations, one or more of the columns 404 may not be associated with a column header 406. In such implementations, the NLP model(s) 116 can be used to determine a semantic group represented by text of data elements of the column. For example, if the table 318 included a set of vertically aligned data elements with no clear column heading and including the text such as: Dallas, Miami, Tokyo, London, and Mumbai, the NLP model 116 may determine a column header for the column based on a semantic analysis of the text of the data elements. In this example, the column header may be, for example, "City".

An interconnected set of nodes of the searchable data structure 130 of FIG. 5 define a data path that can be used to generate a rule of the search heuristic(s) 122 of FIG. 1. To illustrate, if a user searches for advertising expenses in 2014 and indicates that the data path:

Summary of Profits and Losses|2014|Expenses| Advertising provides the sought after information, a rule can be generated indicating that advertising for a particular year ("Year") may be accessed at data path:

Summary of Profits and Losses|Year|Expenses|Advertising

Accordingly, if a user subsequently generates a query for Advertising expenses for another year, the search query may be supplemented with information from the data path to improve knowledge retrieval.

Figure 6:
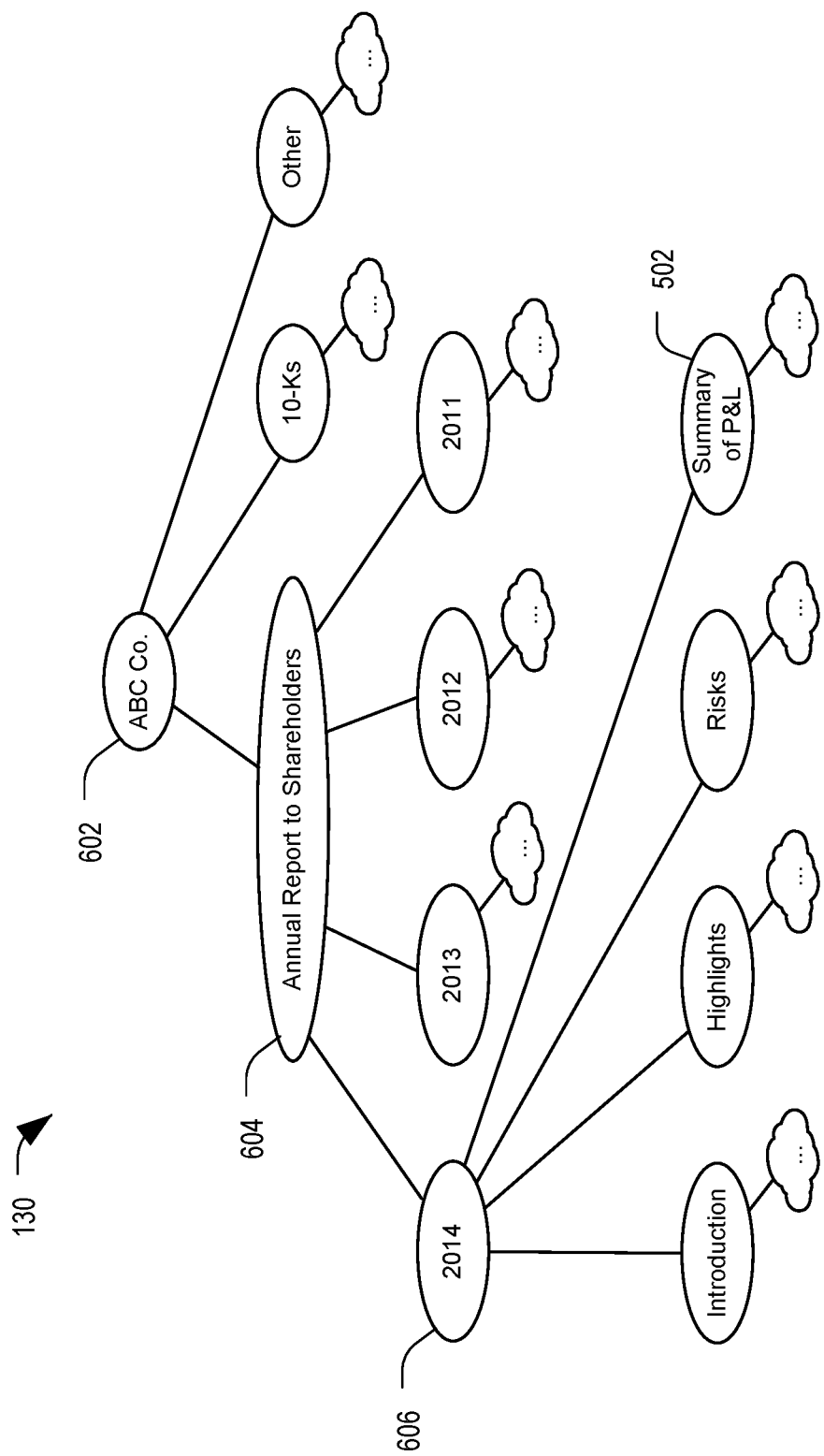
FIG. 6 is a diagram illustrating at least a portion of a searchable data structure according to a particular implementation of the system of FIG. 1.

FIG. 6 is a diagram illustrating at least a portion of a searchable data structure 130 according to a particular implementation of the system 100 of FIG. 1. In the example illustrated in FIG. 6, the searchable data structure 130 stores data based on an entire corpus of electronic documents, such as records of a company. FIG. 6 represents the searchable data structure 130 formatted as a tree or graph; however, in other implementations, other hierarchical arrangements of the data are used.

As described with reference to FIG. 5, the topology of the searchable data structure 130 may be determined based on the category labels assigned by the document parsing model(s) 114 during processing of the corpus of electronic documents. For example, the searchable data structure 130 illustrated in FIG. 6 includes a root node 602 and three branch nodes subordinate to the root node 602. The root node 602, in this example, stores data derived from page headers, page footers, coversheets, or other functional regions that are common to many of the electronic documents of the corpus and that are associated with particular category labels. In the particular example illustrated in FIG. 6, the branch nodes stemming from the root node 602 represent particular categories or types of electronic documents, such as annual shareholder reports 604, 10-K filings, and other documents. In other examples, the searchable data structure 130 includes more, fewer, or different brand nodes coupled to the root node 602.

In the example illustrated in FIG. 6, the node 502 and nodes subordinate thereto store data derived from the table 318 of FIGS. 3 and 4. For example, the node 502 of FIG. 6 may be coupled to one or more of the nodes illustrated in FIG. 5. As explained with reference to FIG. 5, the searchable data structure 130 of FIG. 6 defined data paths that can be used to generate the search heuristic(s) 122.

Figure 7:
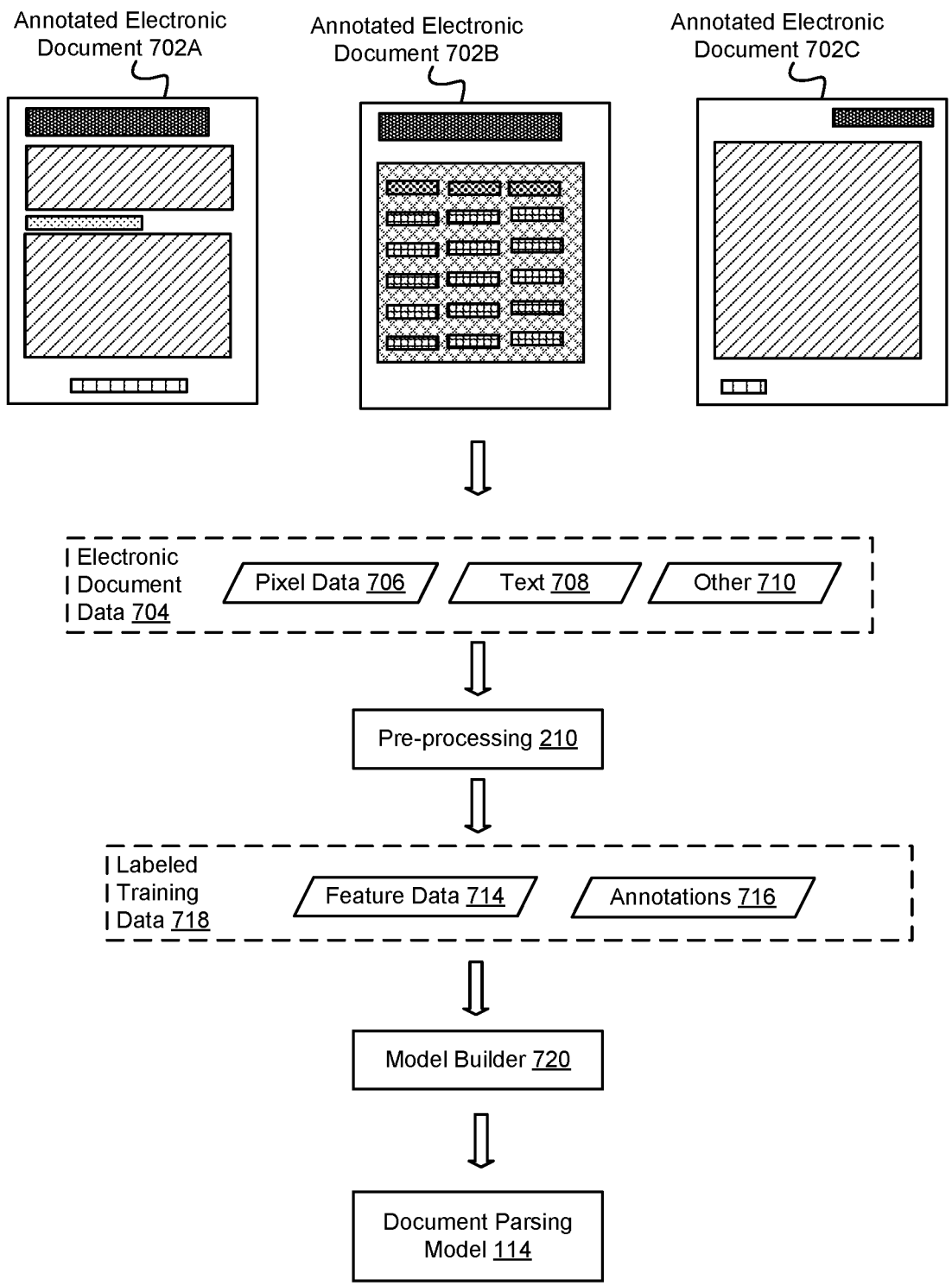
FIG. 7 is a diagram illustrating aspects of generating a document parsing model usable by the system of FIG. 1.

FIG. 7 is a diagram illustrating aspects of generating the document parsing model(s) 114 of FIG. 1. The operations described with reference to FIG. 7 may be performed by the processor(s) 104 of FIG. 1 executing instructions 110 from the memory device(s) 106. For example, the instructions 110 may include a model builder 720, as described further below, which may be executed by the processor(s) 104. Alternatively, in some implementations, the operations described with reference to FIG. 7 may be performed by another computing device, and the document parsing model(s) 114 can subsequently be provided to the computing device(s) 102 for execution.

The operations illustrated in FIG. 7 use a set of annotated electronic documents (e.g., documents 702A, 702B, 702C). Various functional regions are annotated in each of the annotated electronic documents 702. The annotations indicate boundaries of the various functional regions and a category label associated with each. The category labels indicate the function (e.g., the syntactical or structural purpose) of content within each functional region. Examples of category labels include page headers, page footers, section headings, paragraphs, tables, images, footnotes, and lists.

The annotated electronic documents 702 are stored as, include, or correspond to electronic document data 704. The electronic document data 704 includes pixel data 706, text 708, other data 710, or a combination thereof. The electronic document data 704 is provided as input to the pre-processing instructions 210 to generate feature data 714. In a particular implementation, the feature data 714 includes a vector of values representing the electronic document data 704.

The feature data 714 and data representing the annotations 716 are provided as labeled training data 718 to model builder 720. The model builder 720 is configured to perform operations to generate the document parsing model(s) 114, the NLP model(s) 116, or both. An example of the model builder 720 is described with reference to FIG. 10.

Figure 8:
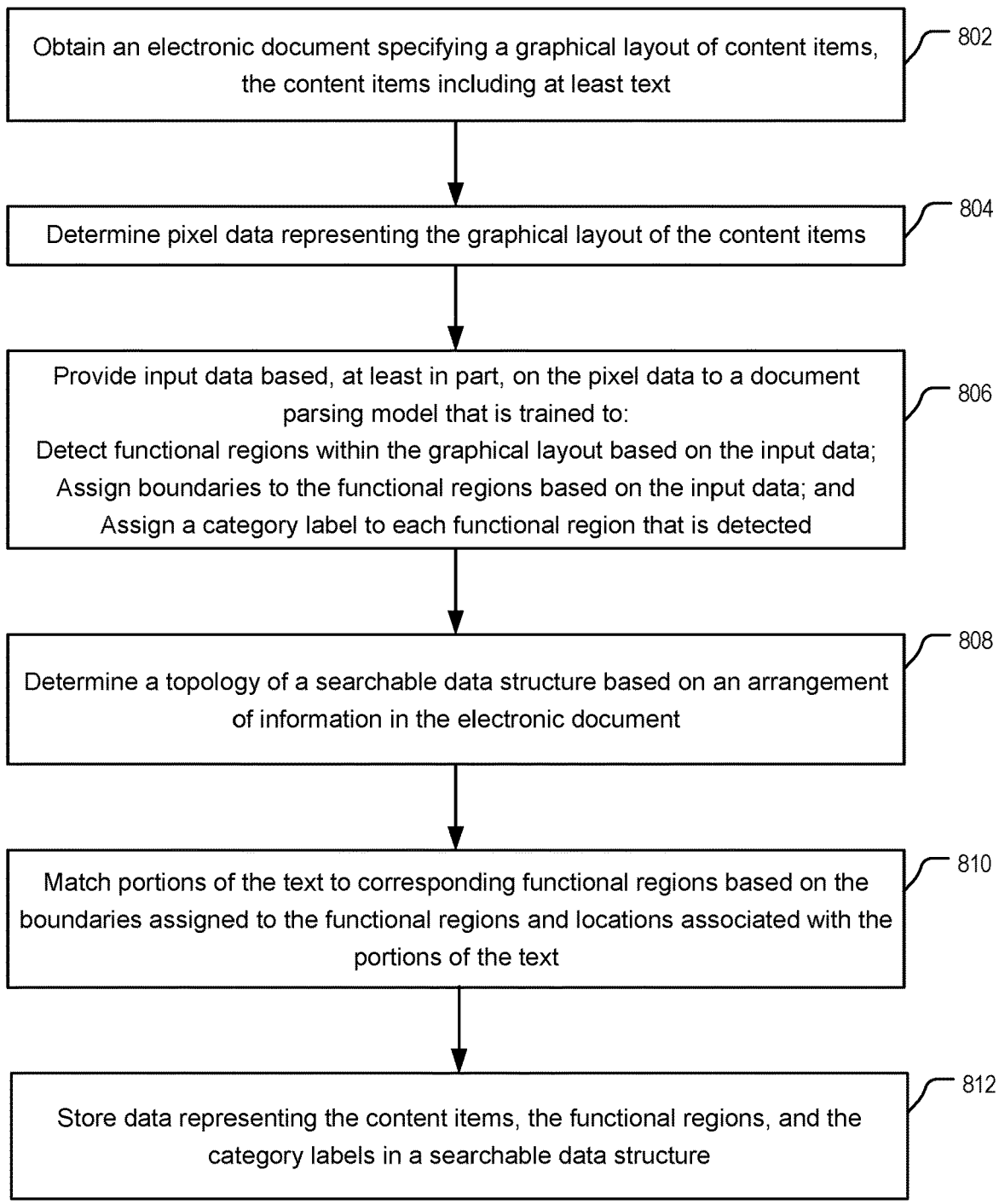
FIG. 8 is a flow chart of an example of a method that can be initiated, controlled, or performed by the system of FIG. 1.

FIG. 8 is a flow chart of an example of a method 800 that can be initiated, controlled, or performed by the system 100 of FIG. 1. The method 800 includes an example of operations that may be performed to generate the searchable data structure 130 based on an electronic document 124.

The method 800 includes, at 802, obtaining an electronic document specifying a graphical layout of content items, where the content items include at least text. For example, the electronic document data 202 representing the electronic document 124 may be accessed from the memory device(s) 106, the data repository 150, or both. The electronic document may include, for example, an image file representing a scanned document, a text editor document, a mark-up language document, a portable document format document, a spreadsheet, a document in another business office format, or a combination thereof (e.g., linked or cross-referenced files that form a single document for display).

The method 800 includes, at 804, determining pixel data representing the graphical layout of the content items. The pixel data defines a plurality of display elements to render a display of the electronic document, and each display element encodes at least one color bit representing a display color of the display element.

The method 800 includes, at 806, providing input data based, at least in part, on the pixel data to one or more of the document parsing model(s) 114. The document parsing model(s) 114 are trained to detect functional regions 134 within the graphical layout based on the input data. For example, the functional regions 134 detected by a document parsing model(s) 114 may include two or more of a page header, a page footer, a section heading, a paragraph, a table, an image, a footnote, or a list.

Additionally, the document parsing model(s) 114 are trained to assign boundaries 136 to the functional regions 134 based on the input data and to assign a category label 140 to each functional region 134 that is detected. For example, a document parsing model assigns a category label to a particular functional region based on a probabilistic analysis of the pixel data associated with the particular functional region. In a particular implementation, the input data is further based on text of the electronic document, and a document parsing model assigns category label(s) further based, at least in part, on a semantic analysis of the text.

In some implementations, the data specifying the graphical layout of the content items indicates font characteristics for particular text associated with a particular functional region, and a document parsing model assigns a particular category label to the particular functional region based on at least one of the font characteristics of the particular text or a change of the font characteristics between the particular functional region and an adjacent functional region. In some implementations, the data specifying the graphical layout of the content items indicates character spacing in particular text associated with a particular functional region, and a document parsing model assigns a particular category label to the particular functional region based on at least one of the character spacing of the particular text or a change of the character spacing between the particular functional region and an adjacent functional region. In some implementations, the data specifying the graphical layout of the content items indicates a background color associated with a particular functional region, and a document parsing model assigns a particular category label to the particular functional region based on at least one of the background color or a change in background color between the particular functional region and an adjacent functional region. In some implementations, text of a particular functional region includes one or more special characters, and a document parsing model assigns a particular category label to the particular functional region based on a determination that the one or more special characters are present in the particular function region.

In some implementations, an electronic document includes a functional region that is identified (e.g., labeled by the document parsing model(s) 114) as a table. In such implementations, one or more of the document parsing model(s) 114 may identify various portions (e.g., subregions) of the table, such as columns, rows, cells, etc. For example, a document parsing model may estimate column boundaries and row boundaries based on the input data associated with the particular functional region. A document parsing model may also determine a column heading of a column based on the text associated within the particular functional region. For example, a document parsing model may cause a natural-language processing model to determine a semantic group represented by text of the column, and the document parting model may assign the column heading based on the semantic group identified by the natural-language processing model. A document parsing model may store a portion of the text associated within the particular functional region in a first data element of the searchable data structure and store the column heading of the column in a second data element, where the first data element is subordinate to the second data element in the searchable data structure.

In some implementations, the method 800 includes, at 808, determining a topology of the searchable data structure 130 based on an arrangement of information in the electronic document 124. For example, the category labels 140 assigned by the document parsing model(s) 114 may be mapped to hierarchy data that indicates an order to be associated with various types of functional regions 134. To illustrate, the hierarchy data may indicate that a functional region labeled as a paragraph is subordinate to a functional region labeled as a section heading. In some implementations, the searchable data structure 130 has a tree structure including a plurality of leaf nodes. In such implementations, each leaf node is associated with a corresponding branch node, and the content items are assigned to nodes of the tree structure such that a hierarchy of the functional regions is represented in the tree structure.

The method 800 also includes, at 810, matching portions of the text to corresponding functional regions based on the boundaries assigned to the functional regions and locations associated with the portions of the text and, at 812, storing data representing the content items, the functional regions, and the category labels in the searchable data structure. A searchable data structure 130 formed according to the method 800 is a knowledge representation of the electronic document(s) 124 used to form the searchable data structure 130. Additionally, the searchable data structure 130 has a smaller in-memory footprint than electronic document(s) 124 and can be used to form search heuristic(s) 122 that improve information retrieval, as described further with reference to FIG. 9.

Figure 9:
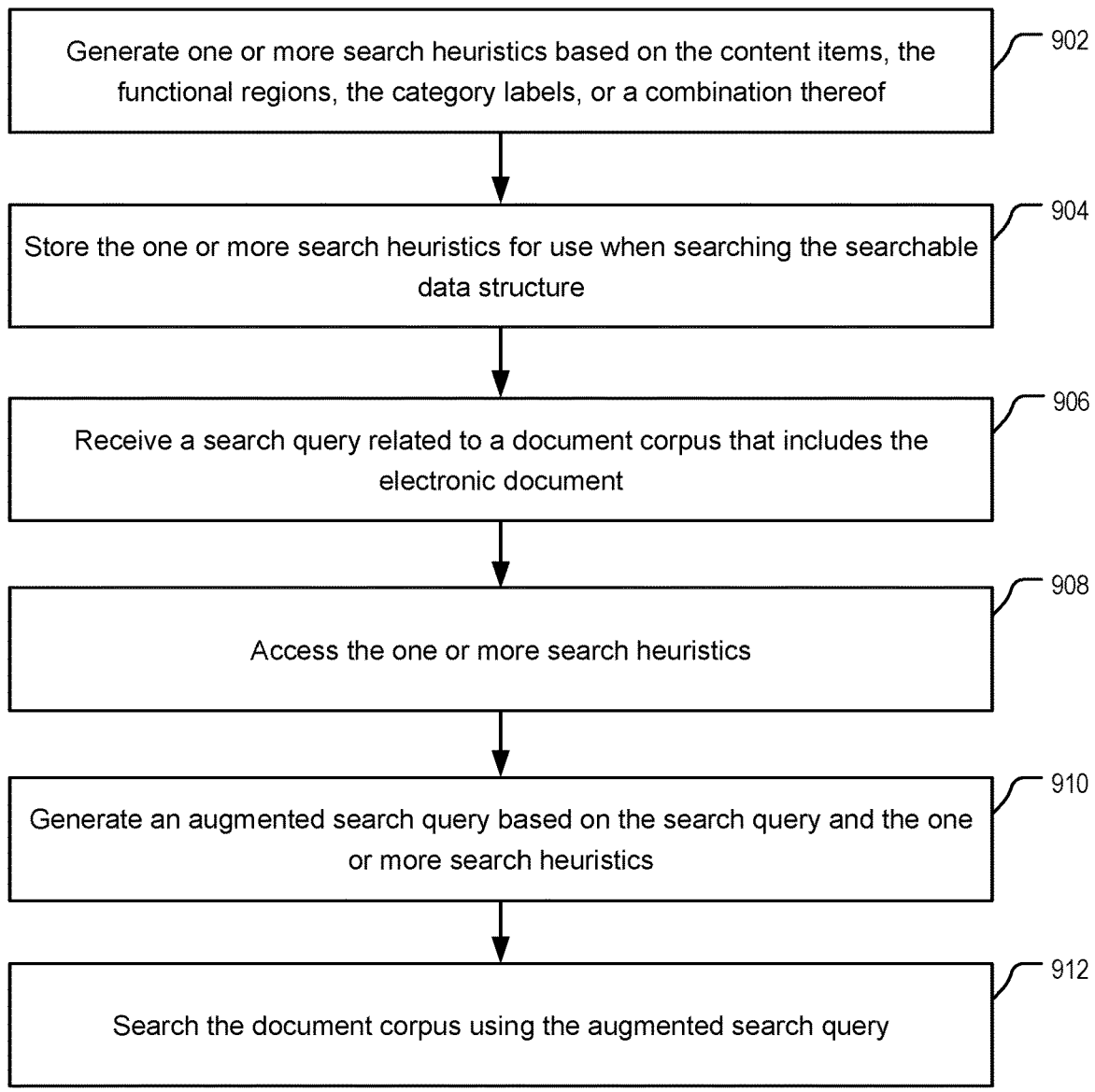
FIG. 9 is a flow chart of another example of a method that can be initiated, controlled, or performed by the system of FIG. 1.

FIG. 9 is a flow chart of another example of a method 900 that can be initiated, controlled, or performed by the system of FIG. 1. The method 900 includes an example of operations that may be performed to facilitate information retrieval from a searchable data structure 130 based on a document corpus (e.g., a collection of electronic documents).

The method 900 includes, after storing data in the searchable data structure, such as the searchable data structure 130 of FIG. 1, generating one or more search heuristics based on the content items, the functional regions, the category labels, or a combination thereof, at 902. For example, a rule of the one or more search heuristics may indicate a data path to retrieve particular information.

The method 900 also includes, at 904, storing the search heuristic(s) for use when searching the searchable data structure. For example, the search heuristic(s) 122 may a search query or search terms or search results and a data path that was used to retrieve information sought by the search query.

After storing the search heuristic(s), the method 900 includes, at 906, receiving a search query related to the document corpus and, at 908, accessing the search heuristic(s). The method 900 further includes, at 910, generating an augmented search query based on the search query and the search heuristic(s) and, at 912, searching the document corpus using the augmented search query. For example, the search query may be augmented by addition of a relevant data path to the search query or to a portion of the search query.

Figure 10:
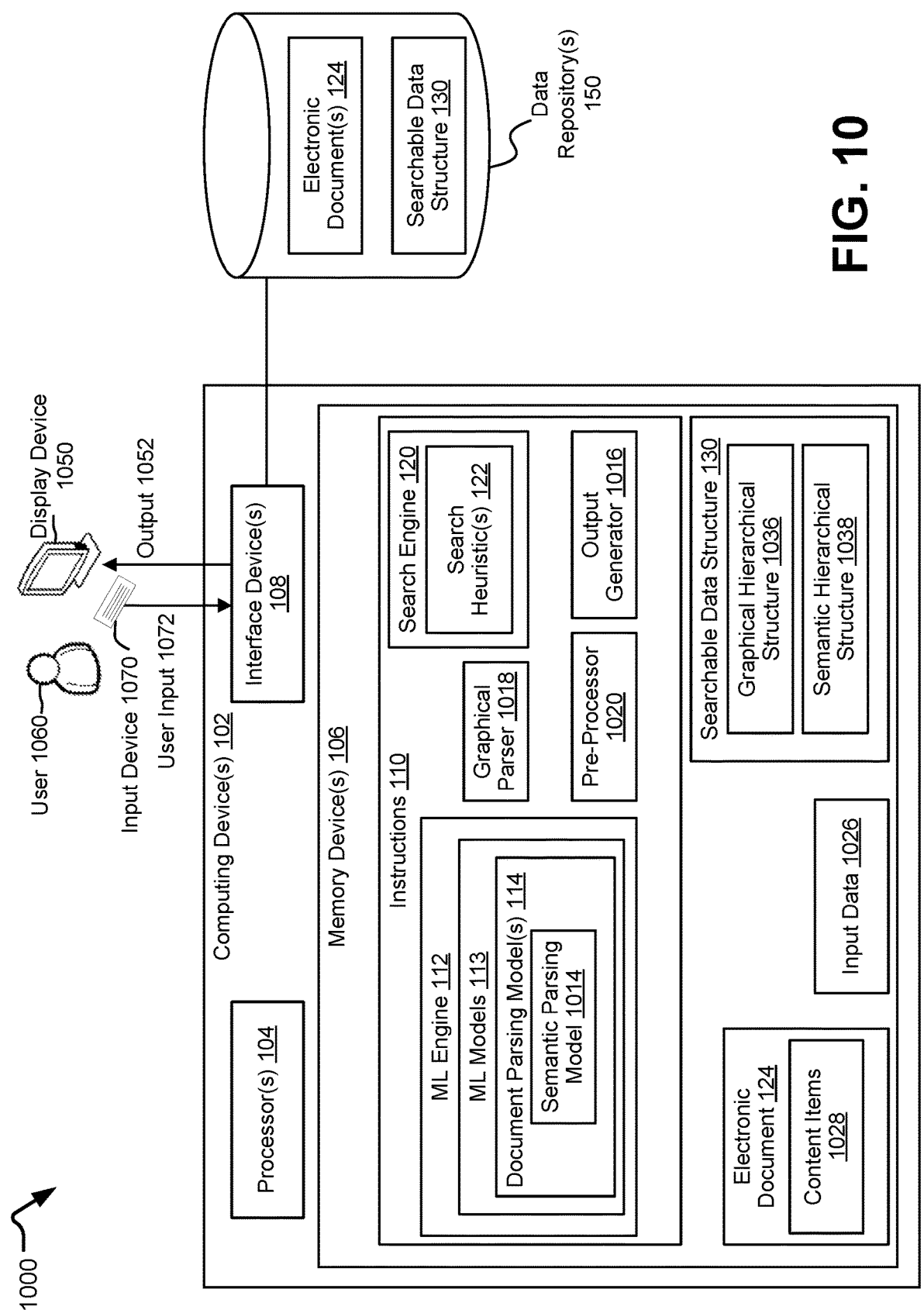
FIG. 10 is a block diagram of another example of a system configured to generate a searchable data structure based on one or more electronic documents.

Referring to FIG. 10, a system 1000 configured to generate a searchable data structure 130 based on one or more electronic documents 124 is shown. In a particular aspect, the system 100 of FIG. 1 includes one or more components of the system 1000.

The processor(s) 104 are coupled to the interface device(s) 108 to receive user input 1072 from an input device 1070, provide an output 1052 to a display device 1050, or both. In a particular aspect, the input device 1070 includes a keyboard, a touchscreen, a mouse, a microphone, or another type of input device. In a particular aspect, the display device 1050 includes a display screen, a monitor, a user device, or a combination thereof. The input device 1070 and the display device 1050 are external to the computing device 102 as an illustrative example. In other examples, the input device 1070, the display device 1050, or both, can be integrated in the computing device 102.

In the example illustrated in FIG. 10, the one or more document parsing models 114 include a semantic parsing model 1014. The semantic parsing model 1014 includes or corresponds to a trained model, such as a perceptron, a neural network, a support vector machine, a decision tree, a prototypical network for few-shot learning, an autoencoder, a random forest, a regression model, a Bayesian model, a naive Bayes model, a Boltzmann machine, deep belief networks, a convolutional neural network, another machine-learning model, or an ensemble, variant, or other combination thereof.

The instructions 110 are configured to execute a graphical parser 1018, a pre-processor 1020, or both, to process an electronic document 124. The electronic document 124 includes content items 1028, for example, text, graphics, a blank space, a picture, a punctuation, a line, a number, etc. For certain types of electronic documents, such as pdf documents or image files (e.g., scanned documents), the content items 1028 are represented by pixel data. Some pdf documents and many other types of documents also directly encode the text. To illustrate, markup language documents, such as HTML documents, may include text as well as descriptors of layout information, such as font characteristics, spacing, colors, graphical elements (e.g., line, images, icons, etc.), and so forth.

In some examples, the electronic document 124 includes a character listing of characters in the electronic document 124. In some examples, the graphical parser 1018 generates the character listing of the electronic document 124. As used herein, a "character listing" refers to an ordered list of characters that are included in the electronic document 124.

The graphical parser 1018 is configured to process the electronic document 124 to generate a graphical hierarchical structure 1036 indicating a graphical layout of the content items 1028 of the electronic document 124, as further described with reference to FIGS. 12A-13. For example, the graphical parser 1018 is trained to detect graphical regions of the electronic document 124, to assign boundaries (e.g., bounding boxes) to the graphical regions, and to assign a graphical region category label to each graphical region that is detected. In a particular aspect, a graphical region category label includes an identifier of a graphical region and indicates that the graphical region corresponds to a text box, a text line, a picture, a vertical line, a horizontal line, a curve, etc.

As used herein, a "graphical region" refers to a rectangular portion of an electronic document that includes one or more content items and that is distinct from one or more other portions of the electronic document in a manner that provides a contextual cue that the different portions include content that is grouped together. In particular implementations, graphical regions are distinguished by context cues, such as typographic information (e.g., font size, font color, font position, other font characteristics, text alignment, or line spacing), position on a page, white space or blank regions on the page, background color, etc. To illustrate, a paragraph of text may form a first graphical region that is distinguished from a table by a change in text format between text of the paragraph and text of the table.

In some implementations, changes or differences in context cues between adjacent portions of the electronic document 124 indicate that content items of the adjacent portions are not grouped together. To illustrate, a change in font characteristics, a change in character spacing, or a change in background color between two adjacent regions of the electronic document may indicate that the adjacent regions are distinct graphical regions. Such differences can also be used to determine a category label associated with each of the adjacent graphical regions. To illustrate, a first graphical region, such as a text box, may have text that includes one or more words organized as a single block of text. A second graphical region, such as a table, may have aligned columns and rows of text. In some aspects, a graphical region may be nested within another graphical region. For example, a first graphical region, such as a table, may include a second graphical region, such as a text box that includes a word in a cell of the table.

In a particular aspect, the graphical parser 1018 generates character index selectors of the graphical regions. As used herein, a "character index selector of a region" refers to one or more ranges of character indices in the character listing of characters that are included in the region. For example, a character index selector of a graphical region indicates one or more ranges of character indices of the character listing of characters that are included in the graphical region, as further described with reference to FIG. 13. The graphical hierarchical structure 1036 indicates the graphical region category labels, the bounding boxes, and the character index selectors of the graphical regions representing the graphical layout of the electronic document 124.

As used herein, a "semantic region" refers to a portion of an electronic document that includes one or more content items and that is distinct from one or more other portions of the electronic document in a manner that provides a contextual cue that the different portions include different types of content or are intended to convey different types of information. In a particular aspect, a semantic region can include a section heading, a sub-section heading, a paragraph, a footnote, a table, a row, a column, etc. In particular implementations, the semantic regions are distinguished by context cues, such as text format (e.g., font size, font color, font position, other font characteristics, text alignment, or line spacing), position on a page, white space or blank regions on the page, background color, etc. To illustrate, one or more paragraphs of text with similar formatting may form a first semantic region that is distinguished from a table by a change in text format between text of the paragraphs and text of the table.

In some implementations, changes or differences in context cues between adjacent portions of the electronic document 124 indicate semantic differences between the adjacent portions. To illustrate, a change in font characteristics, a change in character spacing, or a change in background color between two adjacent regions of the electronic document may indicate that the adjacent regions are distinct semantic regions. Such differences can also be used to determine a semantic region category label associated with each of the adjacent semantic regions. To illustrate, a first semantic region, such as a paragraph of text, may have text of a first size, with first character spacing, first alignment, and first font characteristics (e.g., not bold); whereas, an adjacent second semantic region, such as a section heading, may have text of a second size, with second character spacing, second alignment, and/or second font characteristics (e.g., bold).

The pre-processor 1020 is configured to process the electronic document 124 based on the graphical hierarchical structure 1036 to generate input data 1026, as further described with reference to FIGS. 14-17. For example, the instructions 110 execute an encoder to generate word embeddings representing words in the electronic document 124, as further described with reference to FIG. 15. In a particular aspect, the instructions 110 execute a cell analyzer to apply a uniform grid to the electronic document 124 to divide the electronic document 124 into equal-sized cells. In some examples, a cell at least partially covers one or more content items of the content items 1028. The pre-processor 1020 generates the input data 1026 indicating features of a portion of the electronic document 124 that is covered by a cell, such as typographic information of the one or more content items, blank space included in the portion, etc. The input data 1026 also includes a word embedding of a word that is at least partially included in the cell. The input data 1026 also includes position information of the word. In some aspects, the position information of the word is determined based at least in part on a location of the cell that includes at the least a portion of the word.

The semantic parsing model 1014 is configured to process the input data 1026 to generate a semantic hierarchical structure 1038 indicating a semantic layout of the content items 1028 of the electronic document 124, as further described with reference to FIGS. 18A-19. For example, the semantic parsing model 1014 is trained to detect semantic regions of the electronic document 124 based on input data 1026, and to assign a semantic region category label to each semantic region that is detected. The semantic hierarchical structure 1038 includes at least the semantic region category labels and character index selectors of the semantic regions. For example, a character index selector of a semantic region indicates one or more ranges of character indices of the character listing of characters that are included in the semantic region. The searchable data structure 130 includes the graphical hierarchical structure 1036, the semantic hierarchical structure 1038, or both.

In some implementations, an output generator 1016 is configured to generate the searchable data structure 130 based on user input 1072. For example, a user 1060 provides a user input 1072 (a first user input) via the input device 1070 to generate the searchable data structure 130 for the electronic document 124. In a particular aspect, responsive to the user input 1072, the graphical parser 1018 processes the electronic document 124 to generate the graphical hierarchical structure 1036, the pre-processor 1020 processes the electronic document 124 based on the graphical hierarchical structure 1036 to generate the input data 1026, the semantic parsing model 1014 processes the input data 1026 to generate the semantic hierarchical structure 1038, or a combination thereof. The output generator 1016 generates an output 1052 based on the graphical hierarchical structure 1036, the input data 1026, the semantic hierarchical structure 1038, or a combination thereof, and provides the output 1052 to the display device 1050. For example, the output 1052 indicates a mapping between words detected in the electronic document 124 and cells that are detected as at least partially including the words.

In some implementations, the output generator 1016 is configured to update the semantic hierarchical structure 1038 based on user input 1072. For example, the output generator 1016 receives a user input 1072 (e.g., a second user input) responsive to providing the output 1052 to the display device 1050. To illustrate, the user input 1072 indicates that a first word has been incorrectly detected as a second word, that the first word is at least partially included in one or more cells, that a location of the first word in the electronic document 124 is indicated by word position information, that a graphical region of the graphical hierarchical structure 1036 includes the first word, or a combination thereof. The output generator 1016 updates the input data 1026 based on the user input 1072 (e.g., the second user input). For example, the output generator 1016 updates the input data 1026 based on the one or more cells that include the first word, the word position information of the first word, a word embedding of the first word, the word position information of the first word, the graphical region that includes the first word, or a combination thereof. The output generator 1016 uses the semantic parsing model 1014 to process the input data 1026 (e.g., the updated input data) to generate at least one updated semantic region category label of an updated semantic region that includes the first word, and updates, based at least in part on the at least one updated semantic region category label, the semantic hierarchical structure 1038 to include a node representing the updated semantic region.

In some implementations, the semantic parsing model 1014 is trained using a supervised learning technique. For example, a set of electronic documents and associated graphical hierarchical structures are used as supervised training data to train the semantic parsing model 1014. Various semantic regions are identified (e.g., annotated) in the set of electronic documents for training. For example, the annotations associated with the set of electronic documents may indicate character index selectors of the various semantic regions and a semantic region category label associated with each.

The pre-processor 1020 generates input data 1026 based on the set of electronic documents and the graphical hierarchical structures. The semantic parsing model 1014 designates the semantic regions, generates character index selectors of the semantic regions, and assigns semantic region category labels to the semantic regions, based on an analysis of the input data associated with the set of electronic documents. In a particular aspect, a loss function is determined based on a comparison of annotations of the set of electronic documents and the character index selectors and the semantic region category labels generated by the semantic parsing model 1014. The pre-processor 1020, the semantic parsing model 1014, or both, are trained (e.g., updated) based on the loss function.

In some implementations, the processor(s) 104 determine a topology of the graphical hierarchical structure 1036 based on the content items 1028, the character index selectors, the graphical region category labels, or a combination thereof, associated with the graphical regions. In some implementations, the processor(s) 104 determine a topology of the semantic hierarchical structure 1038 based on the content items 1028, the character index selectors, the semantic region category labels, or a combination thereof, associated with the semantic regions.

In this context, the "topology" of a hierarchical structure (e.g., the graphical hierarchical structure 1036 or the semantic hierarchical structure 1038) refers to the number, type, and arrangement of data elements (e.g., nodes) and interconnections between data elements. For example, in a particular implementation, the graphical hierarchical structure 1036, the semantic hierarchical structure 1038, or both, have a hierarchical topology, such as a tree or graph structure, in which certain data elements are linked in an ordered arrangement with other data elements.

In one or more examples, the order of the hierarchy of the topology of the graphical hierarchical structure 1036 is determined based on the arrangement of the content items 1028 in the graphical layout of the electronic document(s) 124. As a particular example, the graphical hierarchical structure 1036 may include a tree structure having a plurality of leaf nodes. In this example, each leaf node is associated with a corresponding branch node, and the content items 1028 of the electronic document(s) 124 are assigned to nodes of the tree structure such that a hierarchy of the graphical regions is represented in the tree structure.

In one or more examples, the order of the hierarchy of the topology of the semantic hierarchical structure 1038 is determined based on the arrangement of the content items 1028 in the semantic layout of the electronic document(s) 124. As a particular example, the semantic hierarchical structure 1038 may include a tree structure having a plurality of leaf nodes. In this example, each leaf node is associated with a corresponding branch node, and the content items 1028 of the electronic document(s) 124 are assigned to nodes of the tree structure such that a hierarchy of the semantic regions is represented in the tree structure.

As one example, a structured electronic document 124 may include pages of text related to different topics. The various topics may be indicated by section headings, and a section heading may precede text associated with a particular topic indicated by the section heading. In this example, the topology of the graphical hierarchical structure 1036 is determined based on which graphical regions category labels are assigned to the graphical regions of the electronic document 124 and the graphical layout of the graphical regions. For example, if the graphical parser 1018 assigns a first text box category label to a first graphical region and assigns a second text box category label to a second graphical region that is included in the same page as the first graphical region, the topology of the graphical hierarchical structure 1036 is arranged such that a node associated with the page is coupled to a first sub-node associated with the first graphical region and to a second sub-node associated with the second graphical region. As another example, if the semantic parsing model 1014 assigns a section heading category label to a first semantic region and a sub-section heading category label to a second semantic region that is adjacent to and subsequent to the first semantic region, the topology of the semantic hierarchical structure 1038 is arranged such that a node associated with the first semantic region is coupled to a sub-node associated with the second semantic region.

In some implementations, a node of the semantic hierarchical structure 1038 representing a semantic region includes mapping data that maps the semantic region to one or more nodes of the graphical hierarchical structure 1036. In some implementations, a node of the graphical hierarchical structure 1036 representing a graphical region includes mapping data that maps the graphical region to one or more nodes of the semantic hierarchical structure 1038.

The processor(s) 104 store data representing the graphical hierarchical structure 1036, the semantic hierarchical structure 1038, or both, of the searchable data structure 130. In some implementations, content items, such as text, images, graphics, etc., associated with a particular graphical region are stored in the node of the graphical hierarchical structure 1036 that is mapped to the particular graphical region. The searchable data structure 130 thus encodes a knowledge representation derived from the graphical layout of the electronic documents 124 without retaining the detailed graphical layout itself. As a result, the searchable data structure 130 has a smaller in-memory footprint than the electronic document 124 but retains information explicitly and implicitly represented in the electronic document 124.

In some examples, the one or more processors 104 provide the graphical hierarchical structure 1036, the semantic hierarchical structure 1038, or both, as input to one or more document processing applications. In some aspects, at least one of the document processing applications is integrated in the computing device 102. In some aspects, at least one of the document processing applications is external to the computing device 102.

In a particular example, the system 1000 includes the search engine 120 as an example of a document processing application. The search engine 120 includes instructions that are executable by the processor(s) 104 to find and retrieve information from the searchable data structure 130 (or from the electronic document(s) 124 based on information within the searchable data structure 130). The search engine 120 is also configured to generate and/or use one or more search heuristics 122 to improve information retrieval. For example, the search heuristic(s) 122 may be used to augment a search query received from a user.

As one example, the search engine 120 receives user input 1072 from the user 1060 corresponding to a search request indicating a semantic region category (e.g., "retrieve second paragraph of Chapter 1"). The search engine 120, based at least in part on determining that the semantic region category matches a semantic region category label (e.g., "paragraph") assigned to a semantic region indicated by the semantic hierarchical structure 1038, selects one or more graphical regions indicated by the graphical hierarchical structure 1036 that correspond to the semantic region. In an illustrative example, the "second paragraph of Chapter 1" corresponds to a first graphical region near the end of a first page and a second graphical region near the beginning of a second page, and the search engine 120 selects the first graphical region and the second graphical region. The search engine 120 generates a result based on the one or more graphical regions. For example, the result indicates one or more content items included in the one or more graphical regions. The search engine 120 provides the result as an output 1052 to the display device 1050.

In some aspects, the searchable data structure 130 has a smaller in-memory footprint than the electronic document(s) 124 it is based on. Additionally, the searchable data structure 130 facilitates information retrieval. For example, the searchable data structure 130 may store information from the electronic document(s) 124 in a hierarchical and/or interconnected manner that enables use of semantic-based searches to retrieve information from the electronic documents 124.

Figure 11:
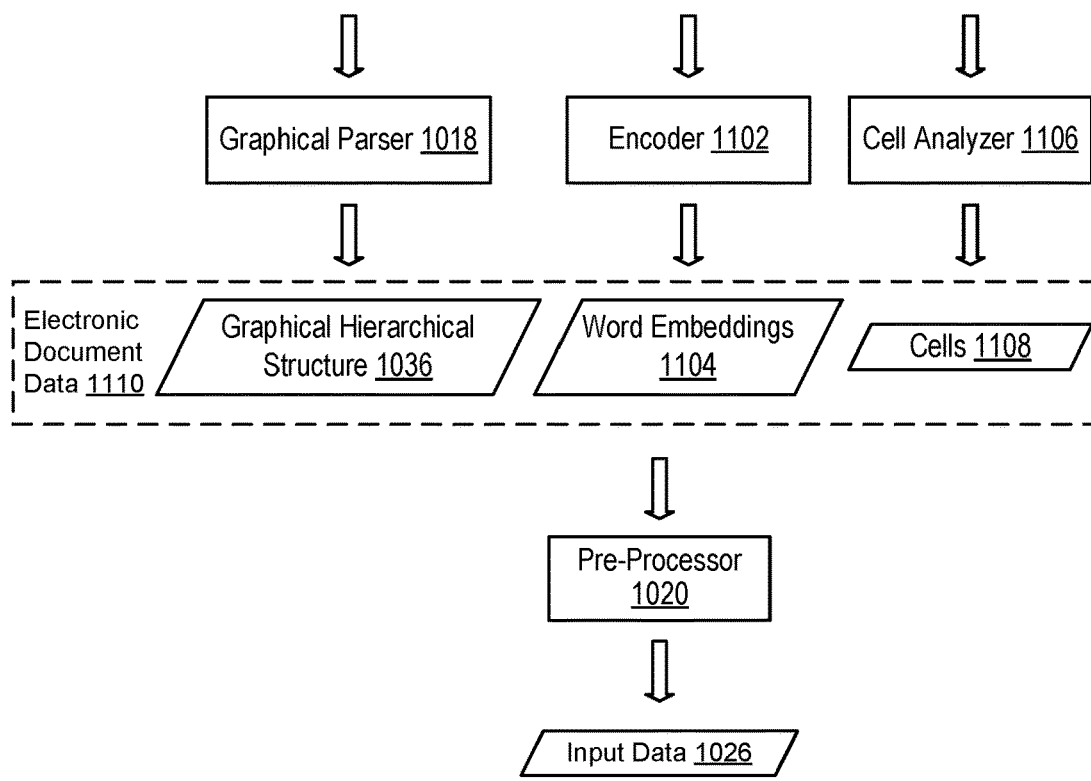
FIG. 11 is a diagram illustrating aspects of generation of a searchable data structure based on one or more electronic documents according to a particular implementation of the system of FIG. 10.

FIG. 11 is a diagram illustrating aspects of generation of the searchable data structure 130 based on one or more electronic documents 124 according to a particular implementation of the system 1000 of FIG. 10. One or more of the operations described with reference to FIG. 11 may be performed by the processor(s) 104 of FIG. 10 executing the instructions 110.

The diagram illustrated in FIG. 11 show one example of generating the input data 1026 for the semantic parsing model 1014 of FIG. 10 based on an electronic document 124. For convenience of illustration, only two pages (e.g., a page 1122 and a page 1124) of one electronic document 124 (e.g., including excerpts from a translation by Ian Johnson of *Metamorphosis*, a novella written by Franz Kafka) are shown in FIG. 11; however, the electronic document(s) 124 may include more than one document and each document may include more than one page. Additionally, the electronic document 124 illustrated in FIG. 11 is formatted to include examples of different types of graphical regions and different types of semantic regions. Other pages of the electronic document 124 and other electronic documents may include more, fewer, or different types of graphical regions, semantic regions, or a combination thereof. Further, FIG. 11 illustrates one example of how various graphical regions may be distinguished in a graphical layout of content items and how various semantic regions may be distinguished in a semantic layout of content items. In other examples, the graphical regions, the semantic regions, or both, may be distinguished in other ways. To illustrate, the page 1124 of the electronic documents 124 of FIG. 11 includes information arranged in a table that has gridlines; however, another page of the electronic document 124 or a different electronic document may include information arranged in a table that does not have gridlines.

In FIG. 11, the electronic document 124 is processed to generate electronic document data 1110. For example, the graphical parser 1018 processes the electronic document 124 to generate a graphical hierarchical structure 1036, as further described with reference to FIGS. 12A-13. An encoder 1102 processes the electronic document 124 to generate one or more word embeddings 1104, as further described with reference to FIG. 14. A cell analyzer 1106 processes the electronic document 124 to generate a plurality of cells 1108, as further described with reference to FIG. 15. The electronic document data 1110 includes (e.g., indicates) the graphical hierarchical structure 1036, the word embeddings 1104, the cells 1108, or a combination thereof.

The pre-processor 1020 processes the electronic document data 1110 to generate the input data 1026, as further described with reference to FIG. 16. In a particular aspect, the input data 1026 corresponds to the input data 126 of FIG. 1. As one example, the pre-processor 1020 may generate the input data 1026 as a vector of values encoding all of, or a portion of, the graphical hierarchical structure 1036, the word embeddings 1104, data representative of the cells 1108, or a combination thereof.

Figure 12A:
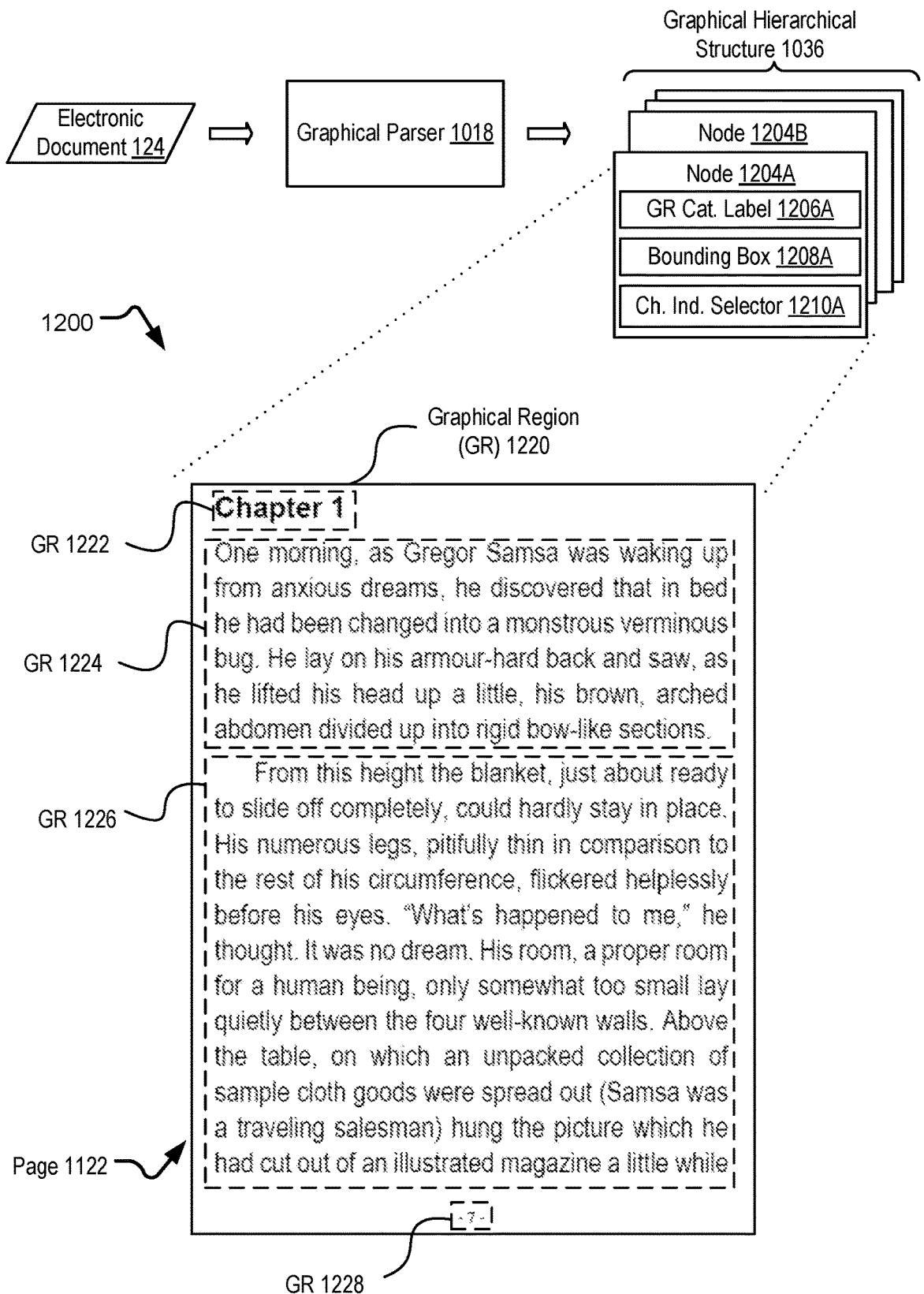
FIG. 12A is a diagram illustrating aspects of generation of a graphical hierarchical structure of a searchable data structure based on one or more electronic documents according to a particular implementation of the system of FIG. 10.
Figure 12B:
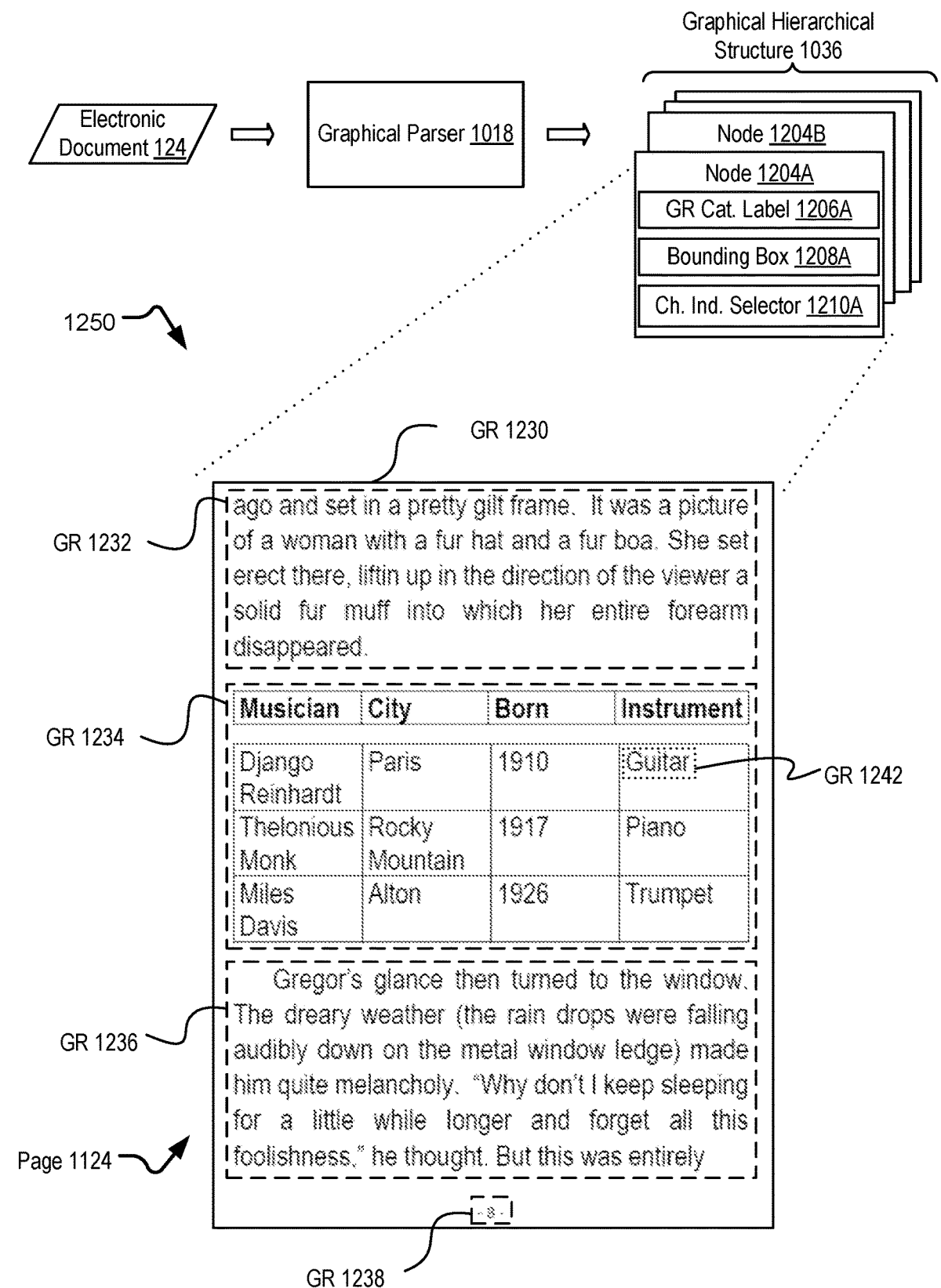
FIG. 12B is a diagram illustrating aspects of generation of a graphical hierarchical structure of a searchable data structure based on one or more electronic documents according to a particular implementation of the system of FIG. 10.
Figure 13:
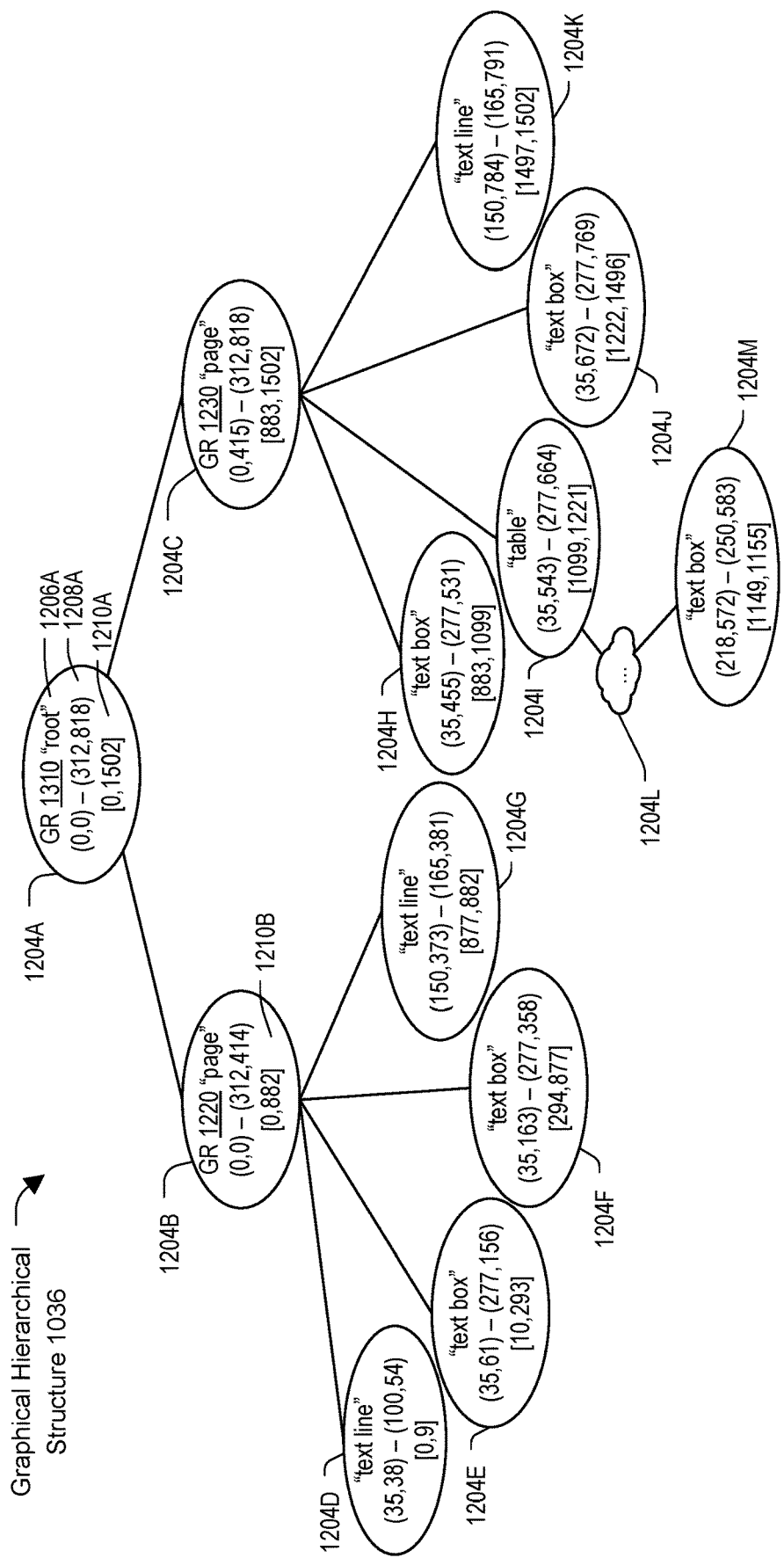
FIG. 13 is a diagram illustrating at least a portion of a graphical hierarchical structure of a searchable data structure according to a particular implementation of the system of FIG. 10.

FIGS. 12A, 12B, and 13 together illustrate aspects of generation of the graphical hierarchical structure 1036 of the searchable data structure 130 based on the electronic document(s) 124 according to a particular implementation of the system 1000 of FIG. 10. The example illustrated in FIG. 12A includes a diagram illustrating various graphical regions of the page 1122, FIG. 12B includes a diagram illustrating various graphical regions of the page 1124, and FIG. 13 illustrates an example of a graphical hierarchical structure 1036 based on the graphical regions of the page 1122 and the page 1124.

FIG. 12A is a diagram illustrating aspects of generation of the graphical hierarchical structure 1036 of the searchable data structure 130 based on the electronic document(s) 124 according to a particular implementation of the system 1000 of FIG. 10. The diagram illustrated in FIG. 12A shows an example of the graphical hierarchical structure 1036 generated by the graphical parser 1018 including a plurality of nodes 1204, such as a node 1204A, a node 1204B, one or more additional nodes, or a combination thereof. A node 1204 represents a graphical region (GR) of an electronic document 124.

FIG. 12A includes a diagram 1200 illustrating an example of the page 1122 of the electronic document 124 with various graphical regions identified. In a particular aspect, the page 1122 corresponds to a graphical region (GR) 1220. In the diagram 1200, each graphical region within the GR 1220 is denoted by a dashed line indicating a boundary of the graphical region. For example, in the diagram 1200, the graphical region 1220 includes a plurality of graphical sub-regions, such as a graphical region 1222 (e.g., a line of text), a graphical region 1224 (e.g., a text box), a graphical region 1226 (e.g., a text box), and a graphical region 1228 (e.g., a line of text).

In some aspects, a particular node 1204 of the graphical hierarchical structure 1036 represents a particular GR of the particular electronic document 124, as further described with reference to FIG. 13. For example, the node 1204A represents a graphical region corresponding to the electronic document 124, the node 1204B represents the GR 1220 corresponding to the page 1122, and so on.

Each of the nodes 1204 includes data representing a corresponding graphical region. For example, the node 1204A includes a GR category (cat.) label 1206A, data representing a bounding box 1208A, a character index selector 1210A, or a combination thereof, of the GR representing the electronic document 124, as further described with reference to FIG. 13. For example, the GR category label 1206A (e.g., "root") indicates that the GR represents the entirety of the electronic document 124. The bounding box 1208A indicates a location of a geographical region bounding box that includes all the content items 1028 of the electronic document 124. The character index selector 1210A indicates a range of character indices of the character listing that includes all characters of the electronic document 124. For example, the character index selector 1210A indicates a range from a first character index (e.g., 0) that represents an initial character in the character listing of the electronic document 124 to a second character index that represents a last character in the character listing of the electronic document 124.

FIG. 12B includes a diagram 1250 illustrating an example of the page 1124 of the electronic document 124 with various graphical regions identified. In a particular aspect, the page 1124 corresponds to a GR 1230. In the diagram 1250, each graphical region within the GR 1230 is denoted by a dashed line indicating a boundary of the graphical region. For example, in the diagram 1250, the GR 1230 includes a plurality of graphical sub-regions, such as a graphical region 1232 (e.g., a text box), a graphical region 1234 (e.g., a table), a graphical region 1236 (e.g., a text box), and a graphical region 1238 (e.g., a line of text).

In some implementations, one or more sub-regions of certain types of graphical regions may also be identified and associated with boundaries. For example, in FIG. 12B, a GR 1242 (e.g., a text box) is associated with a boundary indicated by a dotted line. In some aspects, the GR 1242 (e.g., a table cell) is a sub-region of the GR 1234 (e.g., a table).

Although FIGS. 12A-12B illustrate examples of particular types (e.g., root, text line, text box, and table) of graphical regions, the electronic document(s) 124 can include different or fewer types of graphical regions. Examples of other types of graphical regions include images, lines, figures, etc.

FIG. 13 represents the graphical hierarchical structure 1036 as a connected graph or tree structure including multiple nodes. Each node is either a branch node having one or more subordinate nodes or a leaf node having no subordinate nodes. Each node is associated with or stores one or more content items (e.g., text, embedded images, etc.) that are included in a graphical region of the electronic document 124.

In the example illustrated in FIG. 13, the graphical hierarchical structure 1036 includes a node 1204A (e.g., a branch node) that represents a GR 1310 that includes the entire electronic document 124 (also referred to as a root node). The node 1204A includes the GR category label 1206A, data representing the bounding box 1208A, the character index selector 1210A, or a combination thereof. In a particular aspect, the GR category label 1206A (e.g., "root") indicates that the node 1204A represents the GR 1310 that includes the electronic document 124.

The node 1204A indicates that the GR 1310 includes the content items 1028 that are included in the bounding box 1208A. In some examples, the bounding box 1208A includes a rectangular bounding box with a top-left vertex represented by first vertex coordinates (e.g., (0, 0)) and a bottom-right vertex represented by second vertex coordinates (e.g., (312, 818)). In a particular aspect, vertex coordinates include a horizontal axis (e.g. x-axis) pixel coordinate and a vertical axis (e.g., y-axis) pixel coordinate. For example, the first vertex coordinates (e.g., (0,0)) of the bounding box 1208A correspond to the top-left pixel of the electronic document 124, and the second vertex coordinates of the bounding box 1208A correspond to the bottom-right pixel (e.g., (312, 818)) of the electronic document 124.

The bounding box 1208A represented by the top-left vertex and the bottom-right vertex is provided as an illustrative example. In other examples, the bounding box 1208A can be represented by a top-right vertex and a bottom-left vertex. In a particular aspect, the bounding box 1208A can have a non-rectangular shape, such as an ellipse, a triangle, another type of polygon, etc.

In the example illustrated in FIG. 13, a character listing of the electronic document 124 includes 1503 characters (e.g., letters, numbers, punctuation, white space, or a combination thereof). The character index selector 1210A indicates a range of character indices from a first character index (e.g., 0) representing an initial character in the character listing to a second character index (e.g., 1502) representing a last character in the character listing.

In the example illustrated in FIG. 13, the node 1204A is coupled to subordinate nodes (e.g., child nodes) corresponding to pages of the electronic document 124. For example, a first level of subordinate nodes represent pages of the electronic document 124. To illustrate, the node 1204A is coupled to a node 1204B and a node 1204C representing the page 1122 and the page 1124, respectively. In some examples, a second level of subordinate nodes represents graphical regions of a corresponding page. For example, the node 1204B is coupled to a node 1204D, a node 1204E, a node 1204F, and a node 1204G representing the GR 1222 (e.g., text line), the GR 1224 (e.g., text box), the GR 1226 (e.g., text box), and the GR 1228 (e.g., text line), respectively, that are included in the GR 1220 corresponding to the page 1122. As another example, the node 1204C is coupled to a node 1204H, a node 1204I, a node 1204J, and a node 1204K representing the GR 1232 (e.g., text box), the GR 1234 (e.g., table), the GR 1236 (e.g., text box), and the GR 1238 (e.g., text line), respectively, that are included in the GR 1230 corresponding to the page 1124. In some examples, one or more subordinate nodes may include additional subordinate nodes. For example, the node 1204I corresponding to the GR 1234 (e.g., table) is coupled to one or more levels of subordinate nodes corresponding to rows of the table, columns of the table, text lines in the table, text boxes in the table, etc. To illustrate, the node 1204I is coupled via one or more intermediate nodes 1204L to a node 1204M representing the GR 1242 (e.g., text box) corresponding to text included in a table cell.

In a particular aspect, the subordinate nodes are ordered to represent an order of the corresponding graphical regions in the electronic document 124. For example, the node 1204B is prior to the node 1204C in the graphical hierarchical structure 1036 indicating that the GR 1220 is prior to the GR 1230 in the electronic document 124.

FIG. 13 represents an example of the graphical hierarchical structure 1036 formatted as a tree or graph. In other implementations, other hierarchical arrangements of data may be used. In a particular implementation, the topology of the graphical hierarchical structure 1036 is determined based on the GR category labels assigned by the graphical parser 1018 of FIG. 10. For example, the graphical hierarchical structure 1036 illustrated in FIG. 13 includes two branch nodes coupled to the node 1204A because the electronic document 124 includes two pages. If the electronic document 124 includes seven pages, the graphical hierarchical structure 1036 of FIG. 13 would include seven branch nodes coupled to the node 1204A. As another example, the page 1122 includes 4 graphical regions, and as a result, the node 1204B of the graphical hierarchical structure 1036 includes 4 subordinate nodes corresponding to the 4 graphical regions detected in the page 1122.

Figure 14:
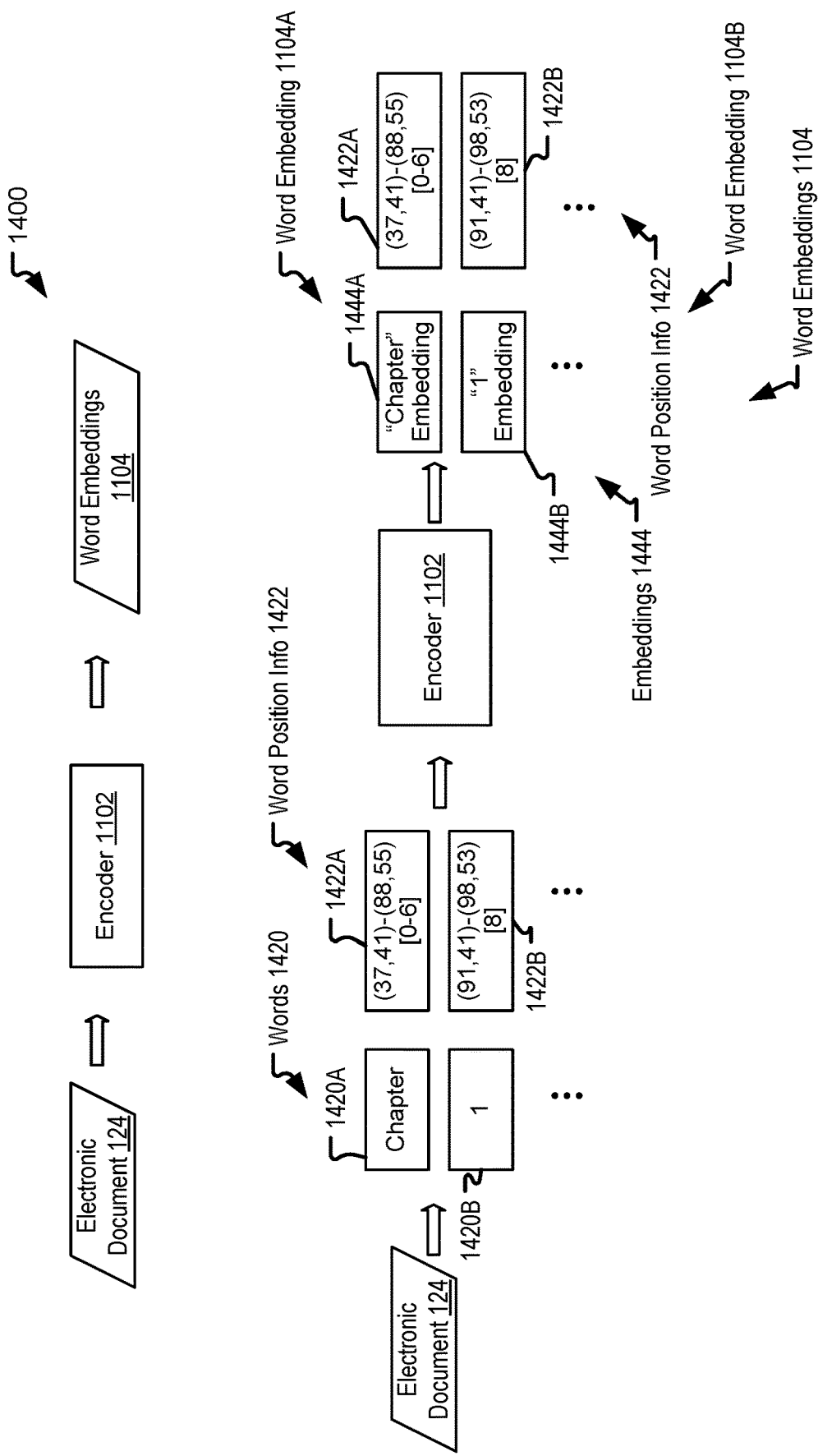
FIG. 14 is a diagram illustrating aspects of generation of word embeddings usable by the system of FIG. 10.

FIG. 14 is a diagram 1400 illustrating aspects of generation of word embeddings 1104 usable by the system 1000 of FIG. 10. One or more of the operations described with reference to FIG. 14 may be performed by the processor(s) 104 of FIG. 10 executing the instructions 110.

The encoder 1102 is configured to process the electronic document 124 to generate the word embeddings 1104 representing words 1420 included in the electronic document 124. In a particular aspect, the encoder 1102 includes a transformer-based encoder, a bidirectional encoder representations from transformers (BERT) encoder, another type of NLP encoder, or a combination thereof.

The one or more processors 104 determine word position information (info) 1422 of words 1420 detected in the electronic document 124. For example, the one or more processors 104 use various graphical analysis techniques to determine that the electronic document 124 includes a word 1420A (e.g., "Chapter") at a position indicated by word position info 1422A. In some implementations, the word position info 1422A indicates a word bounding box (e.g., (37,41)-(88,55)) that includes the word 1420A, a character index selector, or both. For example, the word position info 1422A indicates a top-left vertex of the word bounding box and a bottom-right vertex of the word bounding box. The character index selector indicates a range of character indices of one or more characters of the word 1420A in the character listing of the electronic document 124.

Similarly, the one or more processors 104 determine that the electronic document 124 includes a word 1420B (e.g., "1") at a position indicated by word position info 1422B. The one or more processors 104 provide one or more of the words 1420 and the word position info 1422 to the encoder 1102.

The encoder 1102 processes the words 1420 and the word position info 1422 to generate the word embeddings 1104. As used herein, a "word embedding" of a word includes an embedding that represents the word, the word position info of the word, or both. For example, the word embeddings 1104 include the word position info 1422 and embeddings 1444 representing the words 1420. In a particular aspect, the encoder 1102 processes at least the word 1420A based on the word position info 1422A to generate an embedding 1444A that represents the word 1420A (e.g., "Chapter").

As used herein, an "embedding" of a word refers to a representation of the word in a semantic space. In some examples, the embedding can include a vector that represents the word in a vector space that represents a semantic space. For example, the embedding 1444A includes a vector that represents the word 1420A in a vector space that represents a semantic space. In a particular aspect, a distance between two vectors in the vector space indicates a semantic similarity between two corresponding words in the semantic space. An embedding including a vector is provided as an illustrative example. In other examples, the embedding can include other representations of the word in a semantic space.

In a particular aspect, a semantic meaning of a word is based on other words preceding or subsequent to the word. For example, "club" has a different meaning in "club sandwich" than in "baseball club." In some implementations, the encoder 1102 processes a plurality of words included in a portion of the electronic document 124 based on corresponding word positions to generate a plurality of embeddings. The plurality of words include the word 1420A, and the plurality of embeddings include the embedding 1444A.

In a particular aspect, the plurality of words also include the word 1420B, and the plurality of embeddings include the embedding 1444B. In another aspect, the encoder 1102 processes another portion of the electronic document 124 that includes the word 1420B to generate another plurality of embeddings that includes an embedding 1444B representing the word 1420B.

The encoder 1102 outputs the embedding 1444A and the word position info 1422A as a word embedding 1104A, and the embedding 1444B and the word position info 1422B as a word embedding 1104B.

Figure 15:
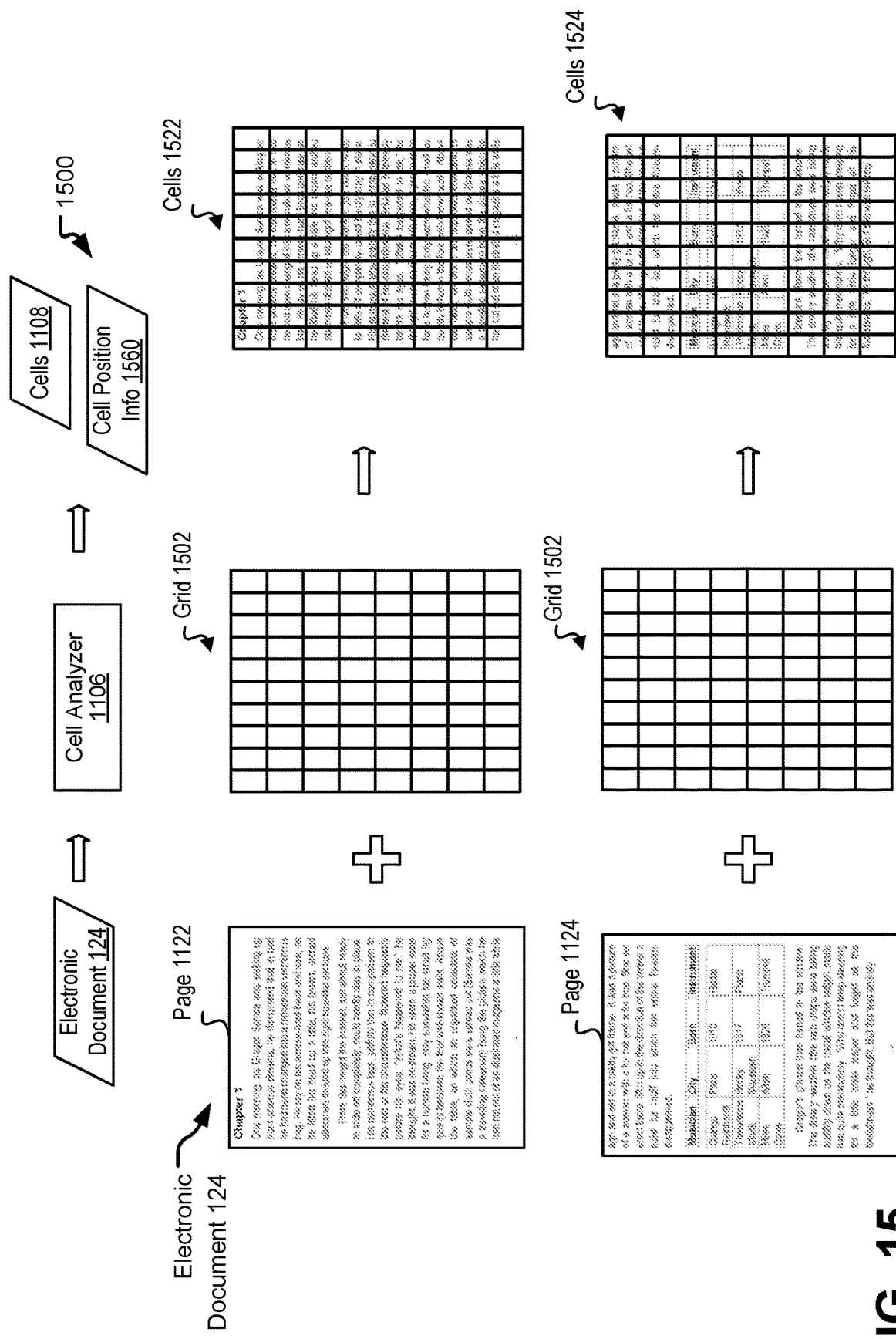
FIG. 15 is a diagram illustrating aspects of generation of document cells usable by the system of FIG. 10.

FIG. 15 is a diagram 1500 illustrating aspects of generation of cells 1108 usable by the system 1000 of FIG. 10. One or more of the operations described with reference to FIG. 15 may be performed by the processor(s) 104 of FIG. 10 executing the instructions 110.

The cell analyzer 1106 is configured to apply a grid of cells to one or more portions of the electronic document 124 to generate document cells (e.g., the cells 1108). For example, the cell analyzer 1106 applies a grid 1502 to the page 1122 to generate cells 1522. Each content item of the page 1122 is included at least partially in at least one of the cells 1522. As another example, the cell analyzer 1106 applies the grid 1502 to the page 1124 to generate cells 1524. Each content item of the page 1124 is included at least partially in at least one of the cells 1524. The cell analyzer 1106 generates cell position info 1560 indicating portions of the electronic document 124 included in the cells 1108, as further described with reference to FIG. 16.

In some aspects, the grid 1502 is uniform. For example, each cell of the grid 1502 has the same size and the same shape (e.g., rectangular). The cells 1108 include the cells 1522, the cells 1524, cells associated with one or more additional pages of the electronic document 124, or a combination thereof.

Figure 16:
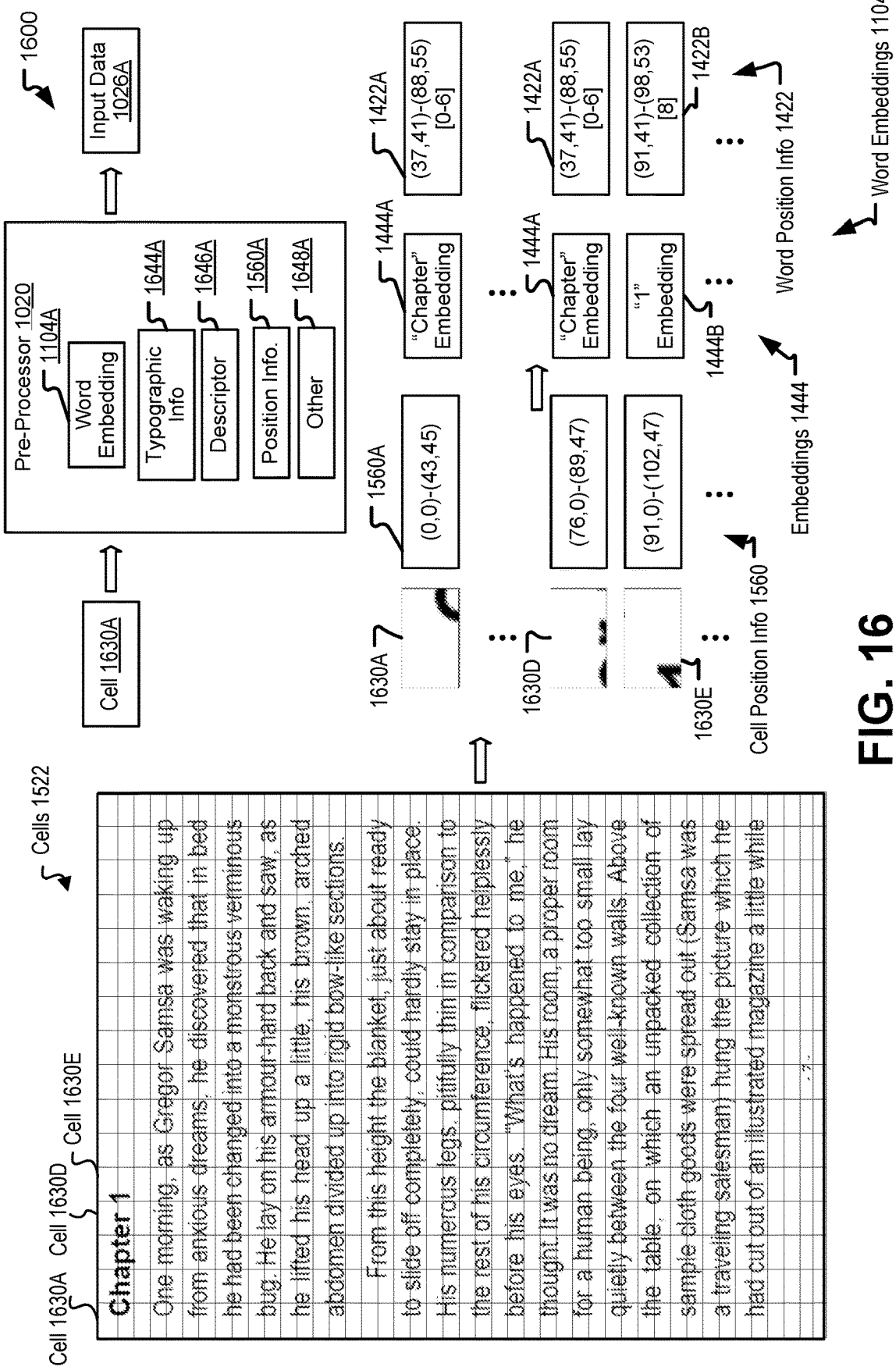
FIG. 16 is a diagram illustrating aspects of generation of input data usable by the system of FIG. 10.

FIG. 16 is a diagram 1600 illustrating aspects of generation of the input data 1026 usable by the system 1000 of FIG. 10. One or more of the operations described with reference to FIG. 16 may be performed by the processor(s) 104 of FIG. 10 executing the instructions 110.

The cell position info 1560 indicates portions of the electronic document 124 that are included in the cells 1108. For example, cell position info 1560A indicates a top-left vertex and a bottom-right vertex of a cell bounding box that includes a portion of the electronic document 124 corresponding to the cell 1630A.

The pre-processor 1020 processes the cells 1108, the word embeddings 1104, and the graphical hierarchical structure 1036 to generate the input data 1026. For example, the pre-processor 1020, based on a comparison of the cell position info 1560A and the word position info 1422A, determines that the word 1420A is at least partially included in the cell 1630A. To illustrate, the pre-processor 1020, in response to determining that a cell bounding box indicated by the cell position info 1560A at least partially overlaps a word bounding box indicated by the word position info 1422A, determines that the word 1420A is at least partially included in the cell 1630A.

In a particular aspect, the word 1420A can be at least partially included in multiple cells. In the example illustrated in FIG. 16, the word 1420A (e.g., "Chapter") is at least partially included in the cell 1630A, the cell 1630D, and one or more additional cells.

The pre-processor 1020 generates input data 1060A of the cell 1630A based on one or more content items that are each at least partially included in the cell 1630A. For example, the pre-processor 1020, in response to determining that the word 1420A is at least partially included in the cell 1630A, generates input data 1026A of the cell 1630A based at least in part on the embedding 1444A representing the word 1420A. In some examples, input data of multiple cells can be based on the same embedding. For example, the pre-processor 1020, in response to determining that the word 1420A is at least partially included in the cell 1630D, generates input data of the cell 1630D based at least in part on the embedding 1444A representing the word 1420A.

Similarly, the pre-processor 1020, in response to determining that the word 1420B is at least partially included in the cell 1630E, generates input data of the cell 1630E based at least in part on the embedding 1444B representing the word 1420B.

In a particular aspect, the pre-processor 1020 generates the input data 1026A further based on typographic information 1644A. In a particular aspect, the typographic information 1644A indicates typographic information (e.g., font weight, font size, line spacing, etc.) of the portion of the electronic document 124 included in the cell 1630A, typographic information (e.g., font weight, font size, line spacing, etc.) of the word 1420A, or both.

In a particular aspect, the pre-processor 1020 generates the input data 1026A further based on other data 1648A associated with the cell 1630A. For example, the other data 1648A indicates whitespace, background color, a line, punctuation, etc. included in the cell 1630A. In a particular aspect, the input data 1026A (e.g., an input embedding) includes a vector of values that are based on the word embedding 1104A, the typographic info 1644A, the descriptor 1646A, the cell position info 1560A, other data 1648A, or a combination thereof.

In a particular aspect, the pre-processor 1020 determines a descriptor 1646A that indicates a relationship of the cell 1630A to the graphical hierarchical structure 1036. In a particular implementation, the descriptor 1646A indicates the cell bounding box (e.g., (0,0)-(43,45)) indicated by the cell position info 1560A, the word bounding box (e.g., (37,41)-(88,55)) indicated by the word position info 1422A, the character index selector (e.g., [0-6]) indicated by the word position info 1422A, or a combination thereof.

In a particular aspect, the descriptor 1646A indicates one or more nodes of the graphical hierarchical structure 1036. In a particular implementation, the pre-processor 1020 selects one or more nodes of the graphical hierarchical structure 1036 based on a comparison of the bounding boxes 1208 of the graphical hierarchical structure 1036 and a cell bounding box indicated by the cell position info 1560A, a word bounding box indicated by the word position info 1422A, or both. For example, the pre-processor 1020 selects the node 1204D of the graphical hierarchical structure 1036 based at least in part on determining that the cell bounding box (e.g., (0,0)-(43,45)), the word bounding box (e.g., (37,41)-(88,55)), or both, overlap a graphical region bounding box (e.g., (35,38)-(100,54)) of the node 1204D. In another implementation, the pre-processor 1020 selects one or more nodes of the graphical hierarchical structure 1036 based on a comparison of the character index selectors 1210 of the graphical hierarchical structure 1036 and a character index selector (e.g., [0-6]) indicated by the word position info 1422A. For example, the pre-processor 1020 selects the node 1204D of the graphical hierarchical structure 1036 based at least in part on determining that the cell bounding box (e.g., (0,0)-(43,45)), the word bounding box (e.g., (37,41)-(88,55)), or both, overlap a graphical region bounding box (e.g., (35,38)-(100,54)) of the node 1204D. The pre-processor 1020 generates the descriptor 1646A indicating the one or more selected nodes (e.g., the node 1204D). In a particular aspect, the descriptor 1646A indicates one or more nodes (e.g., the node 1204A, the node 1204B, and the node 1204D) of the graphical hierarchical structure 1036 from the node 1204A (e.g., "root") to the one or more selected nodes (e.g., the node 1204D).

The pre-processor 1020 provides the input data 1026 of the cells 1108 to the semantic parsing model 1014. For example, the pre-processor 1020 provides the input data 1026A of the cell 1630A to the semantic parsing model 1014.

Figure 17A:
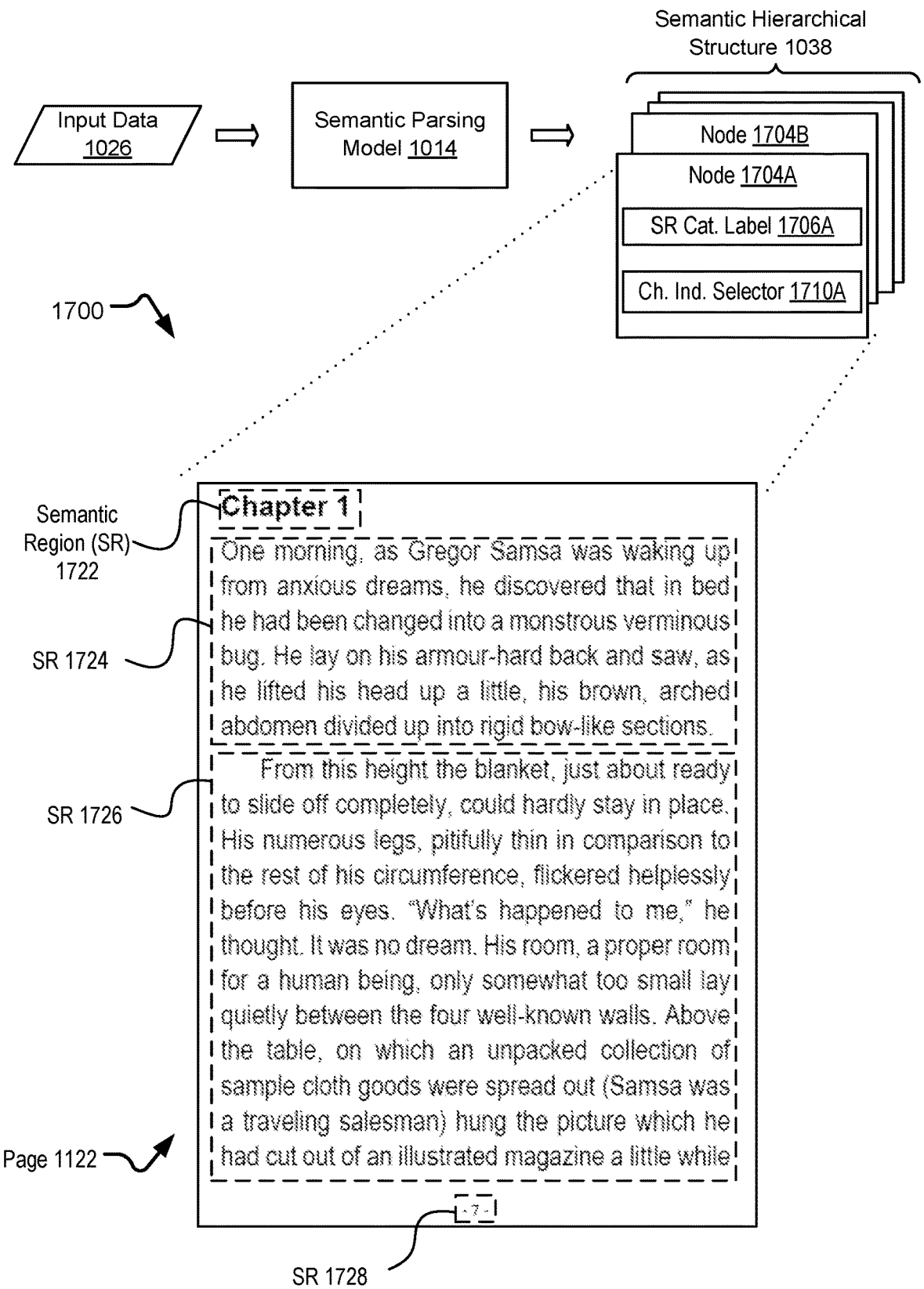
FIG. 17A is a diagram illustrating aspects of generation of a semantic hierarchical structure of a searchable data structure based on one or more electronic documents according to a particular implementation of the system of FIG. 10.
Figure 17B:
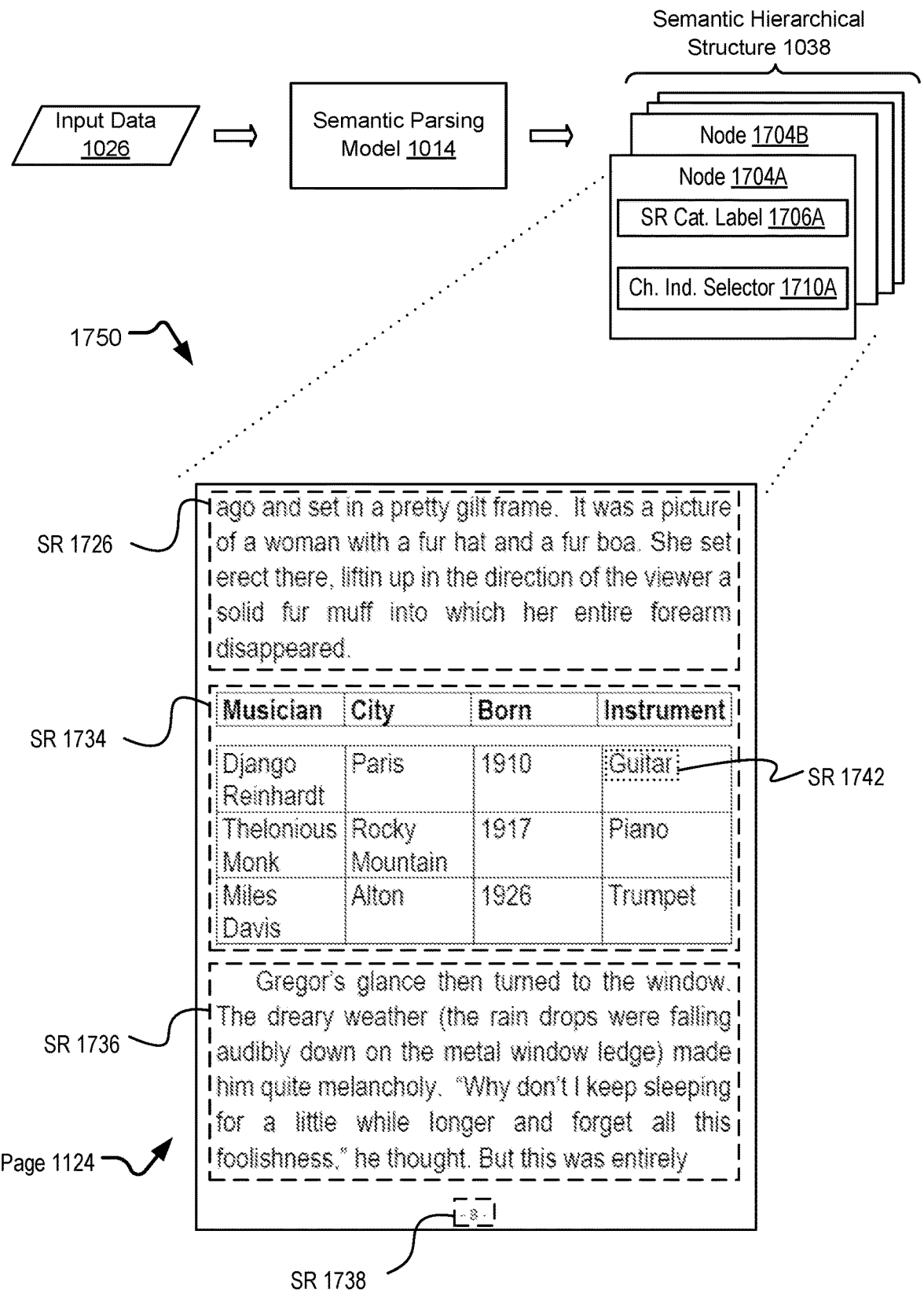
FIG. 17B is a diagram illustrating aspects of generation of a semantic hierarchical structure of a searchable data structure based on one or more electronic documents according to a particular implementation of the system of FIG. 10.
Figure 18:
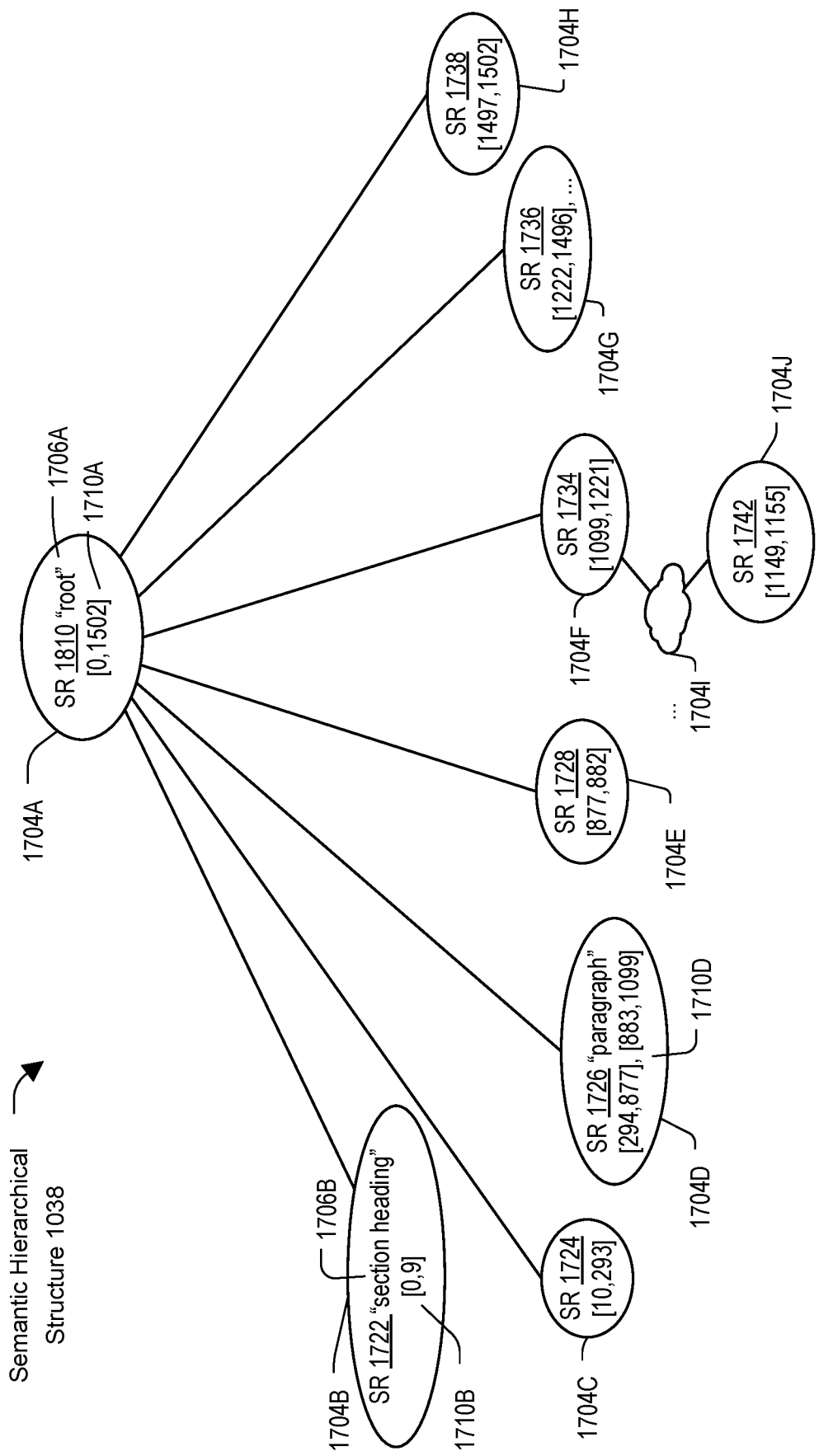
FIG. 18 is a diagram illustrating at least a portion of a semantic hierarchical structure of a searchable data structure according to a particular implementation of the system of FIG. 10.

FIGS. 17A, 17B, and 18 together illustrate aspects of generation of the semantic hierarchical structure 1038 of the searchable data structure 130 based on the electronic document(s) 124 according to a particular implementation of the system 1000 of FIG. 10. The example illustrated in FIG. 17A includes a diagram illustrating various semantic regions of the page 1122, FIG. 17B includes a diagram illustrating various semantic regions of the page 1124, and FIG. 18 illustrates an example of a semantic hierarchical structure 1038 based on the semantic regions of the page 1122 and the page 1124.

FIG. 17A is a diagram illustrating aspects of generation of the semantic hierarchical structure 1038 of the searchable data structure 130 based on the electronic document(s) 124 according to a particular implementation of the system 1000 of FIG. 10. The diagram illustrated in FIG. 17A shows an example of the semantic hierarchical structure 1038 generated by the semantic parsing model 1014 including a plurality of nodes 1704, such as a node 1704A, a node 1704B, one or more additional nodes, or a combination thereof. A node 1704 represents a semantic region (SR) of an electronic document 124.

FIG. 17A includes a diagram 1700 illustrating an example of the page 1122 of the electronic document 124 with various semantic regions identified. In the diagram 1700, each semantic region (SR) is denoted by a dashed line indicating a boundary of at least a portion of the semantic region included in the page 1122. For example, in the diagram 1700, the page 1122 includes a plurality of semantic regions, such as a SR 1722 (e.g., a section heading), a SR 1724 (e.g., a paragraph), a SR 1726 (e.g., a paragraph), and a SR 1728 (e.g., a page footer). In a particular aspect, a semantic region (e.g., a paragraph, a table, etc.) can span multiple pages. For example, the page 1122 includes a portion of the SR 1726 and the page 1124 includes another portion of the SR 1726, as further described with reference to FIG. 17B.

In some aspects, a particular node 1704 of the semantic hierarchical structure 1038 represents a particular SR of the particular electronic document 124, as further described with reference to FIG. 18. For example, the node 1704A represents a semantic region corresponding to the electronic document 124, the node 1704B represents the SR 1722 (e.g., a section heading), and so on.

Each of the nodes 1704 includes data representing a corresponding semantic region. For example, the node 1704A includes a SR category (cat.) label 1706A, a character index selector 1710A, or a combination thereof, of the SR representing the electronic document 124, as further described with reference to FIG. 18. For example, the SR category label 1706A (e.g., "root") indicates that the SR represents the entirety of the electronic document 124. The character index selector 1710A indicates a range of character indices of the character listing that includes all characters of the electronic document 124. For example, the character index selector 1710A indicates a range from a first character index (e.g., 0) that represents an initial character in the character listing of the electronic document 124 to a second character index that represents a last character in the character listing of the electronic document 124.

FIG. 17B includes a diagram 1750 illustrating an example of the page 1124 of the electronic document 124 with various semantic regions identified. In the diagram 1750, each semantic region is denoted by a dashed line indicating a boundary of at least a portion of the semantic region included in the page 1124. For example, in the diagram 1750, the page 1124 includes a plurality of semantic regions, such as a SR 1734 (e.g., a table), a SR 1736 (e.g., a paragraph), and a SR 1738 (e.g., a line of text). The page 1124 also includes a portion of the SR 1726.

In some implementations, one or more sub-regions of certain types of semantic regions may also be identified and associated with boundaries. For example, in FIG. 17B, a SR 1742 (e.g., a table cell) is associated with a boundary indicated by a dotted line. In some aspects, the SR 1742 (e.g., a table cell) is a sub-region of the SR 1734 (e.g., a table).

Although FIGS. 17A-17B illustrate example of particular types (e.g., root, section heading, paragraph, page footer, and table) of semantic regions, the electronic document(s) 124 can include different or fewer types of semantic regions. Examples of other types of semantic regions include a chapter, a heading, a section, a subsection, a column, a page header, a figure, a caption, an image, etc.

FIG. 18 represents the semantic hierarchical structure 1038 as a connected graph or tree structure including multiple nodes. Each node is either a branch node having one or more subordinate nodes or a leaf node having no subordinate nodes.

In the example illustrated in FIG. 18, the graphical hierarchical structure 1036 includes a node 1704A (e.g., a branch node) that represents a SR 1810 that includes the entire electronic document 124 (also referred to as a root node). The node 1704A includes the SR category label 1706A, the character index selector 1710A, or both. In a particular aspect, the SR category label 1706A (e.g., "root") indicates that the node 1704A represents the SR 1810 that includes the electronic document 124.

In the example illustrated in FIG. 18, a character listing of the electronic document 124 includes 1503 characters (e.g., letters, numbers, punctuation, white space, or a combination thereof). The character index selector 1710A indicates a range of character indices from a first character index (e.g., 0) representing an initial character in the character listing to a second character index (e.g., 1502) representing a last character in the character listing.

In the example illustrated in FIG. 18, the node 1704A is coupled to subordinate nodes (e.g., child nodes) corresponding to semantic regions of the electronic document 124. For example, the node 1704A is coupled to a first level of subordinate nodes, such as a node 1704B, a node 1704C, a node 1704D, a node 1704E, a node 1704F, a node 1704G, and a node 1704H representing the SR 1722 (e.g., section heading), the SR 1724 (e.g., paragraph), the SR 1726 (e.g., paragraph), the SR 1728 (e.g., page footer), the SR 1734 (e.g., table), the SR 1736 (e.g., paragraph), and the SR 1738 (e.g., page footer), respectively.

In a particular aspect, each of the nodes 1704 of the semantic hierarchical structure 1038 indicates a SR category label 1706 and a character index selector 1710. For example, the node 1704B includes a SR category label 1706B (e.g., section heading) of the SR 1722 and a character index selector 1710B indicating a range of character indices (e.g., [0-9]) representing characters (e.g., "Chapter 1") in the character listing that are included in the SR 1722.

In a particular aspect, a character index selector 1710D of the node 1704D indicates multiple ranges of character indices (e.g., [294, 877], [883, 1099]) of the character listing of the electronic document 124. A gap between a first range of the multiple ranges and each remaining range of a character index selector indicates that the corresponding region includes discontinuous text. For example, a gap between an ending character index (e.g., 877) of a first range (e.g., [294, 877]) and a starting character index (e.g., 883) of a second range (e.g., [883, 1099]) of the character index selector 1710D indicates that the SR 1726 includes discontinuous text.

In a particular aspect, a node 1704 of the semantic hierarchical structure 1038, one or more corresponding nodes 1204 of the graphical hierarchical structure 1036, or a combination thereof, include mapping data that enables mapping between the node 1704 and the one or more corresponding nodes 1204. For example, the character index selector 1710D of the node 1704D indicates a first range (e.g., [294, 877]) and a second range (e.g., [883, 1099]). A character index selector of the node 1204F indicates a range (e.g., [294, 877]) that includes the first range (e.g., [294, 877]), and a character index selector of the node 1204H indicates a range (e.g., [883, 1099]) that includes the second range (e.g., [883, 1099]). The first range indicated by the character index selector 1710D and the range indicated by the character index selector of the node 1204F correspond to mapping data that enables mapping between the node 1704D and the node 1204F. Similarly, the second range indicated by the character index selector 1710D and the range indicated by the character index selector of the node 1204H correspond to mapping data that enables mapping between the node 1704D and the node 1204H. The node 1704D mapping to the node 1204F when the first range is the same as range indicated by the character index selector of the node 1204F is provided as an illustrative example. In some examples, the node 1704D can map to the node 1204B that includes a character index selector 1210B indicating a range (e.g., [0, 882]) that includes the first range (e.g., [294, 877]) and one or more additional character indices.

In a particular aspect, a semantic region of the electronic document 124 corresponds to one or more graphical regions of the electronic document 124. For example, the node 1704D indicating the SR 1726 corresponds to the node 1204F indicating the GR 1226 and to the node 1204H indicating the GR 1232. The SR 1726 thus corresponds to the GR 1226 and the GR 1232.

In some examples, one or more subordinate nodes may include additional subordinate nodes. For example, the node 1704F corresponding to the SR 1734 (e.g., table) is coupled to one or more levels of subordinate nodes corresponding to rows of the table, columns of the table, cells in the table, etc. To illustrate, the node 1704F is coupled via one or more intermediate nodes 1704I to a node 1704J representing the SR 1742 (e.g., a table cell).

In a particular aspect, the subordinate nodes are ordered to represent an order of the corresponding semantic regions in the electronic document 124. For example, the node 1704B is prior to the node 1704C in the semantic hierarchical structure 1038 indicating that the SR 1722 is (or at least starts) prior to the SR 1724 in the electronic document 124. As another example, the node 1704D is prior to the node 1704E in the semantic hierarchical structure 1038 indicating that the SR 1726 (e.g., paragraph) at least starts prior to the SR 1728 (e.g., page footer) in the electronic document 124.

FIG. 18 represents an example of the semantic hierarchical structure 1038 formatted as a tree or graph. In other implementations, other hierarchical arrangements of data may be used. In a particular implementation, the topology of the semantic hierarchical structure 1038 is determined based on the SR category labels assigned by the semantic parsing model 1014 of FIG. 10. For example, the semantic hierarchical structure 1038 illustrated in FIG. 18 includes seven branch nodes coupled to the node 1704A because the electronic document 124 includes seven semantic regions. The semantic region 1734 includes one or more additional sub-regions, and as a result, the node 1704F of the semantic hierarchical structure 1038 is coupled to sub-ordinate nodes corresponding to the sub-regions.

Figure 19:
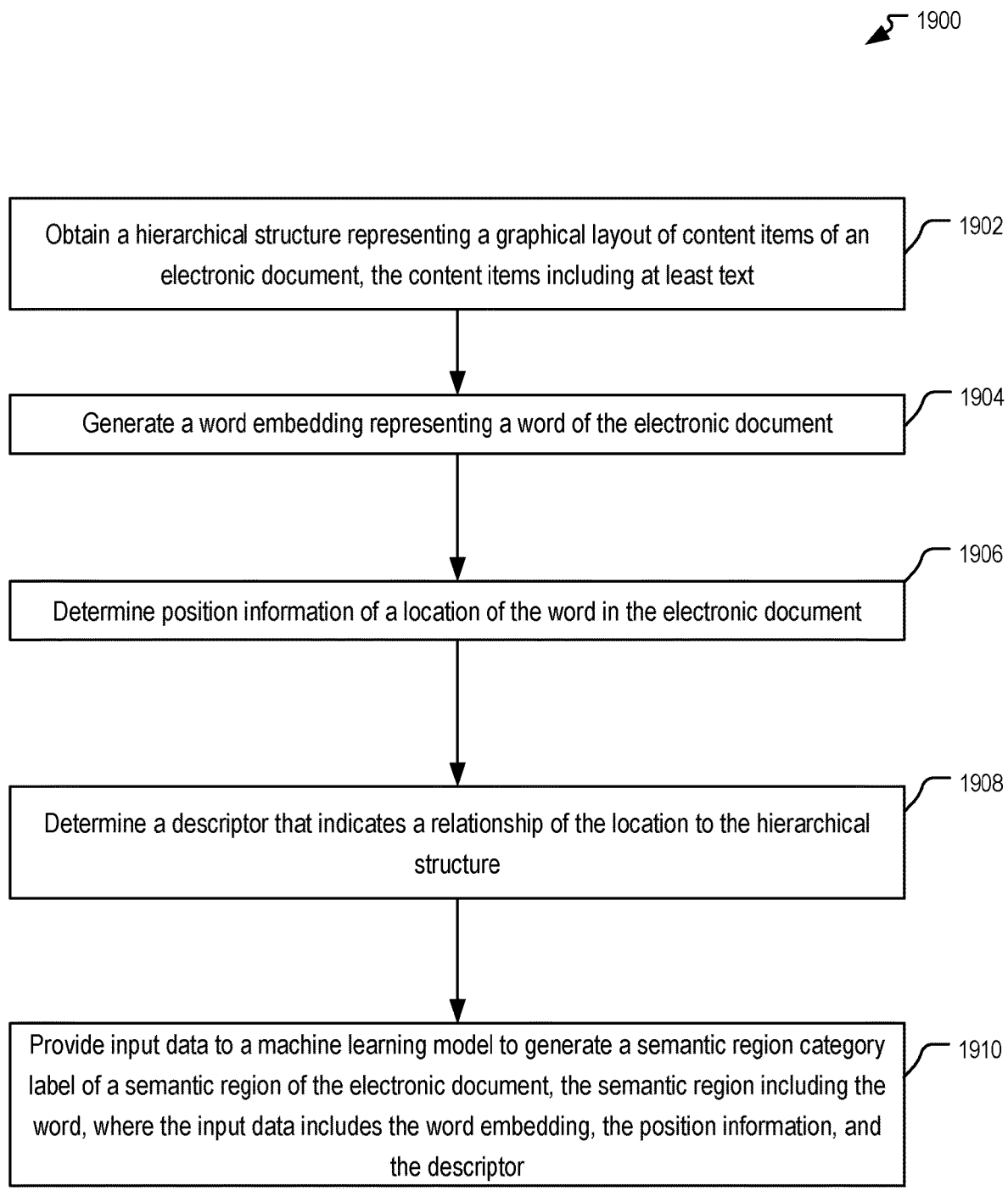
FIG. 19 is a flow chart of an example of a method that can be initiated, controlled, or performed by the system of FIG. 10.

FIG. 19 is a flow chart of an example of a method 1900 that can be initiated, controlled, or performed by the system 100 of FIG. 1, the system 1000 of FIG. 10, or both. The method 1900 includes an example of operations that may be performed to generate the semantic hierarchical structure 1038 of the searchable data structure 130 based on an electronic document 124.

The method 1900 includes, at 1902, obtaining a hierarchical structure representing a graphical layout of content items of an electronic document, the content items including at least text. For example, the one or more processors 104 can obtain the graphical hierarchical structure 1036 representing a graphical layout of the content items 1028 of the electronic document 124. In a particular aspect, the one or more processors 104 use the graphical parser 1018 to generate the graphical hierarchical structure 1036, as described with reference to FIGS. 10-13. In a particular aspect, the one or more processors 104 access the graphical hierarchical structure 1036 from the memory device(s) 106, the data repository 150, or both.

The method 1900 includes, at 1904, generating a word embedding representing a word of the electronic document. For example, the one or more processors 104 use the encoder 1102 to process the electronic document 124 to generate the word embeddings 1104, as described with reference to FIG. 14. To illustrate, the encoder 1102 generates the word embedding 1104A representing the word 1420A (e.g., "Chapter") of the electronic document 124.

The method 1900 includes, at 1906, determining position information of a location of the word in the electronic document. For example, the one or more processors 104 determine the word position info 1422A of a location of the word 1420A, as described with reference to FIG. 14. As another example, the one or more processors 104 determine the cell position info 1560A of a location of the cell 1630A that includes at least a part (e.g., a portion of the "C") of the word 1420A (e.g., "Chapter"), as described with reference to FIG. 15.

The method 1900 includes, at 1908, determining a descriptor that indicates a relationship of the location to the hierarchical structure. For example, the one or more processors 104 use the pre-processor 1020 to determine the descriptor 1646A that indicates a relation of the location (e.g., indicated by the word position info 1422A, the cell position info 1560A, or both) to the graphical hierarchical structure 1036, as described with reference to FIG. 16. In a particular aspect, the descriptor 1646A includes the character index selector of the word position info 1422A, the word bounding box of the word position info 1422A, the character index selector of the cell position info 1560A, or a combination thereof. In a particular aspect, the descriptor 1646A indicates the node 1204D, the node 1204B, the node 1204A, or a combination thereof.

The method 1900 includes, at 1910, providing input data to a machine learning model to generate a semantic region category label of a semantic region of the electronic document, the semantic region including the word, where the input data includes the word embedding, the position information, and the descriptor. For example, the one or more processors 104 use the pre-processor 1020 to generate the input data 1026A including the word embedding 1104A (e.g., the embedding 1444A and the word position info 1422A), the cell position info 1560A, the descriptor 1646A, the other data 1648A, or a combination thereof, as described with reference to FIG. 16. The pre-processor 1020 provides the input data 1026A to the semantic parsing model 1014 to generate the SR category label 1706B (e.g., "section heading") of the SR 1722 of the electronic document 124. The SR 1722 (e.g., "Chapter 1") includes the word 1420A (e.g., "Chapter").

In a particular aspect, the semantic parsing model 1014 generates the SR category label 1706B based on input data corresponding to multiple of the cells 1108. For example, the semantic parsing model 1014 generates the SR category label 1706B based at least on input data corresponding to multiple cells that each include at least a portion of the SR 1722 (e.g., "Chapter 1").

In some examples, the semantic parsing model 1014 generates the SR category label 1706B further based on input data corresponding to one or more additional cells, previously generated SR category labels, or both. For example, the semantic parsing model 1014 can analyze the input data of the additional cells to determine typographic info of the additional cells and determine the SR category label 1706B based at least in part on a comparison of the typographic info 1644A of the cell 1630A and the typographic info of the additional cells. For example, if the typographic info 1644A indicates a font size that is largest among the font sizes indicated by the input data 1026 of all of the cells 1108 of the electronic document 124, the semantic parsing model 1014 is more likely to generate the SR category label 1706B of the cell 1630A indicating a "section heading" rather than a "page footer." As another example, if previously generated SR category labels indicate that no section heading has been detected, the semantic parsing model 1014 is more likely to generate the SR category label 1706B of the cell 1630A indicating a "section heading" rather than a "sub-section heading."

Figure 20:
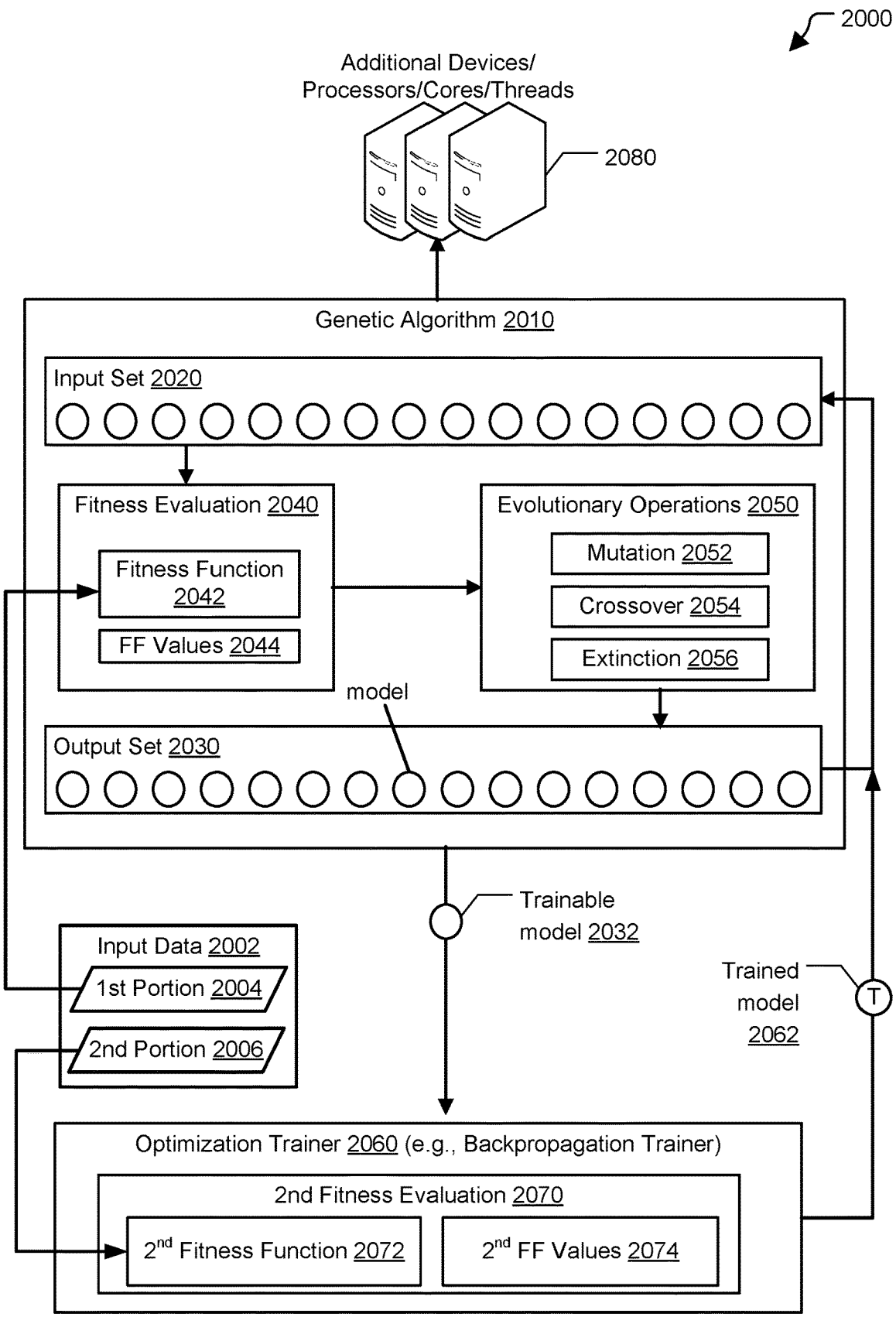
FIG. 20 is a diagram illustrating details of one example of automated model builder instructions to generate one or more of the machine-learning models of FIGS. 1 and 10.

Referring to FIG. 20, a particular illustrative example of a system 2000 executing automated model builder instructions is shown. In a particular implementation, the automated model builder instructions include, are included within, or correspond to the model builder 720 of FIG. 7. The system 2000, or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the automated model builder instructions include a genetic algorithm 2010 and an optimization trainer 2060. The optimization trainer 2060 is, for example, a backpropagation trainer, a derivative free optimizer (DFO), an extreme learning machine (ELM), etc. In particular implementations, the genetic algorithm 2010 is executed on a different device, processor (e.g., central processor unit (CPU), graphics processing unit (GPU) or other type of processor), processor core, and/or thread (e.g., hardware or software thread) than the optimization trainer 2060. The genetic algorithm 2010 and the optimization trainer 2060 are executed cooperatively to automatically generate a machine-learning model (e.g., one or more of the machine-learning models 113 of FIG. 1, the semantic parsing model 1014, or the graphical parser 1018 of FIG. 10, and referred to herein as "models" for ease of reference) based on the input data 2002 (such as the labeled training data 718 of FIG. 7). The system 2000 performs an automated model building process that enables users, including inexperienced users, to quickly and easily build highly accurate models based on a specified data set.

During configuration of the system 2000, a user specifies the input data 2002. In some implementations, the user can also specify one or more characteristics of models that can be generated. In such implementations, the system 2000 constrains models processed by the genetic algorithm 2010 to those that have the one or more specified characteristics. For example, the specified characteristics can constrain allowed model topologies (e.g., to include no more than a specified number of input nodes or output nodes, no more than a specified number of hidden layers, no recurrent loops, etc.). Constraining the characteristics of the models can reduce the computing resources (e.g., time, memory, processor cycles, etc.) needed to converge to a final model, can reduce the computing resources needed to use the model (e.g., by simplifying the model), or both.

The user can configure aspects of the genetic algorithm 2010 via input to graphical user interfaces (GUIs). For example, the user may provide input to limit a number of epochs that will be executed by the genetic algorithm 2010. Alternatively, the user may specify a time limit indicating an amount of time that the genetic algorithm 2010 has to execute before outputting a final output model, and the genetic algorithm 2010 may determine a number of epochs that will be executed based on the specified time limit. To illustrate, an initial epoch of the genetic algorithm 2010 may be timed (e.g., using a hardware or software timer at the computing device executing the genetic algorithm 2010), and a total number of epochs that are to be executed within the specified time limit may be determined accordingly. As another example, the user may constrain a number of models evaluated in each epoch, for example by constraining the size of an input set 2020 of models and/or an output set 2030 of models.

The genetic algorithm 2010 represents a recursive search process. Consequently, each iteration of the search process (also called an epoch or generation of the genetic algorithm 2010) has an input set 2020 of models (also referred to herein as an input population) and an output set 2030 of models (also referred to herein as an output population). The input set 2020 and the output set 2030 may each include a plurality of models, where each model includes data representative of a machine learning data model. For example, each model may specify a neural network or an autoencoder by at least an architecture, a series of activation functions, and connection weights. The architecture (also referred to herein as a topology) of a model includes a configuration of layers or nodes and connections therebetween. The models may also be specified to include other parameters, including but not limited to bias values/functions and aggregation functions.

For example, each model can be represented by a set of parameters and a set of hyperparameters. In this context, the hyperparameters of a model define the architecture of the model (e.g., the specific arrangement of layers or nodes and connections), and the parameters of the model refer to values that are learned or updated during optimization training of the model. For example, the parameters include or correspond to connection weights and biases.

In a particular implementation, a model is represented as a set of nodes and connections therebetween. In such implementations, the hyperparameters of the model include the data descriptive of each of the nodes, such as an activation function of each node, an aggregation function of each node, and data describing node pairs linked by corresponding connections. The activation function of a node is a step function, sine function, continuous or piecewise linear function, sigmoid function, hyperbolic tangent function, or another type of mathematical function that represents a threshold at which the node is activated. The aggregation function is a mathematical function that combines (e.g., sum, product, etc.) input signals to the node. An output of the aggregation function may be used as input to the activation function.

In another particular implementation, the model is represented on a layer-by-layer basis. For example, the hyperparameters define layers, and each layer includes layer data, such as a layer type and a node count. Examples of layer types include fully connected, long short-term memory (LSTM) layers, gated recurrent units (GRU) layers, and convolutional neural network (CNN) layers. In some implementations, all of the nodes of a particular layer use the same activation function and aggregation function. In such implementations, specifying the layer type and node count fully may describe the hyperparameters of each layer. In other implementations, the activation function and aggregation function of the nodes of a particular layer can be specified independently of the layer type of the layer. For example, in such implementations, one fully connected layer can use a sigmoid activation function and another fully connected layer (having the same layer type as the first fully connected layer) can use a tan h activation function. In such implementations, the hyperparameters of a layer include layer type, node count, activation function, and aggregation function. Further, a complete autoencoder is specified by specifying an order of layers and the hyperparameters of each layer of the autoencoder.

In a particular aspect, the genetic algorithm 2010 may be configured to perform speciation. For example, the genetic algorithm 2010 may be configured to cluster the models of the input set 2020 into species based on "genetic distance" between the models. The genetic distance between two models may be measured or evaluated based on differences in nodes, activation functions, aggregation functions, connections, connection weights, layers, layer types, latent-space layers, encoders, decoders, etc. of the two models. In an illustrative example, the genetic algorithm 2010 may be configured to serialize a model into a bit string. In this example, the genetic distance between models may be represented by the number of differing bits in the bit strings corresponding to the models. The bit strings corresponding to models may be referred to as "encodings" of the models.

After configuration, the genetic algorithm 2010 may begin execution based on the input data 2002. Parameters of the genetic algorithm 2010 may include but are not limited to, mutation parameter(s), a maximum number of epochs the genetic algorithm 2010 will be executed, a termination condition (e.g., a threshold fitness value that results in termination of the genetic algorithm 2010 even if the maximum number of generations has not been reached), whether parallelization of model testing or fitness evaluation is enabled, whether to evolve a feedforward or recurrent neural network, etc. As used herein, a "mutation parameter" affects the likelihood of a mutation operation occurring with respect to a candidate neural network, the extent of the mutation operation (e.g., how many bits, bytes, fields, characteristics, etc. change due to the mutation operation), and/or the type of the mutation operation (e.g., whether the mutation changes a node characteristic, a link characteristic, etc.). In some examples, the genetic algorithm 2010 uses a single mutation parameter or set of mutation parameters for all of the models. In such examples, the mutation parameter may impact how often, how much, and/or what types of mutations can happen to any model of the genetic algorithm 2010. In alternative examples, the genetic algorithm 2010 maintains multiple mutation parameters or sets of mutation parameters, such as for individual or groups of models or species. In particular aspects, the mutation parameter(s) affect crossover and/or mutation operations, which are further described below.

For an initial epoch of the genetic algorithm 2010, the topologies of the models in the input set 2020 may be randomly or pseudo-randomly generated within constraints specified by the configuration settings or by one or more architectural parameters. Accordingly, the input set 2020 may include models with multiple distinct topologies. For example, a first model of the initial epoch may have a first topology, including a first number of input nodes associated with a first set of data parameters, a first number of hidden layers including a first number and arrangement of hidden nodes, one or more output nodes, and a first set of interconnections between the nodes. In this example, a second model of the initial epoch may have a second topology, including a second number of input nodes associated with a second set of data parameters, a second number of hidden layers including a second number and arrangement of hidden nodes, one or more output nodes, and a second set of interconnections between the nodes. The first model and the second model may or may not have the same number of input nodes and/or output nodes. Further, one or more layers of the first model can be of a different layer type that one or more layers of the second model. For example, the first model can be a feedforward model, with no recurrent layers; whereas, the second model can include one or more recurrent layers.

The genetic algorithm 2010 may automatically assign an activation function, an aggregation function, a bias, connection weights, etc. to each model of the input set 2020 for the initial epoch. In some aspects, the connection weights are initially assigned randomly or pseudo-randomly. In some implementations, a single activation function is used for each node of a particular model. For example, a sigmoid function may be used as the activation function of each node of the particular model. The single activation function may be selected based on configuration data. For example, the configuration data may indicate that a hyperbolic tangent activation function is to be used or that a sigmoid activation function is to be used. Alternatively, the activation function may be randomly or pseudo-randomly selected from a set of allowed activation functions, and different nodes or layers of a model may have different types of activation functions. Aggregation functions may similarly be randomly or pseudo-randomly assigned for the models in the input set 2020 of the initial epoch. Thus, the models of the input set 2020 of the initial epoch may have different topologies (which may include different input nodes corresponding to different input data fields if the data set includes many data fields) and different connection weights. Further, the models of the input set 2020 of the initial epoch may include nodes having different activation functions, aggregation functions, and/or bias values/functions.

During execution, the genetic algorithm 2010 performs fitness evaluation 2040 and evolutionary operations 2050 on the input set 2020. In this context, fitness evaluation 2040 includes evaluating each model of the input set 2020 using a fitness function 2042 to determine a fitness function value 2044 ("FF values" in FIG. 20) for each model of the input set 2020. The fitness function values 2044 are used to select one or more models of the input set 2020 to modify using one or more of the evolutionary operations 2050. In FIG. 20, the evolutionary operations 2050 include mutation operations 2052, crossover operations 2054, and extinction operations 2056, each of which is described further below.

During the fitness evaluation 2040, each model of the input set 2020 is tested based on the input data 2002 to determine a corresponding fitness function value 2044. For example, a first portion 2004 of the input data 2002 may be provided as input data to each model, which processes the input data (according to the network topology, connection weights, activation function, etc., of the respective model) to generate output data. The output data of each model is evaluated using the fitness function 2042 and the first portion 2004 of the input data 2002 to determine how well the model modeled the input data 2002. In some examples, fitness of a model is based on reliability of the model, performance of the model, complexity (or sparsity) of the model, size of the latent space, or a combination thereof.

In a particular aspect, fitness evaluation 2040 of the models of the input set 2020 is performed in parallel. To illustrate, the system 2000 may include devices, processors, cores, and/or threads 2080 in addition to those that execute the genetic algorithm 2010 and the optimization trainer 2060. These additional devices, processors, cores, and/or threads 2080 can perform the fitness evaluation 2040 of the models of the input set 2020 in parallel based on a first portion 2004 of the input data 2002 and may provide the resulting fitness function values 2044 to the genetic algorithm 2010.

The mutation operation 2052 and the crossover operation 2054 are highly stochastic under certain constraints and a defined set of probabilities optimized for model building, which produces reproduction operations that can be used to generate the output set 2030, or at least a portion thereof, from the input set 2020. In a particular implementation, the genetic algorithm 2010 utilizes intra-species reproduction (as opposed to inter-species reproduction) in generating the output set 2030. In other implementations, inter-species reproduction may be used in addition to or instead of intra-species reproduction to generate the output set 2030. Generally, the mutation operation 2052 and the crossover operation 2054 are selectively performed on models that are more fit (e.g., have higher fitness function values 2044, fitness function values 2044 that have changed significantly between two or more epochs, or both).

The extinction operation 2056 uses a stagnation criterion to determine when a species should be omitted from a population used as the input set 2020 for a subsequent epoch of the genetic algorithm 2010. Generally, the extinction operation 2056 is selectively performed on models that are satisfy a stagnation criteria, such as modes that have low fitness function values 2044, fitness function values 2044 that have changed little over several epochs, or both.

In accordance with the present disclosure, cooperative execution of the genetic algorithm 2010 and the optimization trainer 2060 is used to arrive at a solution faster than would occur by using a genetic algorithm 2010 alone or an optimization trainer 2060 alone. Additionally, in some implementations, the genetic algorithm 2010 and the optimization trainer 2060 evaluate fitness using different data sets, with different measures of fitness, or both, which can improve fidelity of operation of the final model. To facilitate cooperative execution, a model (referred to herein as a trainable model 2032 in FIG. 20) is occasionally sent from the genetic algorithm 2010 to the optimization trainer 2060 for training. In a particular implementation, the trainable model 2032 is based on crossing over and/or mutating the fittest models (based on the fitness evaluation 2040) of the input set 2020. In such implementations, the trainable model 2032 is not merely a selected model of the input set 2020; rather, the trainable model 2032 represents a potential advancement with respect to the fittest models of the input set 2020.

The optimization trainer 2060 uses a second portion 2006 of the input data 2002 to train the connection weights and biases of the trainable model 2032, thereby generating a trained model 2062. The optimization trainer 2060 does not modify the architecture of the trainable model 2032.

During optimization, the optimization trainer 2060 provides a second portion 2006 of the input data 2002 to the trainable model 2032 to generate output data. The optimization trainer 2060 performs a second fitness evaluation 2070 by comparing the data input to the trainable model 2032 to the output data from the trainable model 2032 to determine a second fitness function value 2074 based on a second fitness function 2072. The second fitness function 2072 is the same as the first fitness function 2042 in some implementations and is different from the first fitness function 2042 in other implementations. In some implementations, the optimization trainer 2060 or portions thereof is executed on a different device, processor, core, and/or thread than the genetic algorithm 2010. In such implementations, the genetic algorithm 2010 can continue executing additional epoch(s) while the connection weights of the trainable model 2032 are being trained by the optimization trainer 2060. When training is complete, the trained model 2062 is input back into (a subsequent epoch of) the genetic algorithm 2010, so that the positively reinforced "genetic traits" of the trained model 2062 are available to be inherited by other models in the genetic algorithm 2010.

In implementations in which the genetic algorithm 2010 employs speciation, a species ID of each of the models may be set to a value corresponding to the species that the model has been clustered into. A species fitness may be determined for each of the species. The species fitness of a species may be a function of the fitness of one or more of the individual models in the species. As a simple illustrative example, the species fitness of a species may be the average of the fitness of the individual models in the species. As another example, the species fitness of a species may be equal to the fitness of the fittest or least fit individual model in the species. In alternative examples, other mathematical functions may be used to determine species fitness. The genetic algorithm 2010 may maintain a data structure that tracks the fitness of each species across multiple epochs. Based on the species fitness, the genetic algorithm 2010 may identify the "fittest" species, which may also be referred to as "elite species." Different numbers of elite species may be identified in different embodiments.

In a particular aspect, the genetic algorithm 2010 uses species fitness to determine if a species has become stagnant and is therefore to become extinct. As an illustrative non-limiting example, the stagnation criterion of the extinction operation 2056 may indicate that a species has become stagnant if the fitness of that species remains within a particular range (e.g., +/−5%) for a particular number (e.g., 5) of epochs. If a species satisfies a stagnation criterion, the species and all underlying models may be removed from subsequent epochs of the genetic algorithm 2010.

In some implementations, the fittest models of each "elite species" may be identified. The fittest models overall may also be identified. An "overall elite" need not be an "elite member," e.g., may come from a non-elite species. Different numbers of "elite members" per species and "overall elites" may be identified in different embodiments."

The output set 2030 of the epoch is generated based on the input set 2020 and the evolutionary operation 2050. In the illustrated example, the output set 2030 includes the same number of models as the input set 2020. In some implementations, the output set 2030 includes each of the "overall elite" models and each of the "elite member" models. Propagating the "overall elite" and "elite member" models to the next epoch may preserve the "genetic traits" resulted in caused such models being assigned high fitness values.

The rest of the output set 2030 may be filled out by random reproduction using the crossover operation 2054 and/or the mutation operation 2052. After the output set 2030 is generated, the output set 2030 may be provided as the input set 2020 for the next epoch of the genetic algorithm 2010.

After one or more epochs of the genetic algorithm 2010 and one or more rounds of optimization by the optimization trainer 2060, the system 2000 selects a particular model or a set of model as the final model (e.g., one of the machine-learning models 113, the semantic parsing model 1014, or the graphical parser 1018). For example, the final model may be selected based on the fitness function values 2044, 2074. For example, a model or set of models having the highest fitness function value 2044 or 2074 may be selected as the final model. When multiple models are selected (e.g., an entire species is selected), an ensembler can be generated (e.g., based on heuristic rules or using the genetic algorithm 2010) to aggregate the multiple models. In some implementations, the final model can be provided to the optimization trainer 2060 for one or more rounds of optimization after the final model is selected. Subsequently, the final model can be output for use with respect to other data (e.g., real-time data).

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as, but not limited to, C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may take the form of or include a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the actions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Particular aspects of the disclosure are described below in sets of interrelated clauses:

According to Clause 1, a method includes: obtaining, at a device, a hierarchical structure representing a graphical layout of content items of an electronic document, the content items including at least text; generating a word embedding representing a word of the electronic document; determining position information of a location of the word in the electronic document; determining a descriptor that indicates a relationship of the location to the hierarchical structure; and providing input data to a machine learning model to generate a semantic region category label of a semantic region of the electronic document, the semantic region including the word, wherein the input data includes the word embedding, the position information, and the descriptor.

Clause 2 includes the method of Clause 1, wherein the input data also indicate typographic information associated with the word in the electronic document.

Clause 3 includes the method of Clause 1 or Clause 2, wherein a portion of the electronic document that includes the word is processed by an encoder to generate the word embedding.

Clause 4 includes the method of any of Clause 1 to Clause 3, wherein the machine learning model includes a convolutional neural network.

Clause 5 includes the method of any of Clause 1 to Clause 4, further including applying a grid of cells to at least a portion of the electronic document, wherein the position information of the word is determined based at least in part on a location of a particular cell of the grid of cells, and wherein the particular cell includes at least a portion of the word.

Clause 6 includes the method of Clause 5, wherein the grid of cells is uniform.

Clause 7 includes the method of Clause 5 or Clause 6, wherein the portion of the electronic document corresponds to a page of the electronic document.

Clause 8 includes the method of any of Clause 5 to Clause 7, wherein the input data is based on one or more content items that are at least partially included in the particular cell.

Clause 9 includes the method of any of Clause 1 to Clause 8, wherein the content items further include one or more of a blank space, a picture, a punctuation, a line, or a number.

Clause 10 includes the method of any of Clause 1 to Clause 9, wherein the semantic region category label indicates that the semantic region corresponds to at least one of a chapter, a heading, a paragraph, a section, a subsection, a column, a page header, a page footer, a figure, a table, or a caption.

Clause 11 includes the method of any of Clause 1 to Clause 10, further including generating, based at least in part on the semantic region category label, a second hierarchical structure indicating a semantic layout of the content items of the electronic document.

Clause 12 includes the method of Clause 11, wherein the hierarchical structure includes a plurality of first nodes representing a plurality of graphical regions of the electronic document, wherein a first node of the plurality of first nodes represents a particular graphical region, wherein the second hierarchical structure includes a plurality of second nodes representing a plurality of semantic regions of the electronic document, and wherein a second node of the plurality of second nodes represents the semantic region.

Clause 13 includes the method of Clause 12, wherein the particular graphical region corresponds to one or more of the content items in a bounding box.

Clause 14 includes the method of Clause 12 or Clause 13, wherein the first node, the second node, or both, include mapping data to map between the first node and the second node.

Clause 15 includes the method of any of Clause 12 to Clause 14, wherein the first node includes a first character index selector indicting characters of the electronic document that are associated with the particular graphical region, and wherein the second node includes a second character index selector indicting characters of the electronic document that are associated with the semantic region.

Clause 16 includes the method of Clause 15, wherein the first character index selector specifies one or more first ranges of character indices in a character listing for the electronic document and the second character index selector specifies one or more second ranges of character indices in the character listing for the electronic document.

Clause 17 includes the method of any of Clause 12 to Clause 16, further including: generating output data indicating the semantic region category label and the semantic region; providing the output data to a display device; receiving user input responsive to providing the output data to the display device; generating updated input data based on the user input; providing the updated input data to the machine learning model to generate an updated semantic region category label of an updated semantic region that includes the word; and updating, based at least in part on the updated semantic region category label, the second hierarchical structure to include a node representing the updated semantic region.

Clause 18 includes the method of any of Clause 11 to Clause 17, further including providing the hierarchical structure and the second hierarchical structure as input to one or more document processing applications.

Clause 19 includes the method of any of Clause 11 to Clause 18, further including: receiving a request indicating a semantic category that matches the semantic region category label; and based on determining that the second hierarchical structure indicates that the semantic region category label is assigned to the semantic region, selecting one or more graphical regions indicated by the hierarchical structure that correspond to the semantic region; and generate a result based on the one or more graphical regions.

Clause 20 includes the method of any of Clause 1 to Clause 19, further including generating a character index selector indicting characters of the electronic document that are associated with the semantic region, the character index selector indicating one or more ranges of character indices in a character listing for the electronic document.

Clause 21 includes the method of Clause 20, wherein the character index selector indicates multiple ranges of character indices in the character listing, and wherein a gap between a first range of the multiple ranges and each remaining range of the multiple ranges indicates that the semantic region includes discontinuous text.

Clause 22 includes the method of any of Clause 1 to Clause 21, further including: receiving a user request indicating a semantic region category; and based on determining that the semantic region category matches the semantic region category label, generate a result based on at least one content item included in the semantic region.

According to Clause 23, a device includes: a memory configured to store an electronic document; and one or more processors configured to: obtain a hierarchical structure representing a graphical layout of content items of the electronic document, the content items including at least text; generate a word embedding representing a word of the electronic document; determine position information of a location of the word in the electronic document; determine a descriptor that indicates a relationship of the location to the hierarchical structure; and provide input data to a machine learning model to generate a semantic region category label of a semantic region of the electronic document, the semantic region including the word, wherein the input data includes the word embedding, the position information, and the descriptor.

Clause 24 includes the device of Clause 23, wherein the input data also indicate typographic information associated with the word in the electronic document.

Clause 25 includes the device of Clause 23 or Clause 24, wherein a portion of the electronic document that includes the word is processed by an encoder to generate the word embedding.

Clause 26 includes the device of any of Clause 23 to Clause 25, wherein the machine learning model includes a convolutional neural network.

Clause 27 includes the device of any of Clause 23 to Clause 26, wherein the one or more processors are further configured to apply a grid of cells to at least a portion of the electronic document, wherein the position information of the word is determined based at least in part on a location of a particular cell of the grid of cells, and wherein the particular cell includes at least a portion of the word.

Clause 28 includes the device of Clause 27, wherein the grid of cells is uniform.

Clause 29 includes the device of Clause 27 or Clause 28, wherein the portion of the electronic document corresponds to a page of the electronic document.

Clause 30 includes the device of any of Clause 27 to Clause 29, wherein the input data is based on one or more content items that are at least partially included in the particular cell.

Clause 31 includes the device of any of Clause 23 to Clause 30, wherein the content items further include one or more of a blank space, a picture, a punctuation, a line, or a number.

Clause 32 includes the device of any of Clause 23 to Clause 31, wherein the semantic region category label indicates that the semantic region corresponds to at least one of a chapter, a heading, a paragraph, a section, a subsection, a column, a page header, a page footer, a figure, a table, or a caption.

Clause 33 includes the device of any of Clause 23 to Clause 32, wherein the one or more processors are further configured to generate, based at least in part on the semantic region category label, a second hierarchical structure indicating a semantic layout of the content items of the electronic document.

Clause 34 includes the device of Clause 33, wherein the hierarchical structure includes a plurality of first nodes representing a plurality of graphical regions of the electronic document, wherein a first node of the plurality of first nodes represents a particular graphical region, wherein the second hierarchical structure includes a plurality of second nodes representing a plurality of semantic regions of the electronic document, and wherein a second node of the plurality of second nodes represents the semantic region.

Clause 35 includes the device of Clause 34, wherein the particular graphical region corresponds to one or more of the content items in a bounding box.

Clause 36 includes the device of Clause 34 or Clause 35, wherein the first node, the second node, or both, include mapping data to map between the first node and the second node.

Clause 37 includes the device of any of Clause 34 to Clause 36, wherein the first node includes a first character index selector indicting characters of the electronic document that are associated with the particular graphical region, and wherein the second node includes a second character index selector indicting characters of the electronic document that are associated with the semantic region.

Clause 38 includes the device of Clause 37, wherein the first character index selector specifies one or more first ranges of character indices in a character listing for the electronic document and the second character index selector specifies one or more second ranges of character indices in the character listing for the electronic document.

Clause 39 includes the device of any of Clause 34 to Clause 38, wherein the one or more processors are further configured to: generating output data indicating the semantic region category label and the semantic region; providing the output data to a display device; receiving user input responsive to providing the output data to the display device; generating updated input data based on the user input; providing the updated input data to the machine learning model to generate an updated semantic region category label of an updated semantic region that includes the word; and updating, based at least in part on the updated semantic region category label, the second hierarchical structure to include a node representing the updated semantic region.

Clause 40 includes the device of any of Clause 33 to Clause 39, wherein the one or more processors are further configured to providing the hierarchical structure and the second hierarchical structure as input to one or more document processing applications.

Clause 41 includes the device of any of Clause 33 to Clause 40, wherein the one or more processors are further configured to: receiving a request indicating a semantic region category that matches the semantic region category label; and based on determining that the second hierarchical structure indicates that the semantic region category label is assigned to the semantic region, selecting one or more graphical regions indicated by the hierarchical structure that correspond to the semantic region; and generate a result based on the one or more graphical regions.

Clause 42 includes the device of any of Clause 23 to Clause 41, wherein the one or more processors are further configured to generating a character index selector indicting characters of the electronic document that are associated with the semantic region, the character index selector indicating one or more ranges of character indices in a character listing for the electronic document.

Clause 43 includes the device of Clause 42, wherein the character index selector indicates multiple ranges of character indices in the character listing, and wherein a gap between a first range of the multiple ranges and each remaining range of the multiple ranges indicates that the semantic region includes discontinuous text.

Clause 44 includes the device of any of Clause 23 to Clause 43, wherein the one or more processors are further configured to: receiving a user request indicating a semantic region category; and based on determining that the semantic region category matches the semantic region category label, generate a result based on at least one content item included in the semantic region.

According to Clause 45, a non-transitory computer-readable medium stores instructions that, when executed by one or more processors, cause the one or more processors to: obtain a hierarchical structure representing a graphical layout of content items of an electronic document, the content items including at least text; generate a word embedding representing a word of the electronic document; determine position information of a location of the word in the electronic document; determine a descriptor that indicates a relationship of the location to the hierarchical structure; and provide input data to a machine learning model to generate a semantic region category label of a semantic region of the electronic document, the semantic region including the word, wherein the input data includes the word embedding, the position information, and the descriptor.

Clause 46 includes the non-transitory computer-readable medium of Clause 45, wherein the input data also indicate typographic information associated with the word in the electronic document.

According to Clause 47, a method of generating a searchable representation of an electronic document includes obtaining an electronic document specifying a graphical layout of content items, the content items including at least text; determining pixel data representing the graphical layout of the content items; providing input data based, at least in part, on the pixel data to a document parsing model that is trained to detect functional regions within the graphical layout based on the input data, to assign boundaries to the functional regions based on the input data, and to assign a category label to each functional region that is detected; matching portions of the text to corresponding functional regions based on the boundaries assigned to the functional regions and locations associated with the portions of the text; and storing data representing the content items, the functional regions, and the category labels in a searchable data structure.

Clause 48 includes the method of Clause 47 wherein the pixel data defines a plurality of display elements to render a display of the electronic document and each display element encodes at least one color bit representing a display color of the display element.

Clause 49 includes the method of Clause 47 or the method of Clause 48 wherein the searchable data structure comprises a tree structure having a plurality of leaf nodes, each leaf node associated with a corresponding branch node, and wherein the content items are assigned to nodes of the tree structure such that a hierarchy of the functional regions is represented in the tree structure.

Clause 50 includes the method of any of Clauses 47 to 49 and further comprises, after storing the data in the searchable data structure, generating one or more search heuristics based on the content items, the functional regions, the category labels, or a combination thereof; and storing the one or more search heuristics for use when searching the searchable data structure.

Clause 51 includes the method of Clause 50 and further comprises, after storing the one or more search heuristics, receiving a search query related to a document corpus that includes the electronic document; accessing the one or more search heuristics; generating an augmented search query based on the search query and the one or more search heuristics; and searching the document corpus using the augmented search query.

Clause 52 includes the method of any of Clauses 47 to 51 wherein the functional regions detected by the document parsing model include two or more of a page header, a page footer, a section heading, a paragraph, a table, an image, a footnote, or a list.

Clause 53 includes the method of any of Clauses 47 to 52 and further comprises for a particular functional region labeled as a table, estimating column boundaries and row boundaries based on the input data associated with the particular functional region; determining a column heading of a column based on the text associated within the particular functional region; storing a portion of the text associated within the particular functional region in a first data element of the searchable data structure; and storing the column heading of the column in a second data element, wherein the first data element is subordinate to the second data element in the searchable data structure.

Clause 54 includes the method of Clause 53 wherein determining the column heading includes using a natural-language processing model to determine a semantic group represented by text of the column.

Clause 55 includes the method of any of Clauses 47 to 54 wherein the data specifying the graphical layout of the content items indicates font characteristics for particular text associated with a particular functional region, and wherein the document parsing model assigns a particular category label to the particular functional region based on at least one of the font characteristics of the particular text or a change of the font characteristics between the particular functional region and an adjacent functional region.

Clause 56 includes the method of any of Clauses 47 to 55 wherein the data specifying the graphical layout of the content items indicates character spacing in particular text associated with a particular functional region, and wherein the document parsing model assigns a particular category label to the particular functional region based on at least one of the character spacing of the particular text or a change of the character spacing between the particular functional region and an adjacent functional region.

Clause 57 includes the method of any of Clauses 47 to 56 wherein the data specifying the graphical layout of the content items indicates a background color associated with a particular functional region, and wherein the document parsing model assigns a particular category label to the particular functional region based on at least one of the background color or a change in background color between the particular functional region and an adjacent functional region.

Clause 58 includes the method of any of Clauses 47 to 57 wherein the text includes one or more special characters, and wherein the document parsing model assigns a particular category label to a particular functional region based on a determination that the one or more special characters are present in the particular function region.

Clause 59 includes the method of any of Clauses 47 to 58 wherein the document parsing model is trained to assign a first category label to a particular functional region based on a probabilistic analysis of the pixel data associated with the particular functional region.

Clause 60 includes the method of any of Clauses 47 to 59 wherein the input data is further based on the text, and wherein the document parsing model is trained to assign a particular category label to a particular functional region further based on a semantic analysis of text associated with the particular functional region.

Clause 61 includes the method of any of Clauses 47 to 60 wherein the searchable data structure has a smaller in-memory footprint than the electronic document.

Clause 62 includes the method of any of Clauses 47 to 61 and further comprises determining a topology of the searchable data structure based on an arrangement of information in the electronic document.

Clause 63 includes the method of any of Clauses 47 to 62 wherein the document parsing model is trained using labeled training data based on a corpus of electronic documents, each electronic document of the corpus including a plurality of identified functional regions and a respective category label for each of the identified function regions.

According to Clause 64, a system comprises a memory storing instructions; and a processor configured to execute the instructions to perform operations. The operations include obtaining an electronic document that includes data specifying a graphical layout of content items, the content items including at least text; determining pixel data representing the graphical layout of the content items; providing input data based, at least in part, on the pixel data to a document parsing model that is trained to detect functional regions within the graphical layout based on the input data, to assign boundaries to the functional regions based on the input data, and to assign a category label to each functional region that is detected; matching portions of the text to corresponding functional regions based on the boundaries assigned to the functional regions and locations associated with the text; and storing a searchable data structure representing the content items, the functional regions, and the category labels.

Clause 65 includes the system of Clause 64 wherein the functional regions include two or more of a page header, a page footer, a section heading, a paragraph, a table, an image, a footnote, or a list.

Clause 66 includes the system of Clause 64 or Clause 65 wherein, for a particular functional region labeled as a table, the operations include estimating column boundaries and row boundaries based on the input data associated with the particular functional region; determining a column heading of a column based on the text associated within the particular functional region; storing a portion of the text associated within the particular functional region in a first data element of the searchable data structure; and storing the column heading of the column in a second data element, wherein the first data element is subordinate to the second data element in the searchable data structure.

Clause 67 includes the system of Clause 66 wherein determining the column heading includes using a natural-language processing model to determine a semantic group represented by text of the column.

Clause 68 includes the system of any of Clauses 64 to 67 wherein the data specifying the graphical layout of the content items indicates font characteristics for particular text associated with a particular functional region, and the document parsing model is configured to assign a particular category label to the particular functional region based on at least one of the font characteristics of the particular text or a change of the font characteristics between the particular functional region and an adjacent functional region.

Clause 69 includes the system of any of Clauses 64 to 68 wherein the data specifying the graphical layout of the content items indicates character spacing in particular text associated with a particular functional region, and the document parsing model is configured to assign a particular category label to the particular functional region based on at least one of the character spacing of the particular text or a change of the character spacing between the particular functional region and an adjacent functional region.

Clause 70 includes the system of any of Clauses 64 to 69 wherein the data specifying the graphical layout of the content items indicates a background color associated with a particular functional region, wherein and the document parsing model is configured to assign a particular category label to the particular functional region based on at least one of the background color or a change in background color between the particular functional region and an adjacent functional region.

Clause 71 includes the system of any of Clauses 64 to 70 wherein the text includes one or more special characters and the document parsing model is configured to assign a particular category label to a particular functional region based on a determination that the one or more special characters are present in the particular function region.

Clause 72 includes the system of any of Clauses 64 to 71 wherein the document parsing model is trained to assign a first category label to a particular functional region based on probabilistic analysis of the pixel data associated with the particular functional region.

Clause 73 includes the system of any of Clauses 64 to 72 wherein the input data is further based on the text and the document parsing model is trained to assign a particular category label to a particular functional region further based on a semantic analysis of text associated with the particular functional region.

Clause 74 includes the system of any of Clauses 64 to 73 wherein the searchable data structure has a smaller in-memory footprint than the electronic document.

Clause 75 includes the system of Clause 74 wherein the searchable data structure comprises a tree structure having a plurality of leaf nodes, each leaf node associated with a corresponding branch node, and wherein the content items are assigned to nodes of the tree structure such that a hierarchy of the functional regions is represented in the tree structure.

Clause 76 includes the system of any of Clauses 64 to 75 wherein the operations further comprise determining a topology of the searchable data structure based on an arrangement of information in the electronic document.

According to Clause 77, a non-transitory computer-readable medium stores instructions that are executable by a processor to cause the processor to perform operations comprising obtaining an electronic document that includes data specifying a graphical layout of content items, the content items including at least text; determining pixel data representing the graphical layout of the content items; providing input data based, at least in part, on the pixel data to a document parsing model that is trained to detect functional regions within the graphical layout based on the input data, to assign boundaries to the functional regions based on the input data, and to assign a category label to each functional region that is detected; matching portions of the text to corresponding functional regions based on the boundaries assigned to the functional regions and locations associated with the text; and storing a searchable data structure representing the content items, the functional regions, and the category labels.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   obtaining, at a device, a hierarchical structure representing a graphical layout of content items of an electronic document, the content items including at least text;
   generating a word embedding representing a word of the electronic document;
   determining position information of a location of the word in the electronic document;
   determining a descriptor that indicates a relationship of the location to the hierarchical structure;
   providing input data to a machine learning model to generate a semantic region category label of a semantic region of the electronic document, the semantic region including the word, wherein the input data includes the word embedding, the position information, and the descriptor; and
   generating a character index selector indicating characters of the electronic document that are associated with the semantic region, the character index selector indicating one or more ranges of character indices in a character listing for the electronic document, wherein the character index selector indicates multiple ranges of character indices in the character listing, and wherein a gap between a first range of the multiple ranges and each remaining range of the multiple ranges indicates that the semantic region includes discontinuous text.

2. The method of claim 1, wherein the machine learning model includes a convolutional neural network.

3. The method of claim 1, further comprising applying a grid of cells to at least a portion of the electronic document, wherein the position information of the word is determined based at least in part on a location of a particular cell of the grid of cells, and wherein the particular cell includes at least a portion of the word.

4. The method of claim 3, wherein the grid of cells is uniform.

5. The method of claim 3, wherein the input data is based on one or more content items that are at least partially included in the particular cell.

6. The method of claim 1, wherein the content items further include one or more of a blank space, a picture, a punctuation, a line, or a number.

7. The method of claim 1, wherein the semantic region category label indicates that the semantic region corresponds to at least one of a chapter, a heading, a paragraph, a section, a subsection, a column, a page header, a page footer, a figure, a table, or a caption.

8. The method of claim 1, further comprising generating, based at least in part on the semantic region category label, a second hierarchical structure indicating a semantic layout of the content items of the electronic document.

9. The method of claim 8, wherein the hierarchical structure includes a plurality of first nodes representing a plurality of graphical regions of the electronic document, wherein a first node of the plurality of first nodes represents a particular graphical region, wherein the second hierarchical structure includes a plurality of second nodes representing a plurality of semantic regions of the electronic document, and wherein a second node of the plurality of second nodes represents the semantic region.

10. The method of claim 9, wherein the particular graphical region corresponds to one or more of the content items in a bounding box.

11. The method of claim 9, wherein the first node, the second node, or both, include mapping data to map between the first node and the second node.

12. The method of claim 9, wherein the first node includes a first character index selector indicating characters of the electronic document that are associated with the particular graphical region, wherein the second node includes a second character index selector indicating characters of the electronic document that are associated with the semantic region, and wherein the first character index selector specifies one or more first ranges of character indices in a character listing for the electronic document and the second character index selector specifies one or more second ranges of character indices in the character listing for the electronic document.

13. The method of claim 9, further comprising:
   generating output data indicating the semantic region category label and the semantic region;
   providing the output data to a display device;
   receiving user input responsive to providing the output data to the display device;
   generating updated input data based on the user input;
   providing the updated input data to the machine learning model to generate an updated semantic region category label of an updated semantic region that includes the word; and
   updating, based at least in part on the updated semantic region category label, the second hierarchical structure to include a node representing the updated semantic region.

14. The method of claim 8, further comprising:
   receiving a request indicating a semantic category that matches the semantic region category label;
   based on determining that the second hierarchical structure indicates that the semantic region category label is assigned to the semantic region, selecting one or more graphical regions indicated by the hierarchical structure that correspond to the semantic region; and
   generating a result based on the one or more graphical regions.

15. The method of claim 1, wherein the semantic region of the electronic document corresponds to a portion of the electronic document that shares a first formatting in the electronic document, and wherein a second portion of the electronic document corresponds to a second semantic region distinct from the semantic region responsive to having a second formatting distinct from the first formatting.

16. The method of claim 1, further comprising:
receiving a user request indicating a semantic region category; and
based on determining that the semantic region category matches the semantic region category label, generate a result based on at least one content item included in the semantic region.

17. A device comprising:
a memory configured to store an electronic document; and
one or more processors configured to:
obtain a hierarchical structure representing a graphical layout of content items of the electronic document, the content items including at least text;
generate a word embedding representing a word of the electronic document;
determine position information of a location of the word in the electronic document;
determine a descriptor that indicates a relationship of the location to the hierarchical structure;
provide input data to a machine learning model to generate a semantic region category label of a semantic region of the electronic document, the semantic region including the word, wherein the input data includes the word embedding, the position information, and the descriptor;
generate, based at least in part on the semantic region category label, a second hierarchical structure indicating a semantic layout of the content items of the electronic document;
receive a request indicating a semantic category that matches the semantic region category label;
based on determining that the second hierarchical structure indicates that the semantic region category label is assigned to the semantic region, select one or more graphical regions indicated by the hierarchical structure that correspond to the semantic region; and
generate a result based on the one or more graphical regions.

18. The device of claim 17, wherein a portion of the electronic document that includes the word is processed by an encoder to generate the word embedding.

19. A non-transitory computer-readable medium comprising instructions that, when executed by one or more processors, cause the one or more processors to:

obtain a hierarchical structure representing a graphical layout of content items of an electronic document, the content items including at least text, wherein the hierarchical structure includes a plurality of first nodes representing a plurality of graphical regions of the electronic document, and wherein a first node of the plurality of first nodes represents a particular graphical region;
generate a word embedding representing a word of the electronic document;
determine position information of a location of the word in the electronic document;
determine a descriptor that indicates a relationship of the location to the hierarchical structure;
provide input data to a machine learning model to generate a semantic region category label of a semantic region of the electronic document, the semantic region including the word, wherein the input data includes the word embedding, the position information, and the descriptor;
generate, based at least in part on the semantic region category label, a second hierarchical structure indicating a semantic layout of the content items of the electronic document wherein the second hierarchical structure includes a plurality of second nodes representing a plurality of semantic regions of the electronic document, and wherein a second node of the plurality of second nodes represents the semantic region;
generate output data indicating the semantic region category label and the semantic region;
provide the output data to a display device;
receive user input responsive to providing the output data to the display device;
generate updated input data based on the user input;
provide the updated input data to the machine learning model to generate an updated semantic region category label of an updated semantic region that includes the word; and
update, based at least in part on the updated semantic region category label, the second hierarchical structure to include a node representing the updated semantic region.

20. The non-transitory computer-readable medium of claim 19, wherein the input data also indicate typographic information associated with the word in the electronic document.

* * * * *

UNITED STATES PATENT AND TRADEMARK OFFICE
CERTIFICATE OF CORRECTION

PATENT NO. : 12,032,605 B2
APPLICATION NO. : 18/054787
DATED : July 9, 2024
INVENTOR(S) : William McNeill Page 1 of 1

It is certified that error appears in the above-identified patent and that said Letters Patent is hereby corrected as shown below:

In the Claims

Column 53, Claim 16, Line 9 after "label," delete:
"generate."
Insert:
--generating--.

Signed and Sealed this
Twenty-fourth Day of September, 2024

Katherine Kelly Vidal
*Director of the United States Patent and Trademark Office*